United States Patent
Kim et al.

(10) Patent No.: US 10,747,416 B2
(45) Date of Patent: Aug. 18, 2020

(54) USER TERMINAL DEVICE AND METHOD FOR DISPLAYING THEREOF

(71) Applicant: SAMSUNG ELECTRONICS CO., LTD., Suwon-si (KR)

(72) Inventors: Yun-kyung Kim, Suwon-si (KR); Hyun-jin Kim, Seoul (KR); Yong-yeon Lee, Suwon-si (KR); Jae-yeon Rho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 14/621,597

(22) Filed: Feb. 13, 2015

(65) Prior Publication Data

US 2015/0227308 A1    Aug. 13, 2015

Related U.S. Application Data

(60) Provisional application No. 61/939,380, filed on Feb. 13, 2014.

(30) Foreign Application Priority Data

Jul. 15, 2014 (KR) .................. 10-2014-0088924

(51) Int. Cl.
*G06F 3/0484* (2013.01)
*G06F 3/0486* (2013.01)
(Continued)

(52) U.S. Cl.
CPC .......... *G06F 3/0486* (2013.01); *G06F 3/0482* (2013.01); *G06F 3/0483* (2013.01); *G06F 3/04886* (2013.01); *G06F 2203/04803* (2013.01)

(58) Field of Classification Search
CPC ............. G06F 3/04883; G06F 3/0488; G06F 3/04886; G06F 3/0482; G06F 3/017; G06F 3/04817; G06F 3/01
See application file for complete search history.

(56) References Cited

U.S. PATENT DOCUMENTS 6,115,025 A     9/2000  Buxton et al.
6,628,310 B1 *  9/2003  Hiura ................ G06F 3/0481
                                                  715/776
(Continued)

FOREIGN PATENT DOCUMENTS

EP     2 685 341 A1    1/2014
KR     10-0667848 B1   1/2007
(Continued)

OTHER PUBLICATIONS

Communication dated Oct. 22, 2018, issued by the Korean Intellectual Property Office in counterpart Korean Patent Application No. 10-2014-0088924.
(Continued)

*Primary Examiner* — Sang H Kim
(74) *Attorney, Agent, or Firm* — Sughrue Mion, PLLC

(57) ABSTRACT

There is provided a method for displaying of a user terminal device which includes displaying a first screen; and displaying, in response to a user interaction to touch and drag one of corner areas of the first screen being detected, a second screen on a touch location of the corner areas where the user interaction is detected while at least a part of the first screen is being displayed.

20 Claims, 136 Drawing Sheets

(51) Int. Cl.
   *G06F 3/0482* (2013.01)
   *G06F 3/0488* (2013.01)
   *G06F 3/0483* (2013.01)

(56) References Cited

U.S. PATENT DOCUMENTS

| | | | |
|---|---|---|---|
| 6,982,728 B1 | 1/2006 | Nicolas et al. | |
| 7,109,977 B2 | 9/2006 | Durso | |
| 7,814,419 B2 | 10/2010 | Fabritius | |
| 7,978,176 B2 | 7/2011 | Forstall et al. | |
| 8,072,427 B2 | 12/2011 | Pletikosa et al. | |
| 8,185,169 B2 | 5/2012 | Griffin et al. | |
| 8,255,825 B2 | 8/2012 | Morris | |
| 8,531,486 B2 | 9/2013 | Laine et al. | |
| 8,639,102 B2 | 1/2014 | Seo et al. | |
| 8,726,190 B2 | 5/2014 | Clark et al. | |
| 8,872,855 B2 | 10/2014 | Doll | |
| 9,092,070 B2 | 7/2015 | Jung et al. | |
| 9,170,659 B2 | 10/2015 | Kim et al. | |
| 9,177,356 B2 | 11/2015 | Van Osten et al. | |
| 9,182,900 B2 | 11/2015 | Choi | |
| 9,467,848 B1 | 10/2016 | Song et al. | |
| 9,489,080 B2 | 11/2016 | Seo et al. | |
| 9,721,375 B1 | 8/2017 | Rivard et al. | |
| 9,727,292 B1* | 8/2017 | Kudryashov | G06F 3/14 |
| 9,766,788 B2 | 9/2017 | Kerr et al. | |
| 9,811,507 B2 | 11/2017 | Cranfill et al. | |
| 10,061,760 B2 | 8/2018 | Brant | |
| 10,152,460 B2 | 12/2018 | Kennedy, Jr. | |
| 10,410,605 B2 | 9/2019 | Gärdenfors et al. | |
| 10,551,995 B1* | 2/2020 | Ho | G06F 3/04883 |
| 2001/0026379 A1 | 10/2001 | Collard et al. | |
| 2005/0064917 A1 | 3/2005 | Peng et al. | |
| 2005/0073504 A1 | 4/2005 | Durso | |
| 2005/0114788 A1 | 5/2005 | Fabritius | |
| 2006/0126284 A1 | 6/2006 | Moscovitch | |
| 2006/0152497 A1 | 7/2006 | Rekimoto | |
| 2006/0284852 A1* | 12/2006 | Hofmeister | G06F 3/0483 345/173 |
| 2007/0064288 A1 | 3/2007 | Lee | |
| 2007/0146347 A1 | 6/2007 | Rosenberg | |
| 2007/0220444 A1 | 9/2007 | Sunday et al. | |
| 2008/0074442 A1 | 3/2008 | Taniguchi et al. | |
| 2008/0165144 A1 | 7/2008 | Forstall et al. | |
| 2008/0229224 A1 | 9/2008 | Kake | |
| 2009/0058820 A1 | 3/2009 | Hinckley | |
| 2009/0058882 A1 | 3/2009 | Adachi et al. | |
| 2009/0094562 A1 | 4/2009 | Jeong et al. | |
| 2009/0262074 A1 | 10/2009 | Nasiri et al. | |
| 2010/0037167 A1 | 2/2010 | Son et al. | |
| 2010/0081475 A1 | 4/2010 | Chiang et al. | |
| 2010/0088630 A1 | 4/2010 | Morris | |
| 2010/0097322 A1 | 4/2010 | Hu et al. | |
| 2010/0203925 A1 | 8/2010 | Nagai | |
| 2010/0265269 A1 | 10/2010 | Matsuda | |
| 2011/0016165 A1 | 1/2011 | Uejima | |
| 2011/0261075 A1 | 10/2011 | Tanaka | |
| 2012/0028688 A1 | 2/2012 | Vartanian | |
| 2012/0081277 A1 | 4/2012 | de Paz | |
| 2012/0084674 A1 | 4/2012 | Visosky | |
| 2012/0180001 A1* | 7/2012 | Griffin | G06F 3/04883 715/863 |
| 2012/0221966 A1 | 8/2012 | Inami et al. | |
| 2012/0222243 A1 | 9/2012 | Conrad | |
| 2012/0229399 A1 | 9/2012 | Kobayashi et al. | |
| 2012/0235930 A1 | 9/2012 | Lazaridis et al. | |
| 2012/0252410 A1 | 10/2012 | Williams | |
| 2012/0274663 A1 | 11/2012 | Laine et al. | |
| 2012/0304107 A1* | 11/2012 | Nan | G06F 3/04883 715/781 |
| 2012/0311438 A1 | 12/2012 | Cranfill et al. | |
| 2013/0019201 A1 | 1/2013 | Cabrera-Cordon et al. | |
| 2013/0021377 A1 | 1/2013 | Doll | |
| 2013/0024812 A1* | 1/2013 | Reeves | G06F 3/1423 715/810 |
| 2013/0027613 A1 | 1/2013 | Kim et al. | |
| 2013/0069987 A1 | 3/2013 | Choe | |
| 2013/0097542 A1 | 4/2013 | Icho et al. | |
| 2013/0125045 A1 | 5/2013 | Sun et al. | |
| 2013/0128016 A2 | 5/2013 | Keys | |
| 2013/0147795 A1 | 6/2013 | Kim et al. | |
| 2013/0154947 A1 | 6/2013 | Abrams et al. | |
| 2013/0176248 A1 | 7/2013 | Shin et al. | |
| 2013/0194309 A1 | 8/2013 | Seo et al. | |
| 2013/0222243 A1 | 8/2013 | Jung et al. | |
| 2013/0268847 A1* | 10/2013 | Kim | G06F 3/0483 715/251 |
| 2013/0298054 A1 | 11/2013 | Nakazawa et al. | |
| 2013/0321654 A1 | 12/2013 | Shintani et al. | |
| 2014/0009418 A1 | 1/2014 | Sugimoto | |
| 2014/0009499 A1 | 1/2014 | Gärdenfors et al. | |
| 2014/0033127 A1 | 1/2014 | Choi | |
| 2014/0043265 A1* | 2/2014 | Chang | G06F 3/04883 345/173 |
| 2014/0129975 A1 | 5/2014 | Ramachandran et al. | |
| 2014/0155165 A1 | 6/2014 | Hammontree et al. | |
| 2014/0173483 A1* | 6/2014 | Hicks | G06F 3/0486 715/769 |
| 2014/0173495 A1* | 6/2014 | Chang | G06F 3/0483 715/776 |
| 2014/0189395 A1 | 7/2014 | Kp | |
| 2014/0208128 A1 | 7/2014 | Gyorfi et al. | |
| 2014/0282214 A1* | 9/2014 | Shirzadi | G06F 3/04883 715/781 |
| 2014/0304645 A1* | 10/2014 | Osman | G06F 3/0481 715/784 |
| 2014/0359541 A1 | 12/2014 | Park | |
| 2014/0365909 A1 | 12/2014 | Kerr et al. | |
| 2014/0368422 A1 | 12/2014 | Gupta et al. | |
| 2014/0380247 A1* | 12/2014 | Tecarro | G06F 3/0483 715/863 |
| 2015/0113446 A1 | 4/2015 | Penha et al. | |
| 2015/0186037 A1 | 7/2015 | Kanatani et al. | |
| 2015/0228255 A1 | 8/2015 | Takasu | |
| 2015/0277847 A1 | 10/2015 | Yliaho et al. | |
| 2015/0293656 A1 | 10/2015 | Jung et al. | |
| 2015/0309691 A1 | 10/2015 | Seo et al. | |
| 2015/0317060 A1 | 11/2015 | Debets et al. | |
| 2016/0041709 A1 | 2/2016 | Choi | |
| 2016/0217554 A1 | 7/2016 | Nguyen et al. | |
| 2016/0224119 A1 | 8/2016 | Wu | |
| 2018/0048752 A1 | 2/2018 | Zhou | |
| 2019/0012051 A1 | 1/2019 | Jeon | |

FOREIGN PATENT DOCUMENTS

| | | |
|---|---|---|
| KR | 10-2008-0086292 A | 9/2008 |
| KR | 10-1135071 B1 | 4/2012 |
| KR | 10-2013-0054042 A | 5/2013 |
| KR | 10-2014-0013547 A | 2/2014 |

OTHER PUBLICATIONS

Communication dated Jul. 3, 2019 issued by the United States Patent and Trademark Office in counterpart U.S. Appl. No. 14/621,985.
Communication dated Jun. 28, 2019 issued by the United States Patent and Trademark Office in counterpart U.S. Appl. No. 14/622,041.
Communication dated Mar. 24, 2017, issued by the United States Patent and Trademark Office in counterpart U.S. Appl. No. 14/621,985.
Communication dated Mar. 30, 2017, issued by the United States Patent and Trademark Office in counterpart U.S. Appl. No. 14/622,041.
Communication dated Aug. 30, 2017, issued by the United States Patent and Trademark Office in counterpart U.S. Appl. No. 14/622,041.
Communication dated Feb. 2, 2018, issued by the United States Patent and Trademark Office in counterpart U.S. Appl. No. 14/621,985.
Communication dated Mar. 16, 2018, issued by the United States Patent and Trademark Office in counterpart U.S. Appl. No. 14/622,041.
Communication dated Aug. 15, 2018, issued by the United States Patent and Trademark Office in counterpart U.S. Appl. No. 14/622,041.
Communication dated Oct. 22, 2018, issued by the Korean Patent Office in counterpart Korean Application No. 10-2014-0088919.

(56) References Cited

OTHER PUBLICATIONS

Communication dated Jan. 9, 2019, issued by the Korean Patent Office in counterpart Korean Application No. 10-2014-0089060.
Communication dated Feb. 19, 2019, issued by the United States Patent and Trademark Office in counterpart U.S. Appl. No. 14/621,985.
Communication dated Apr. 24, 2019, issued by the Korean Patent Office in counterpart Korean Application No. 10-2014-0088924.
Communication dated Apr. 29, 2019, issued by the Korean Patent Office in counterpart Korean Application No. 10-2014-0088919.
Communication dated Oct. 2, 2019, issued by the Uspto in counterpart U.S. Appl. No. 14/621,985.
Communication dated Oct. 31, 2019, issued by the Korean Intellectual Property Office in corresponding Korean Application No. 10-2014-0088924.
Communication dated Nov. 27, 2019, issued by the Korean Intellectual Property Office in corresponding Korean Application No. 10-2014-0088919.
Communication dated Mar. 27, 2020 issued by the Korean Intellectual Property Office in counterpart Korean Application No. 10-2014-0088924.
Communication dated Feb. 21, 2020 issued by the United States Patent Office in counterpart U.S. Appl. No. 14/621,985.

* cited by examiner folding folding folding folding

4310

USER TERMINAL DEVICE AND METHOD FOR DISPLAYING THEREOF

CROSS-REFERENCE TO RELATED APPLICATIONS

This application claims priority from Korean Patent Application No. 10-2014-0088924, filed on Jul. 15, 2014, in the Korean Intellectual Property Office, U.S. Provisional Application No. 61/939,380, filed on Feb. 13, 2014, the disclosures of which are incorporated herein by reference in their entirety.

BACKGROUND

1. Field

Apparatuses and methods consistent with exemplary embodiments relate to a user terminal device and a displaying method thereof, more particularly, to a user terminal a user terminal device including a display panel in a square shape and a displaying method thereof.

2. Description of the Related Art

With the development of electronic technology, various types of user terminal devices have been developed and distributed. The size of user terminal devices has been decreasing, but the functions of the user terminal devices have increased and become more diverse. Therefore, the demand for user terminal devices has been increasing.

A user terminal device may provide various contents such as multimedia contents and application screens upon the request of a user. A user may select a desired function using a button or a touch screen provided on a user terminal device. A user terminal device may selectively execute a program according to a user interaction between a user and the device, and display the result thereof.

As more diverse functions are provided by a user terminal device, there are various needs for different methods of displaying contents and/or user interfaces. That is, as the method of displaying content has changed and the type and function of the contents have been increasing, interaction methods such as merely selecting a button or touching a screen may be insufficient to perform various functions of a user terminal device.

Thus, there is a need of user interaction technology which enables a user to use a user terminal device more conveniently.

SUMMARY

Exemplary embodiments may overcome the above disadvantages and other disadvantages not described above. However, it is understood that the exemplary embodiment are not required to overcome the disadvantages described above, and may not overcome any of the problems described above.

The exemplary embodiments relate to a user terminal device which may perform various functions through a user interaction to touch and drag one of corner areas of the first screen and a displaying method thereof.

The exemplary embodiments also relate to a user terminal device having a display panel in a square shape which may provide a user terminal device that displays a plurality of objects on a grid screen including a plurality of square cells, and provides various functions on a plurality of objects according to a user action, and a displaying method thereof.

According to an exemplary embodiment, there is provided a method for displaying a user terminal device which includes displaying a first screen; and displaying, in response to detecting a user interaction comprising a touch and drag input at one of a plurality of corner areas of the first screen, a second screen at the one of the plurality of corner areas where the touch and drag input is detected while at least a part of the first screen remains displayed.

The displaying the second screen may include, in response to the detecting the user interaction comprising the touch and drag input at the one of the plurality of corner areas of the first screen in a diagonal direction while the one of the plurality of corner areas in which the user interaction is detected on the first screen is folded, displaying the second screen on the folded corner area.

The second screen may include different information displayed according to a location of the one of the plurality of corner areas at which the user interaction is detected.

The displaying the second screen may include displaying one from among information on an application which is currently executed on the second screen according to a location of a corner area at which the user interaction is detected, information indicating that moving to a home screen is available, information on a current status of a user terminal device, and quick access information on an application designated by a user.

A size of the second screen varies based on a distance traveled by the touch and drag input, and an amount of information included in the second screen changes according to the size of the second screen.

The first screen may be in a square shape, and the method may include substituting the first screen with the second screen, in response to the user interaction comprising a touch and drag input that moves from the one of the plurality of a corner areas to a corner area opposite to the one of the plurality of a corner areas.

In a case of the first screen displaying an e-book, the displaying the second screen may include, in response to the detecting the user interaction comprising the touch and drag input at the one of the plurality of corner areas of the first screen in a diagonal direction, displaying the second screen including a bookmark at the one of the plurality of corner areas where the user interaction is detected.

In a case of receiving a message from outside, wherein the displaying the second screen may include, in response to the detecting the user interaction comprising the touch and drag input at the one of the plurality of the corner areas of the first screen in a diagonal direction, displaying the second screen which includes at least one from among an icon indicating that the message is received at the one of the plurality of corner areas in which the user interaction is detected and information on the received message.

In a case of the first screen displaying a photographic content, wherein the displaying the second screen may include, in response to the detecting the user interaction comprising the touch and drag input at the one of the plurality of corner areas of the first screen in a diagonal direction, displaying the second screen which includes at least one icon configured to perform a plurality of tasks on the photographic content at the one of the plurality of corner areas in which the user interaction is detected.

The first screen and the second screen may be in a rectangular shape, and the first screen and the second screen may share one corner area.

According to an exemplary embodiment, a user terminal device includes a display configured to display a first screen; a detector configured to detect a user interaction; and a controller configured to, in response to a user interaction comprising a touch and drag input at one of a plurality of corner areas of the first screen being detected by the detector, control the display to display a second screen at the one of the plurality of corner areas where the touch and drag input is detected, while at least a part of the first screen remains displayed.

The controller, in response to the detector detecting the user interaction comprising the touch and drag input at the one of the plurality of corner areas of the first screen in a diagonal direction, controls the display, while the one of the plurality of corner areas in which the user interaction is detected in the first screen is folded, to display the second screen on the folded corner area.

The second screen may include different information displayed according to a location of the one of the plurality of corner areas at which the user interaction is detected.

The controller may control the display to display one from among information on an application which is currently executed, information indicating that movement to a home screen is available, information on a state of a current user terminal device, and quick access information on an application designated by a user on the second screen according to a location at which the user interaction is detected through the detector.

The controller may change a size of the second screen according based on a distance traveled by the touch and drag input, and changes an amount of information included in the second screen according to the size of the second screen.

The first screen may be in a rectangular shape, and the controller, in response to the user interaction comprising a touch and drag input that moves from the one of the plurality of a corner areas to a corner area opposite side to the one of the plurality of a corner areas, may control the display to substitute the first screen with the second screen.

The first screen may include e-book content, wherein the controller, in response to the detector detecting the user interaction comprising the touch and drag input at the one of the plurality of corner areas of the first screen in a diagonal direction, may control the display to display a second screen including a bookmark at the one of the plurality of corner areas where the user interaction is detected.

The controller may detect that terminal device received a message from outside and, in response to the detector detecting the user interaction comprising the touch and drag at the one of the plurality of corner areas of the first screen in a diagonal direction, may control the display to display the second screen that includes at least one from among an icon indicating that the message is received and information on the received message at the one of the plurality of corner areas where the user interaction is detected.

In a case of displaying a photo content by the first screen, wherein the controller, in response to the detector detecting the user interaction comprising the touch and drag input at the one of the plurality of corner areas of the first screen in a diagonal direction, may control the display to display a second screen that includes at least one icon configured to perform a plurality of tasks on the photographic content at the one of the plurality of corner areas where the user interaction is detected.

The first screen and the second screen are in a rectangular shape, and the first screen and the second screen may share one corner area.

According to an exemplary embodiment, a method for displaying a user terminal device includes displaying a plurality of objects on a grid screen that includes at least one square cell; and in response to detecting a user interaction comprising a touch and drag input at a first object from among the plurality of objects, adjusting a size of the first object by adjusting a number of cells in which the first object is displayed based on a distance and a direction of the touch and drag input.

The adjusting may include, in response to a preset user interaction on the grid screen being detected, changing a mode of the user terminal device to a grid editing mode; and in response to the detecting the user interaction comprising the touch and drag input at the first object during the grid editing mode, determining a square cell in which the first object is displayed based on the distance and the direction of the touch and drag input; and adjusting the size of the first object and displaying the first object on the determined square cell.

The adjusting may include, in response to detecting a first user interaction comprising a touch at the first object and then a drag in an outward direction away from the first object, increasing the size of the first object by increasing a number of square areas in which the first object is displayed, and in response to detecting a second user interaction comprising a touch at the first object and then a drag in an inward direction of the first object, decreasing the size of the first object by decreasing a number of square areas in which the first object is displayed.

The method may include, in response to the first user interaction being detected, moving a part of a plurality of objects except the first object to another rectangular cell area and removing another part from a display screen, and in response to the second user interaction being detected, moving a part of a plurality of objects except the first object to another rectangular cell area and adding a new object to the display screen.

Contents included in the first object may vary according to a number of square cells that the first object occupies.

In response to the first object being displayed on a first number of square cells, the first object may display an icon of an application which corresponds to the first object, wherein, in response to the first object being displayed on a second number of square cells, the first object may display brief information on an application which corresponds to the first object, wherein, in response to the first object being displayed on a third number of square cells, the first object may display detailed information on an application which corresponds to the first object, and wherein, in response to the first object being displayed on a fourth number of square cells, the first object may display an execution screen of an application which corresponds to the first object.

The adjusting may further include, in response to the user interaction changing the first object from a square shape to a rectangular shape, displaying a menu related to the first object at a part of square cells in which the first object is displayed.

The displaying a menu related to the first object may include displaying a menu related to the first object that varies based on a direction of the user interaction.

A grid screen which may include a plurality of rectangular cell or square cells displayed on a display panel in a rectangular shape or square shape.

The method may include, in response to detecting the user interaction comprising a drag at one of a plurality of corner areas included in the first object in a diagonal direction, displaying a screen corresponding to an application represented by the first object on an area where the first object is displayed.

According to an exemplary embodiment, a user terminal device includes a display configured to display a plurality of objects on a grid screen which includes a plurality of rectangular cells; a detector configured to detect a user interaction; and a controller configured to, in response to the detector detecting a user interaction comprising a touch and drag input at a first object from among the plurality of objects, adjust a size of the first object by adjusting a number of cells in which the first object is displayed based on a distance and a direction of the touch and drag input.

The controller, in response to a preset user interaction regarding the grid screen being detected through the detector, may change a mode of the user terminal device to a grid editing mode, and in response to the detector detecting the user interaction comprising the touch and drag input at the first object during the grid editing mode, may determine a rectangular or square cell in which the first object is displayed based on the distance and the direction of the touch and drag input, adjusts size of the first object, and may display the object on the determined rectangular cell or determined square cell.

The controller, in response to the detector detecting a first user action comprising a touch at the first object and then a drag in an outward direction away from the first object, may increase the size of the first object by increasing a number of rectangular cell areas in which the first object is displayed, and in response to the detector detecting a second user interaction comprising a touch at the first object and then a drag in an inward direction of the first object, may reduce the size of the first object by reducing a number of the rectangular cell areas where the first object is displayed.

The controller, in response to the detector detecting the first user interaction, moves a part of a plurality of objects excluding the first object to another square cell, and remove another part from the display screen, and in response to the detector detecting the second user interaction, move a part of a plurality of objects excluding the first object to another rectangular cell area and adds a new object to a display screen.

Contents included in the first object may be different or may vary according to a number of rectangular cells or square cells that the first object occupies.

The controller, in response to the first object being displayed on a rectangular cell of a first number, may display an icon of an application which corresponds to the first object, in response to the first object being displayed on a rectangular cell of a second number, display brief information of an application which corresponds to the first object, in response to the first object being displayed on a rectangular cell of a third number, display detailed information of an application which corresponds to the first object, and in response to the first object being displayed on a rectangular cell of a fourth number, control the display to display an execution screen of the application which corresponds to the first object.

The controller, in response to the user interaction changing the first object from a square shape to a rectangular shape, may control the display to display a menu related to the first object at a part of the plurality of square cells in which the first object is displayed.

The controller may control the display to display the menu related to the first object in different shapes based on a direction of the user interaction.

The display may display the grid screen including the plurality of square cells on a squared shaped display panel.

The controller, in response to the detector detecting the user interaction comprising a drag at one of a plurality of corner areas included in a first object in a diagonal direction, may control the display to display a screen corresponding to an application represented by the first object on an area where the first object is displayed.

According to an exemplary embodiment, a method for displaying of a user terminal device is provided. The method includes: displaying a first screen; and in response to detecting a touch and drag input at one of a plurality of corner areas of the first screen, displaying a second screen at the one of the plurality of corner areas where the touch and drag input was detected while at least a part of the first screen remains displayed.

According to an exemplary embodiment, a method for displaying of a user terminal device is provided. The method includes: displaying a plurality of objects on a display screen, the display screen made up of a grid comprising a plurality of cells; and in response to detecting a touch and drag input at a first object from among the plurality of objects, adjusting a size of the first object by adjusting a number of cells from among the plurality of cells in which the first object is displayed based on a distance and a direction of the touch and drag input.

As described above, according to the various exemplary embodiments, a user may perform various functions through a user terminal device having a display panel in a rectangular shape. Accordingly, user convenience and satisfaction may be improved.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
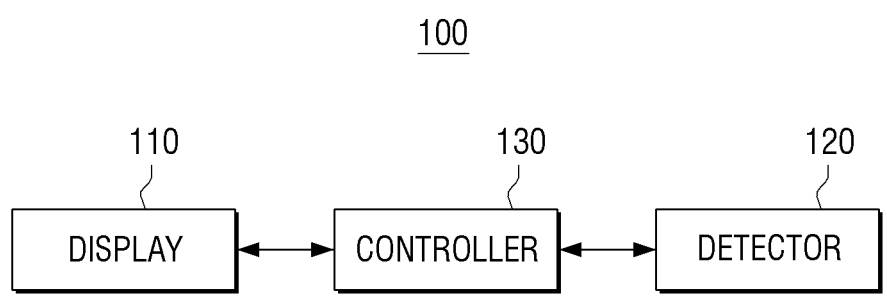
FIG. 1 is a block diagram schematically illustrating a configuration of a user terminal device according to an exemplary embodiment.

In the following description, the same reference numerals are used to denote analogous elements, even when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they may obscure exemplary embodiments with unnecessary detail.

In the present disclosure, relational terms such as first and second, and the like, may be used to distinguish one entity from another, without necessarily implying any actual relationship or order between such entities.

The terms used in the present application are provided to merely explain specific exemplary embodiments and are not intended to limit the scope of the inventive concept. A singular term includes a plural form unless clearly defined otherwise. The terms "include" and "configured to" in the description of the present application are used to indicate that there are features, numbers, steps, operations, elements, parts or combination thereof, and they should not exclude the possibility of combination or addition of one or more features, numbers, steps, operations, elements, parts, or combination thereof.

In an exemplary embodiment, 'a module' or 'a unit' may perform at least one function or operation, and may be realized as hardware, software, or combination thereof. In addition, a plurality of 'modules' or 'units' may be integrated into at least one module and may be realized as at least one process (not shown) except for 'modules' or 'units' that should be realized in specific hardware.

Hereinafter, exemplary embodiments will be described in more detail with reference to the accompanying drawings. FIG. 1 is a block diagram schematically illustrating a configuration of a user terminal device 100 according to an exemplary embodiment. As illustrated in FIG. 1, the user terminal device 100 includes a display 110, a detector 120, and a controller 130. In this case, the user terminal device 100 may be implemented as a television (TV), personal computer (PC), laptop PC, cellular phone, tablet PC, a personal digital assistant (PDA), MPEG audio layer-3 (MP3) player, kiosk, a digital photo frame, a table display apparatus, or the like. When a user terminal device is implemented as a portable type apparatus such as cellular phone, tablet PC, PDA, MP3 player, laptop PC, or the like, a user terminal device may be named a mobile device, but in the present specification, a user terminal device will be used.

The display 110 displays various image data and a user interface (UI). In particular, the display 110 may include a square-shaped display panel, and display at least one object (for example, an icon) having a square shape on a square-shaped display panel. In addition, the display 110 may provide various UIs and screens according to a user interaction detected through the detector 120.

The display 110 may be combined with a touch detector included in the detector 120 and may be realized as a touch screen.

The detector 120 detects a user interaction. In particular, the detector 120 may include a touch detector which detects the user touch interaction. In addition, the detector 120, after touching one of a plurality of corner areas included in the display 110 through the touch detector, may detect a dragging interaction to drag the touched area in a diagonal direction.

The controller 130 controls overall operations of the user terminal device 100. In particular, the controller 130 may control the user terminal device 100 which has a square-shaped display panel according to various user interactions which are detected through the detector 120.

In an exemplary embodiment, while the display 110 displays a first screen, when a user interaction to touch one of corner areas of the first screen and then drag the touch along the screen is detected, the controller 130 may control the display 110 to display a second screen on a touched location of the corner area in which the user interaction is detected while at least a part of the first screen is being displayed. In this case, the first screen and the second screen have a square shape, and the first screen and the second screen may share one corner area. Here, the corner area where the first screen and the second screen share may be a corner area where the user interaction is detected. However, the first screen and the second screen according to an exemplary embodiment do not indicate physically separated screens, instead, the screens indicate screens as a logical layout to display contents, applications, or the like. In other words, while the second screen is hidden by the first screen, and only the first screen is being displayed, when a user interaction is detected at a corner area of the first screen, the controller 190 may control the display 110 to fold a corner area of the first screen in which the user interaction is detected, and display the second screen which was hidden by the folded corner area.

In particular, the display 110 which includes a square-shaped display panel may display a square-shaped first screen. In this case, when a user interaction to touch and drag one of the four corners of the first screen is detected through the detector 120, the controller 130 may control the display 110 to display the second screen on the folded corner area, as the corner area in which the user interaction is detected within the first screen is folded by a user interaction.

In this case, the second screen which is displayed on a corner area may include different information in accordance with locations of corner areas in which a user interaction is detected, from among the four corners of the first screen. For example, the controller 130 may control the display 110 to display one of information on an application which is being executed, information to guide to a home screen, information on a status of a current terminal device, and information of quick access to an application designated by a user, according to positions of the corner areas where a user interaction is detected.

In addition, a size of the second screen which is displayed at a corner area may be different according to a distance between the start and end of the dragging user interaction. In particular, the controller 130 may increase a size of the second screen in proportion to a length of the dragging of a user interaction.

In addition, the amount of information included in the second screen may be configured differently in accordance with size of the second screen. That is, the controller 130 may control to increase an amount of information included in the second screen when as size of the second screen becomes larger.

While a user interaction to drag in a diagonal direction is detected, when the user interaction is continued to a corner area of an opposite side, the controller 130 may control the display 110 to replace the first screen which is displayed on the display 110 with the second screen. In other words, the controller 130 may control the display 110 to remove the first screen, and display the second screen as a full screen when the distance traveled by a dragging gesture from one corner area to an opposite corner area is greater than a predetermined distance or when the dragging gesture passes a certain point on the screen.

The second screen may include different information according to types of image contents or applications displayed on the first screen. For example, when an image content which is displayed on the first screen is a broadcast content, the second screen may display information (for example, a program name, channel number, channel name, or the like) related to the displayed broadcast contents on the first screen. When the image contents displayed on the first screen are photo contents, the second screen may display at least one icon which may perform various tasks related to the photo contents displayed on the first screen.

In addition, when a message is received from another device, the controller 130 may control the display 110 to display on the second screen at least one of an icon which indicates that a message is received or information about the received message.

As an another exemplary embodiment, while the display 110 displays a plurality of objects on a grid screen which includes a plurality of square cells, when a user interaction to touch and drag a first object from among the plurality of objects is detected through the detector 120, the controller 130 may adjust size of the first object by adjusting the number of cells in which the first object is displayed in accordance with the length and the direction of the dragging of the user interaction.

In particular, the display 110 may display on a display panel in a square shape a grid screen which includes a plurality of square-shaped cells. In this case, in the plurality of square cells, at least one object may be displayed. The object may occupy at least one square cell and may have rectangular or square shape.

While the display 110 displays a grid screen, when a preset user interaction regarding the grid screen is detected through the detector 120, the controller 130 may change a mode of the user terminal device 100 to a grid editing mode.

During the editing mode, when a user interaction to drag a first object from among a plurality of objects is detected, the controller 130 may control the display 110 to determine a square cell in which the first object is displayed in accordance with length and direction of dragging of the user interaction, and adjust a size of the first object and display the first object on the determined square cell.

In particular, when the first user interaction to touch the first object and drag the first object in an outward direction is detected, the controller 130 may increase the number of square cell areas in which the first object is displayed and increase a size of the first object. In this case, the controller 130 may control the display 110 to move a part of a plurality of objects excluding the first object to other square cell areas, and remove another part from the display screen.

When a second user interaction to touch the first object and drag the first object in an inward direction of the first object is detected, the controller 130 may reduce the number of square cells in which the first object is displayed, and reduce size of the first object. In this case, the controller 130 may control the display 110 to move a part of a plurality of objects excluding the first object to another square cell area, and add a new object to the display screen.

The contents included in the first object may be different in accordance with the number of square cells in which the first object occupies. In particular, when the first object is displayed on a square cell of a first number (for example, one), the controller 130 may control the display 110 to display on the first object an icon of an application which corresponds to the first object. In addition, when the first object is displayed in a second number (for example, four) of square cells, the controller 130 may control the display 110 to display on the first object brief information of an application which corresponds to the first object. Further, when the first object is displayed on a third number (for example, nine) of square cells, the controller 130 may control the display 110 to display on the first object detailed information of an application which corresponds to the first object. Further, if the first object is displayed on a fourth number (for example, sixteen) of square cells, the controller 130 may control the display 110 to display on the first object an execution screen of an application which corresponds to the first object.

In the aforementioned exemplary embodiment, four different types of contents are provided according to size of an object, but this is merely exemplary, and a plurality of different contents may be provided according to a size of the object.

While the first object maintains a square shape and then the first object is changed to a rectangular shape according to a user interaction, the controller 130 may control a display 110 to display a menu which is related to the first object from among square cells in which the first object is displayed. In this case, the controller 130 may control the display 110 to display a menu which is related to the first object that has different shapes according to directions of a user interaction.

In addition, when a user interaction to touch one of the corner areas included in the first object, from among a plurality of objects, and a drag in a diagonal direction is detected through the detector 120, the controller 130 may control the display 110 to display on an area where the first object is displayed a screen regarding an application which corresponds to the first object.

As described above, according to the various exemplary embodiments, a user may perform various functions through a user terminal device having a square-shaped display panel.

Figure 2:
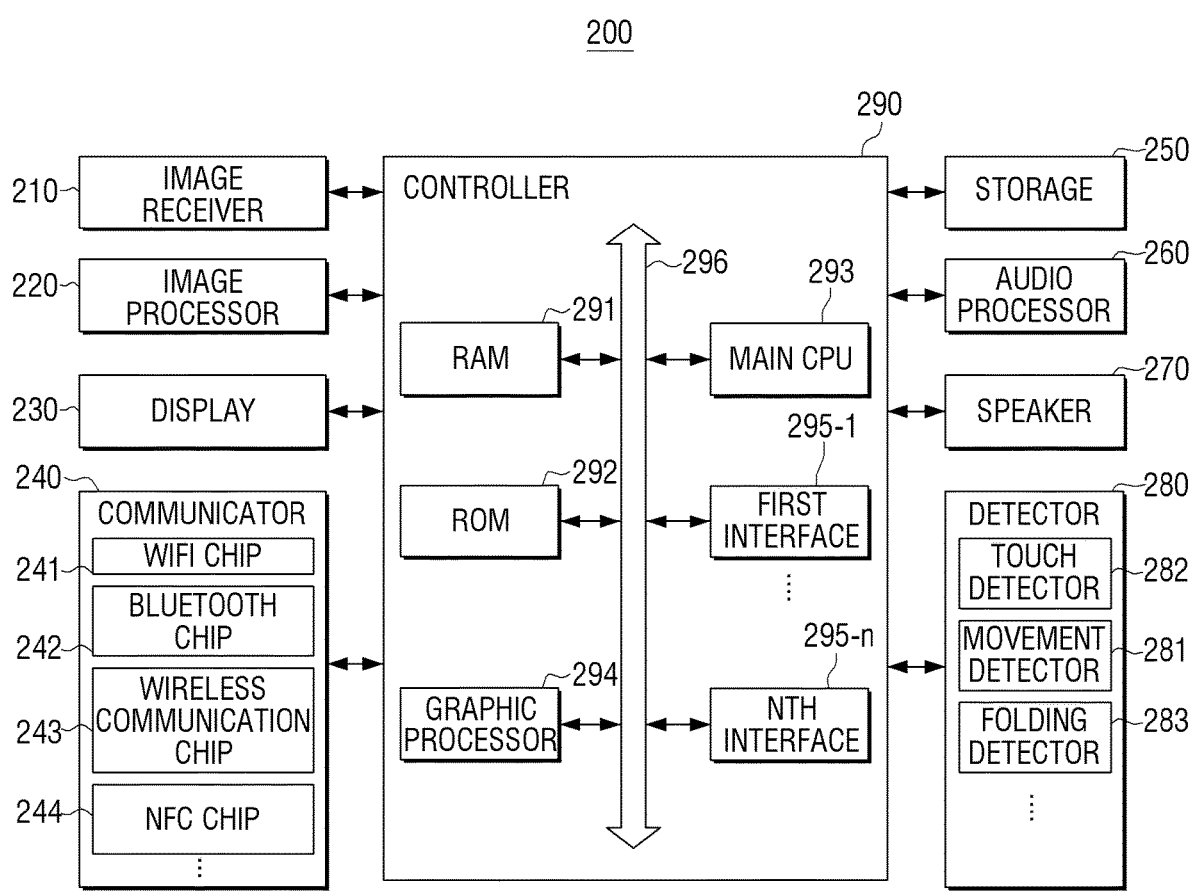
FIG. 2 is a block diagram illustrating in detail a configuration of a user terminal device according to an exemplary embodiment.

Hereinbelow, exemplary embodiments will be explained in further detail with reference to FIGS. 2-46B. FIG. 2 is a block diagram illustrating in detail a configuration of a user terminal device 200 according to an exemplary embodiment. As illustrated in FIG. 2, the user terminal device 200 includes the image receiver 210, an image processor 220, a display 230, a communicator 240, a storage 250, an audio processor 260, a speaker 270, a detector 280, and a controller 290.

FIG. 2 comprehensively illustrates various elements by way of example of the user terminal device 200 that has various functions such as contents providing function and display function. Accordingly, according to an exemplary embodiment, a part of the elements illustrated in FIG. 2 may be omitted or changed, or other components may be further added.

The image receiver 210 receives image data through various sources. For example, the image receiver 210 may receive broadcasting data from an external broadcasting station, receive video on demand (VOD) data from an external server in real-time, and receive image data from an external device.

The image processor 220 is an element which processes image data received from the image receiver 210. The image processor 220 may perform various image processing with respect to image data, such as decoding, scaling, noise filtering, frame rate conversion, and/or resolution conversion.

The display 230 displays at least one of a video frame which is generated as the image processor 220 processes image data received from the image receiver 220 and various screens generated by a graphic processor 293.

Figure 3A:
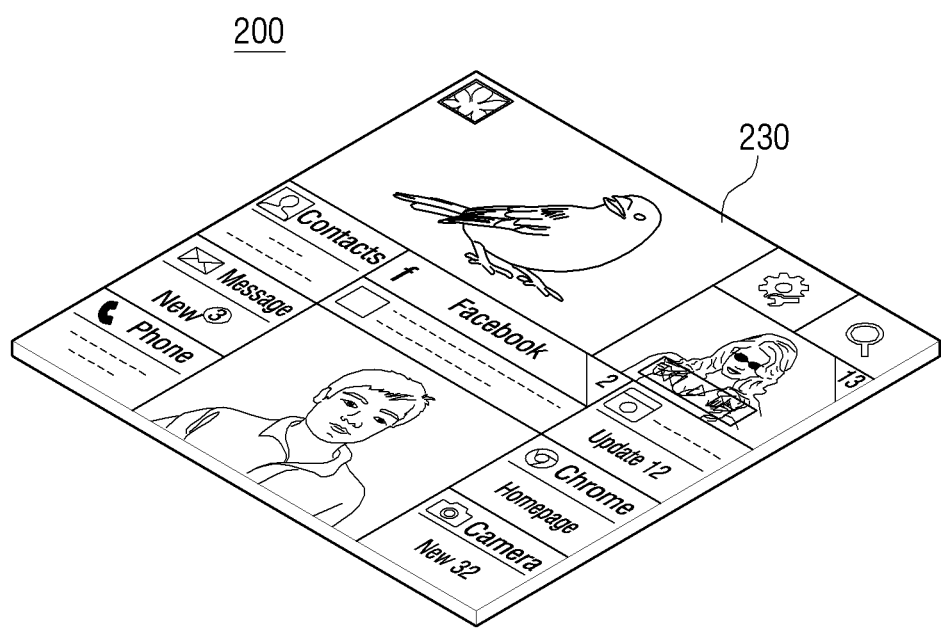
FIGS. 3A to 3C are views illustrating a user terminal device which has a square-shaped display panel according to an exemplary embodiment.

In particular, the display 230 may include a display panel to output image data and a driver to drive a display panel. In this case, the display panel may have square shape as illustrated in FIG. 3A. In addition, the display panel may include a hinge 310 at a center of the square-shaped display panel and may be folded around the hinge 310 as shown in FIG. 3B.

Figure 3B:
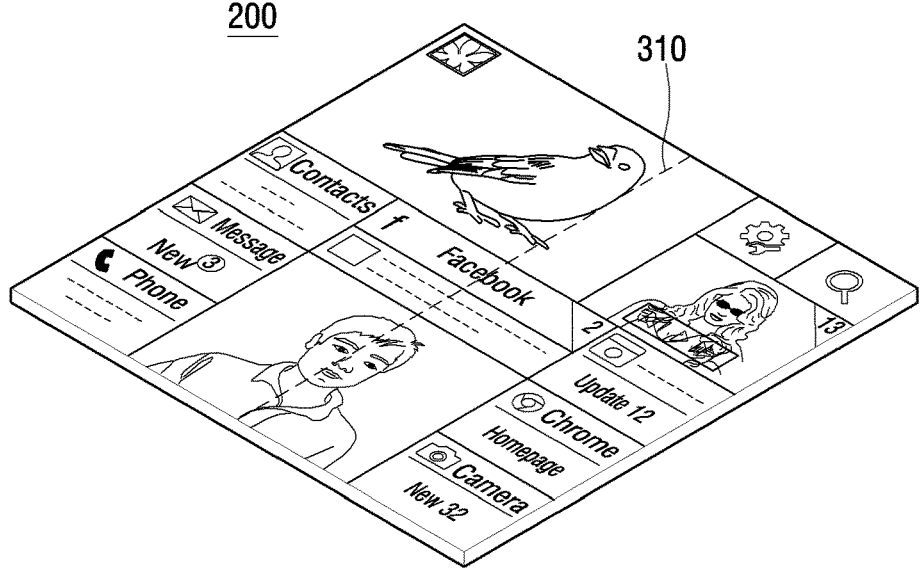
Figure 3B:
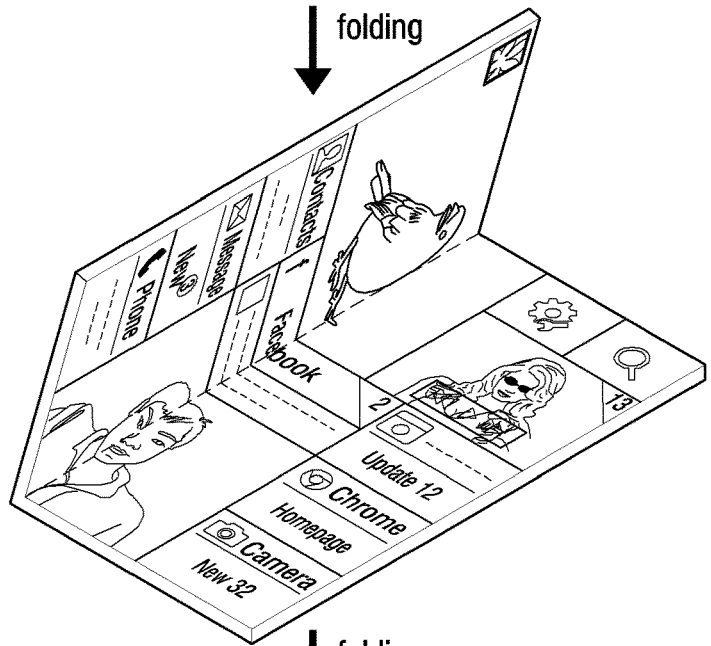
Figure 3B:
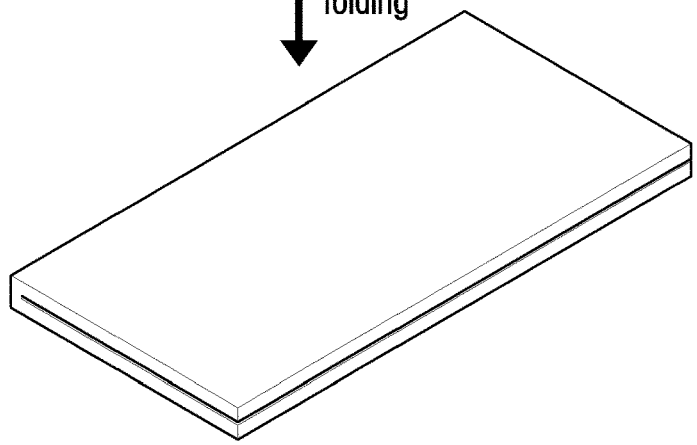
Figure 3C:
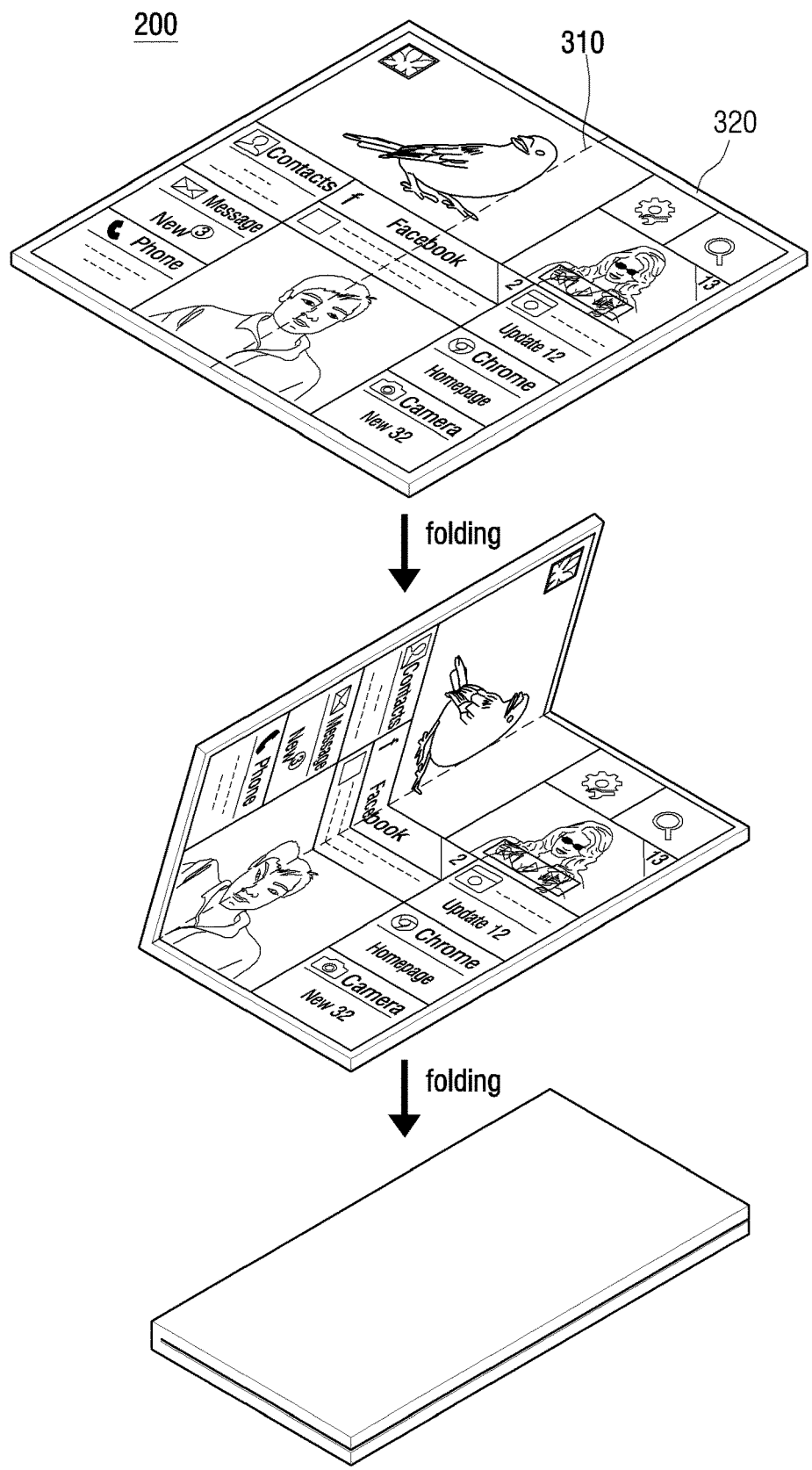

FIG. 3B shows that the display 230 does not include bezel, but this is merely exemplary, and as illustrated in FIG. 3C, a bezel 320 which houses a square-shaped display panel may be included.

In this case, the bezel 320 may include a touch detector which senses a user touch, a proximity detector, or the like.

The communicator 240 is configured to perform communication with various types of external devices according to various types of communication methods. The communicator 240 may include one or more of a Wi-Fi chip 241, a Bluetooth chip 242, a wireless communication chip 243, and an NFC chip 244. The controller 290 performs communication with various external devices using the communicator 240.

In particular, the Wi-Fi chip 241 and the Bluetooth chip 242 perform communication using Wi-Fi method and Bluetooth method respectively. In the case of using the Wi-Fi chip 241 or the Bluetooth chip 242, connection information such as SSID and a session key may be received and transmitted first, and communication may be connected using the connection information, and then, various information may be received and transmitted. The wireless communication chip 243 indicates a chip which performs communication in accordance with various communication standards such as IEEE, ZigBee, 3rd generation (3G), 3rd generation partnership project (3GPP), and long term evolution (LTE) or the like. The NFC chip 244 indicates a chip which operates using near field communication (NFC) method using 13.56 MHz band from among RF-ID frequency bands such as 135 kHz, 13.56 MHz, 433 MHz, 860~960 MHz, and 2.45 GHz.

Figure 4:
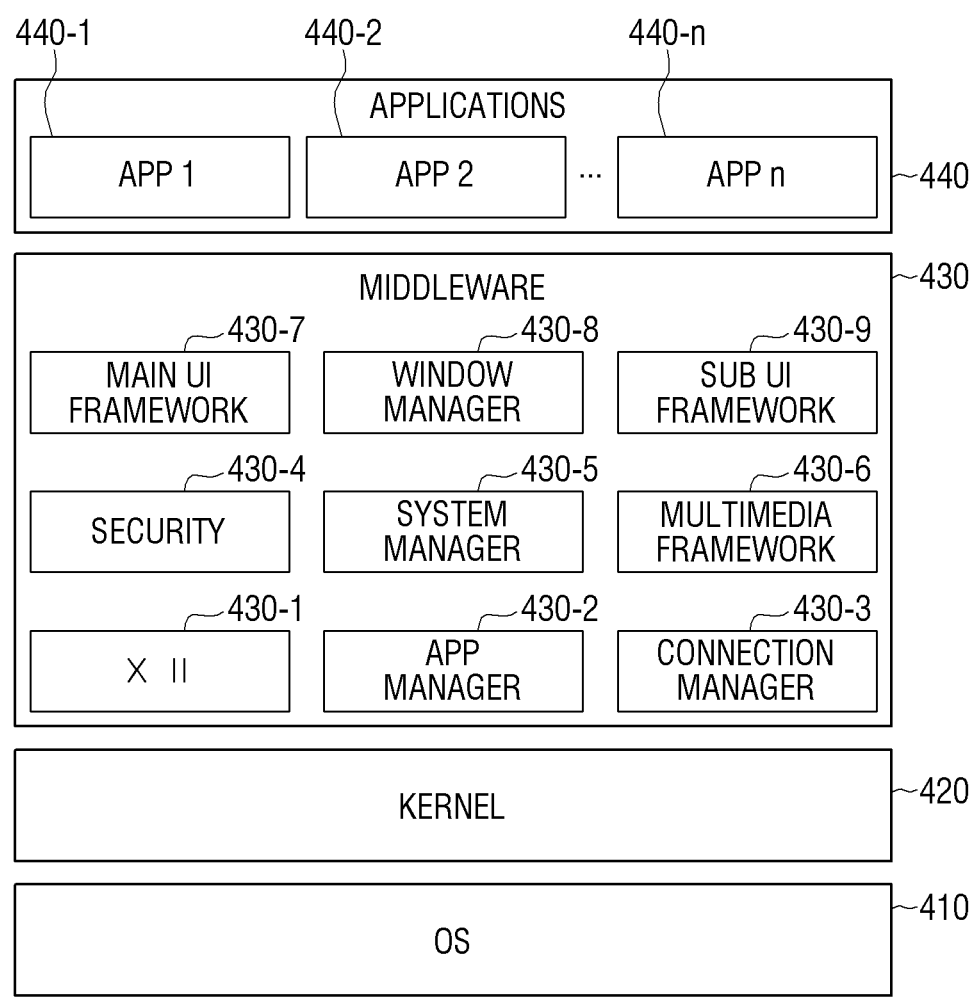
FIG. 4 is a view to describe a configuration of software stored in a storage according to an exemplary embodiment.

The storage 250 may store various programs and data required for the operations of the user terminal device 200. In particular, the storage 250 may store programs and data to configure various screens which are to be displayed on a main area and a sub area. Hereinbelow, FIG. 4 is a view to describe structure of software stored in the user terminal device 200. According to FIG. 4, the storage 250 may store software including OS 410, kernel 420, middleware 430, and application 440.

An operating system (OS) 410 performs a function to control and manage overall operations of hardware. In other words, the OS 410 manages hardware and is responsible for basic functions such as memory and security.

The kernel 420 plays a role as a path which transmits various signals including a touch signal detected by the display 230 to the middleware 430.

The middleware 430 includes various software modules which control the operations of the user terminal device 200. According to FIG. 4, the middleware 430 includes an X11 module 430-1, an APP manager 430-2, a connection manager 430-3, a security module 430-4, a system manager 430-5, a multimedia framework 430-6, a main user interface (UI) framework 430-7, a window manager 430-8, and a sub UI framework 430-9.

The X11 module 430-1 is a module which receives various event signals from various hardware provided in the user terminal device 200. Here, an event may be set in a various manner such as an event to sense a user gesture, an event to generate a system alarm, and an event to execute or terminate a specific program.

The APP manager 430-2 is a module which manages execution status of various applications 440 installed in the storage 250. The APP manager 430-2, when an event to execute an application is detected from the X11 module 430-1, calls and executes an application which corresponds to this event.

The connection manager 430-3 is a module to support wired or wireless network connection. The connection manager 430-3 may include various sub modules such as a DNET module and a universal plug and play (UPnP) module.

The security module 430-4 is a module which supports certification, permission, security storage with respect to hardware.

The system manager 430-5 monitors a state of each element within the user terminal device 200, and provides a result the monitoring to other modules. For example, when remaining battery life is not sufficient, an error occurs, or a communication connection is broken down, the system manager 430-5 provides a monitoring result to the main UI framework 430-7 or the sub UI framework 430-9 and output an alarm message or an alarm sound.

The multimedia framework 430-6 is a module to play back multimedia contents stored in the user terminal device 200 or provided from an external source. The multimedia framework 430-6 may include a player module, a camcorder module, and a sound processing module. Accordingly, the multimedia framework 430-6 may reproduce various multimedia contents and play back screens and sounds.

The main UI framework 430-7 is a module to provide various UIs to be displayed on a main area of the display 230, and the sub UI framework 430-9 is a module to provide various UIs to be displayed on a sub area. The main UI framework 430-7 and the sub UI framework 430-9 may include an image compositor module which generates various objects, a coordinate compositor module which calculates coordinates to display an object, a rendering module which renders the generated object on the calculated coordinate, and a 2D/3D UI toolkit which provides a tool to generate a UI in 2D or 3D format, or the like.

The window manager 430-8 may sense a touch event using the body or a pen of a user or other input events. The window manager 430-8, when an event is detected, may transmit an event signal to the main UI framework 430-7 or the sub UI framework 430-9 so that an operation corresponding to the event is performed.

In addition, when a user touches and drags a screen, a writing module to draw a line following a drag trace and various program modules to calculate pitch angle, roll angle, yaw angle based on a detector value detected by the movement detector 281.

The application module 440 include applications 440-1~440-n to support various functions. For example, a program module to provide various services such as a navigator program module, a game module, an e-book module, a calendar module, an alarm management module, or the like may be included. These applications may be installed as default or may be arbitrarily installed by a user in the midst of using the applications. The main CPU 293, when an object is selected, may execute an application which corresponds to a selected object using the application module 440.

The software structure illustrated in FIG. 4 is merely exemplary, and is not limited thereto. Therefore, there may be omission, modification, and addition to the embodiments, if necessary. For example, various programs may be additionally stored in the storage 250 such as a sensing module to analyze signals detected by various detectors, a messaging module such as a messenger program, a short message service (SMS) & multimedia message service (MMS) program, an e-mail program, a call info aggregator program module, a voice over internet protocol (VoIP) module, a web browser module, or the like.

Referring back to FIG. 2, the audio processor 260 is an element to process audio data of an image content. In the audio processor 260, various processes such as decoding, amplification, nose filtering of audio data may be performed. The audio data processed by the audio processor 260 may be output to the audio outputter 270 (i.e., a speaker).

The audio outputter 270 has a configuration to output not only various audio data for which various processes such as decoding, amplification, noise filtering are performed by the audio processor 260, but also various alarm sounds or an audio message. In particular, the audio outputter 270 may be implemented as a speaker, but this is merely exemplary, and may be realized as an output terminal which may output audio data.

The detector 280 senses various user interactions. In particular, the detector 280, as illustrated in FIG. 2, may include the touch detector 282, the movement detector 281, and the bending detector 283 (i.e., a folding detector, etc.), as illustrated in FIG. 2.

In particular, the touch detector 282 may sense a user's touch interaction using a touch panel attached to a back of a display panel. The movement detector 281 may sense movements (for example, rotation movement, or the like) of the user terminal device 200 using at least one of an acceleration detector, a terrestrial magnetism detector, a Gyro detector. The bending detector 283 may sense whether a user terminal device is bent around the hinge 310, by using a bending detector and an illumination detector, or the like.

The controller 290 controls overall operations of the user terminal device 200 using various programs stored in the storage 250.

The controller 290, as illustrated in FIG. 2, includes a RAM 291, a ROM 292, a graphic processor 294, a main CPU 293, first to nth interface 295-1~295-$n$, and bus 296. In this case, the RAM 291, the ROM 292, the graphic processor 294, the main CPU 293, and the first to the nth interface 295-1~295-$n$ may be connected with each other through the bus 296, or the like.

In the ROM 292, a command set for system booting is stored. When a turn-on command is input and power is supplied, the main CPU 293 copies an operating system (O/S) stored in the storage 250 according to a command stored in the ROM 292 to the RAM 291, executes the O/S, and boots the system. When booting is completed, the main CPU 293 copies various application programs stored in the storage 250 to the RAM 291, executes the application programs copied to the RAM 291, and perform various operations.

The graphic processor 294, by using the calculator (not shown) and the renderer (not shown), generates a screen including various objects such as an item, an image, a text, or the like. The calculator, by using a control command received from the detector 280, calculates attribute values such as a coordinate value to which each object is displayed according to a layout of a screen, type, size, or color. The renderer generates a screen of various layouts including objects based on the attribute values calculated by the calculator. The screen generated by the renderer is displayed within a display area of the display 230.

The main CPU 293, by accessing the storage 250, performs booting using the O/S stored in the storage 250. In addition, the main CPU 293 performs various operations using various programs, contents, data stored in the storage 250.

The first to the nth interface 295-1 to 295-$n$ are connected to the above-described various elements. One of the interfaces may be network interface which is connected to the external apparatus through network.

In particular, the controller 290 may provide various functions regarding the user terminal device 200 having a display panel in a rectangular shape.

<User Interaction Regarding a Corner Area>

According to an exemplary embodiment, while the display 230 displays the first screen, when a user interaction (hereinafter "diagonal interaction") that one of the corner areas of the first screen is touched and dragged in a diagonal direction is detected through the detector 280, the controller 290, while at least a part of the first screen is being displayed, may control the display 230 to display the second screen on a touch location of the corner area where the diagonal interaction is detected. Hereinbelow, with reference to FIGS. 5A to 18C, various functions provided by the user terminal device 200 according to the diagonal interaction will be described.

Figure 5A:
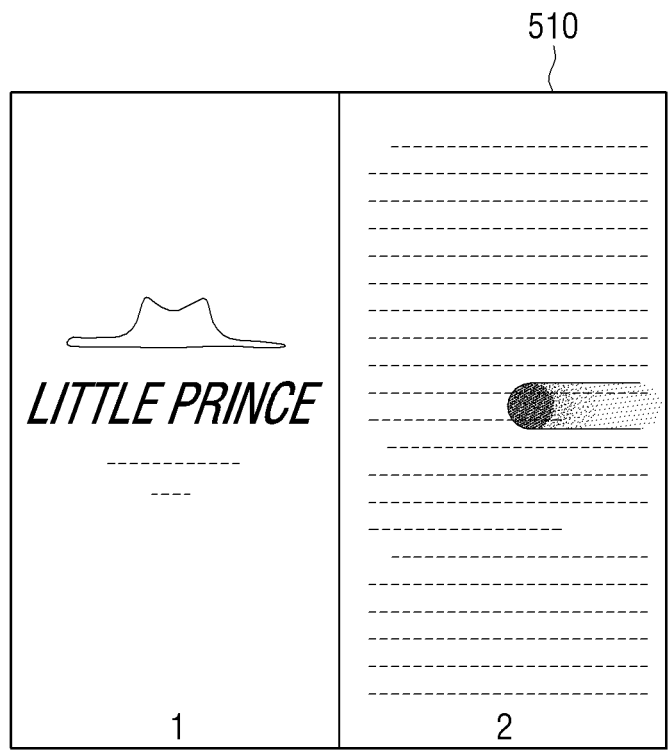
FIGS. 5A to 18C are views illustrating performing various functions according to user interaction regarding a corner area, according to various exemplary embodiments.
Figure 5A:
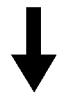
Figure 5A:
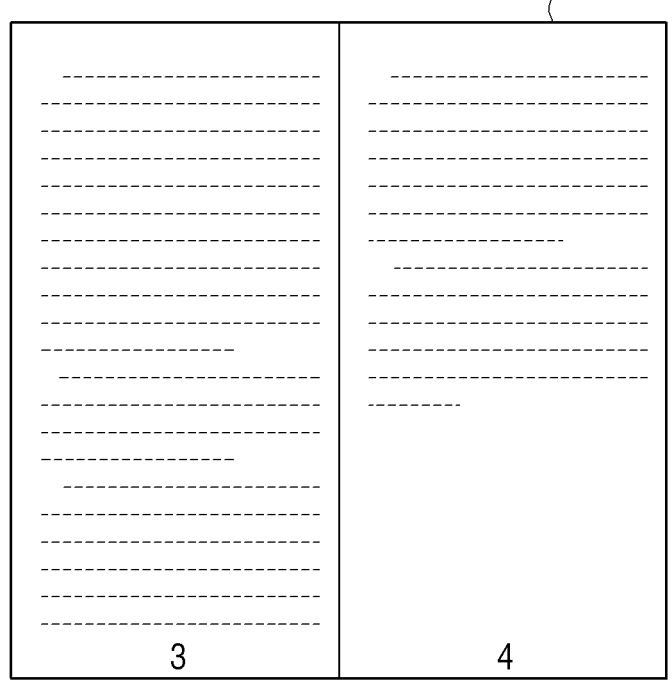
Figure 5B:
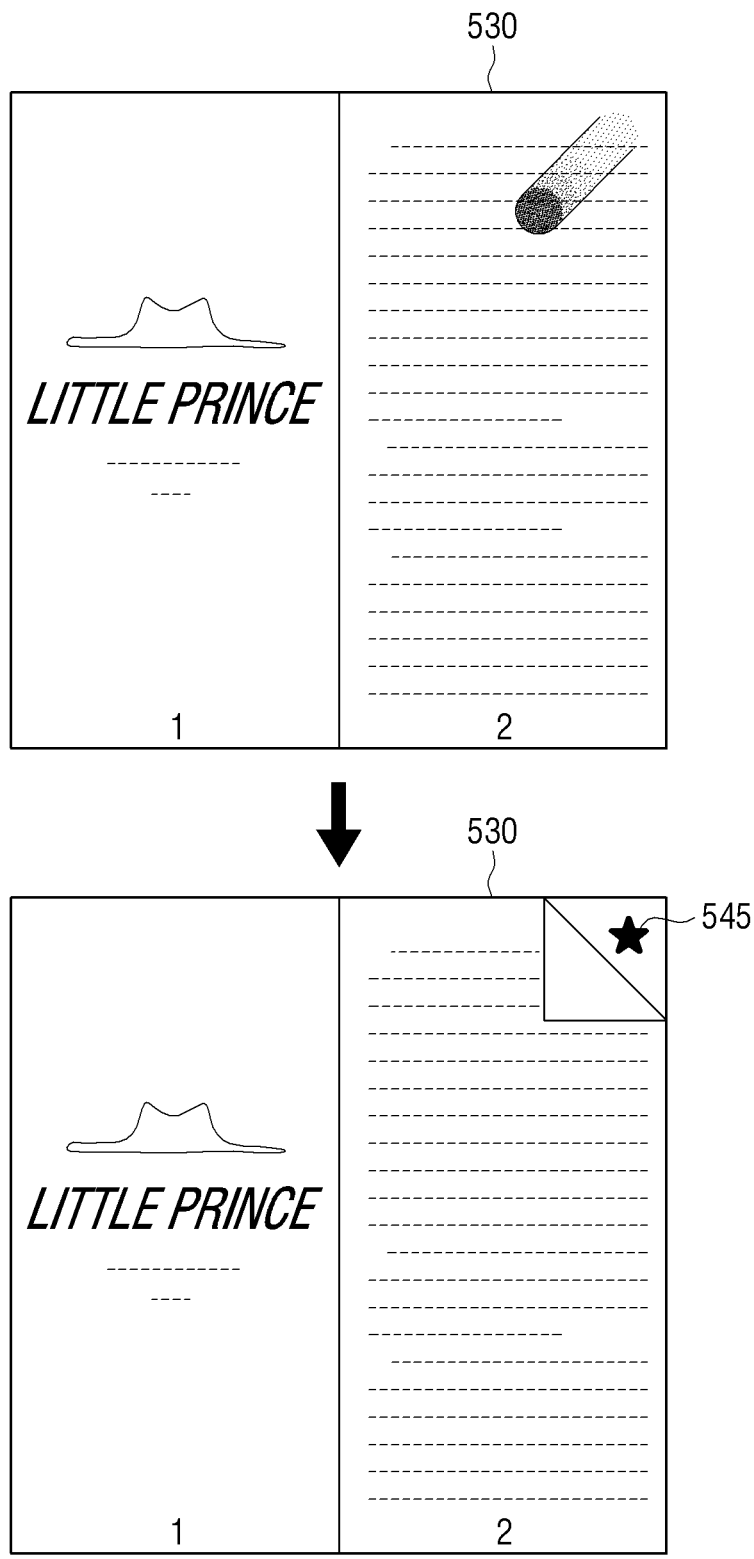

FIGS. 5A and 5B are views to describe a function provided by the user terminal device 200, when a user interaction in a width direction and a diagonal interaction are detected.

As illustrated in FIG. 5A, while a first page 510 of the e-book contents is displayed on a display screen, when a user interaction to drag from a plurality of corners or an edge of the display screen in a width direction (in particular, a left direction) is detected, the controller 290 may control the display 230 to convert a page of the e-book contents to a next page, and convert to a second page 520 of the e-book contents.

As illustrated in FIG. 5B, while a third page 530 of the e-book contents is displayed on a display screen, when a diagonal interaction is detected at one of a plurality of corner areas included in the display screen, the controller 290 may control the display 230 to maintain a current page screen, provide an image effect where the corner area where the diagonal interaction is detected is folded, and display a bookmark icon 545 at the folded corner area.

In addition, the controller 290 may include information on a function which the user terminal device 200 may provide on the second screen according to a position of the corner area where the diagonal interaction is detected from among four corner areas of the first screen.

Figure 6A:
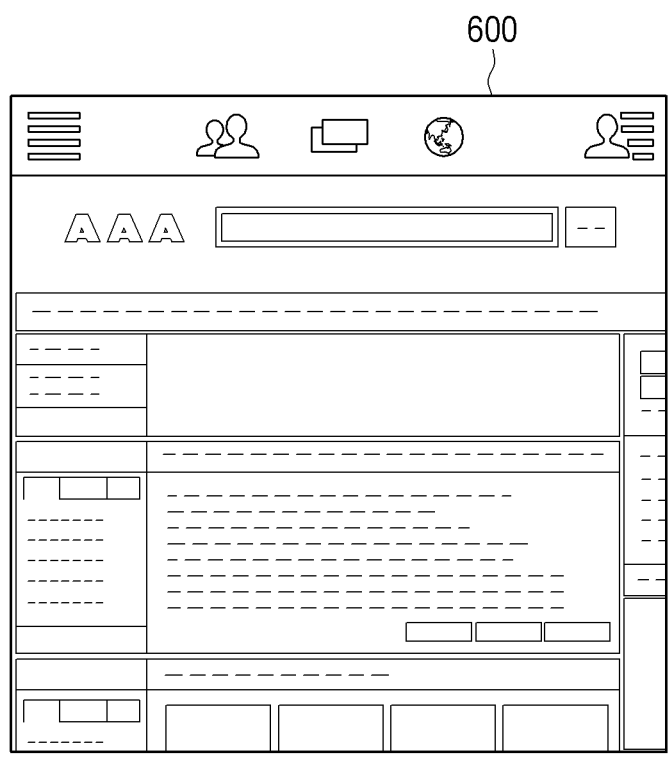

In particular, as illustrated in FIG. 6A, the controller 290 may control the display 230 to display the image contents 600.

Figure 6B:
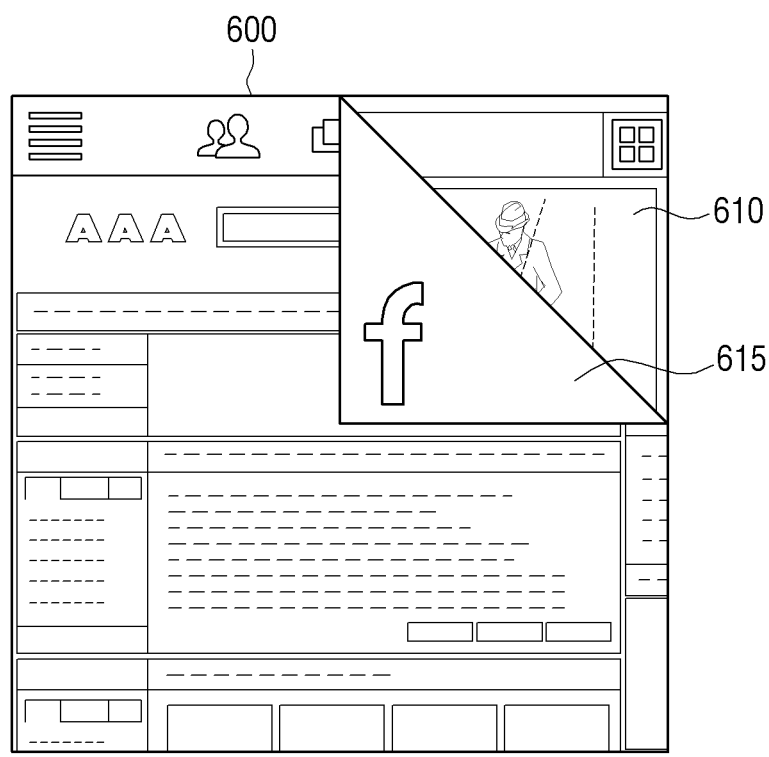

While the image contents 600 are displayed, when a diagonal interaction is detected at a corner area in a right upper end portion, the controller 290, as illustrated in FIG. 6B, may control the display 230 to display information 615 (for example, an icon, a recently-executed screen, or the like) on the most recently executed application at a corner area in a right upper end portion where the diagonal interaction is detected, and the execution screen 610 on the application most recently executed. In this case, while the information 615 on the most recently executed application is displayed along with the image contents 600, when the diagonal interactions are sequentially detected at a corner area in a right upper end portion, the controller 290 may control the display 230 to display information on the second most recent application at a right top corner area where the diagonal interaction is detected.

Figure 6C:
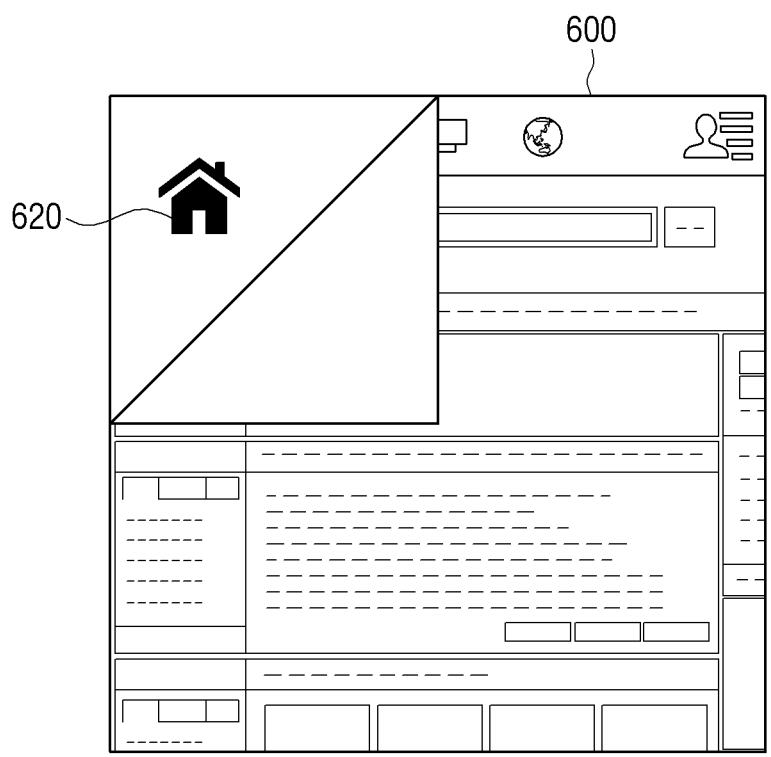

While the image contents 600 are displayed, the diagonal interaction is detected at a corner area in a left upper end portion, the controller 290, as illustrated in FIG. 6C, may control the display 230 to display information 620 (for example, an icon) which indicates that moving to a home screen is available at a corner area in a left upper end portion where a diagonal interaction is detected. In this case, when the diagonal interaction is continued to a corner area in a right lower end portion, the controller 290 may control the display 230 to display a home screen.

Figure 6D:
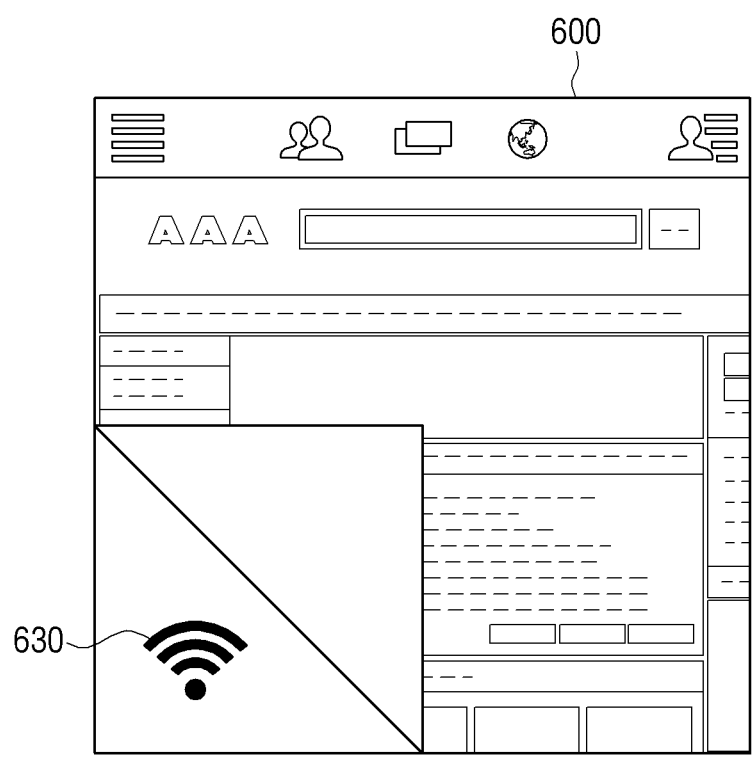

While the image contents 600 are displayed, when a diagonal interaction is detected at a corner area in a left lower end portion, the controller 290, as illustrated in FIG. 6D, may control the display 230 to display status information (for example, network information, battery information, etc.) of the user terminal device 200 at left bottom corner area where the diagonal interaction is detected.

Figure 6E:
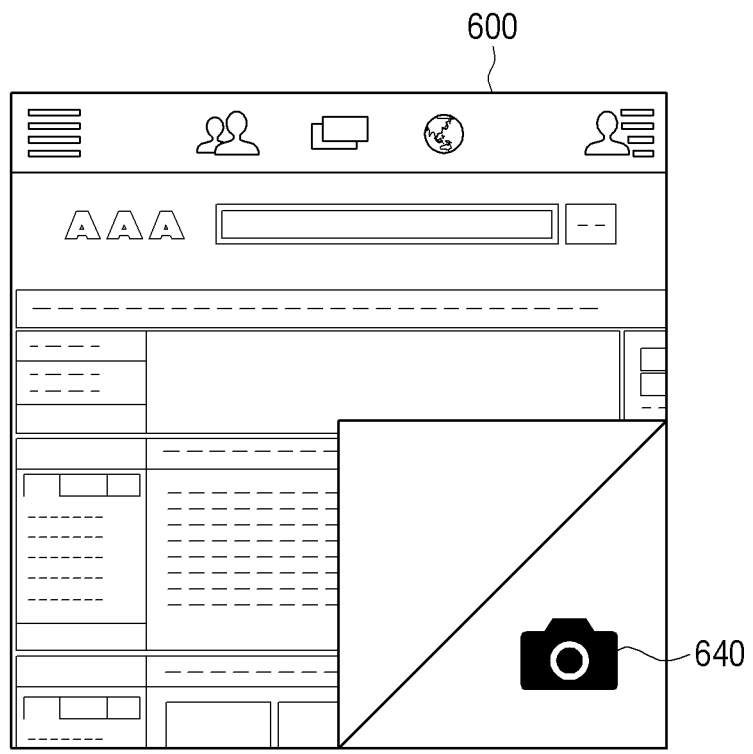

While the image contents 600 are displayed, when the diagonal interaction is detected at a corner area in a right lower end portion, the controller 290, as illustrated in FIG. 6E, may control the display 230 to display quick access information 640 (for example, an icon corresponding to the camera application) on the application designated by a user at a right bottom corner area where the diagonal interaction is detected.

In addition, when the diagonal interaction is detected at a lock screen, the controller 290 may control the display 230 to display information on an object regarding which the diagonal interaction is detected at a lock screen.

Figure 7A:
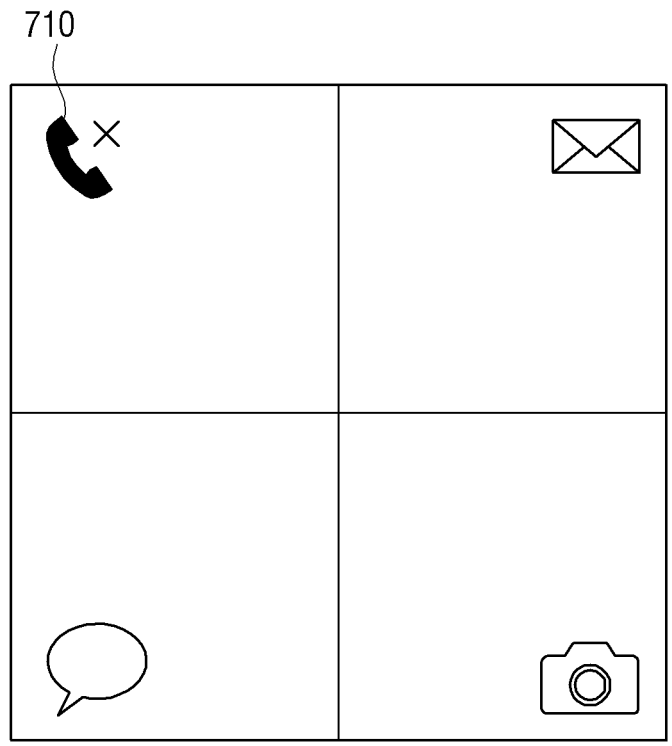
Figure 7B:
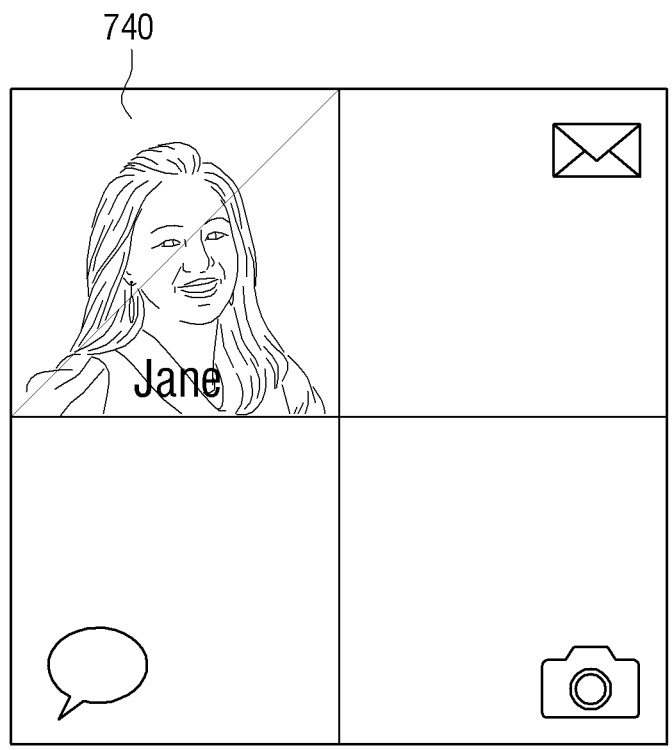

In particular, as illustrated in FIG. 7A, while four objects are displayed on a lock screen, when the diagonal interaction is detected at the first object 710 which indicates a missed call, the controller 290, as illustrated in FIG. 7B, may control the display 230 to display information 740 (such as information on a caller of the missed call) regarding the missed call at an area where the first object 710 is displayed.

However, as described in FIGS. 7A and 7B, the feature of providing information about a missed call on a lock screen by the controller 290 is merely an example, and various information and functions may be provided on a lock screen through the diagonal interaction. For example, the controller 290 may provide information about a received message through diagonal interaction at a lock screen, and provide a quick access function regarding a camera application.

In addition, the controller 290, from among four corner areas of the first screen, may include information regarding the functions which the user terminal device 200 may provide according to location of a corner area where the diagonal interaction is detected, and application functions, on the second screen.

Figure 8A:
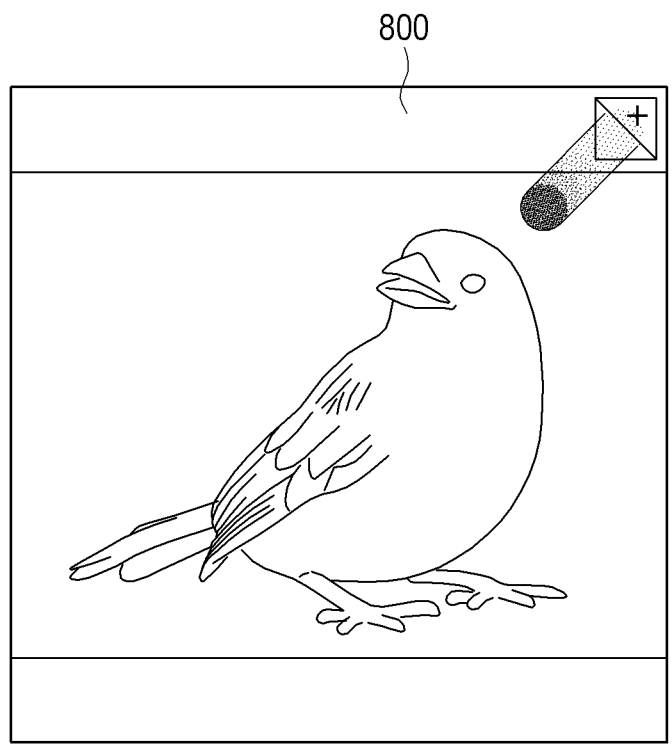

In particular, as illustrated in FIG. 8A, the controller 290 may cause the display 230 to display a photo content 800.

Figure 8B:
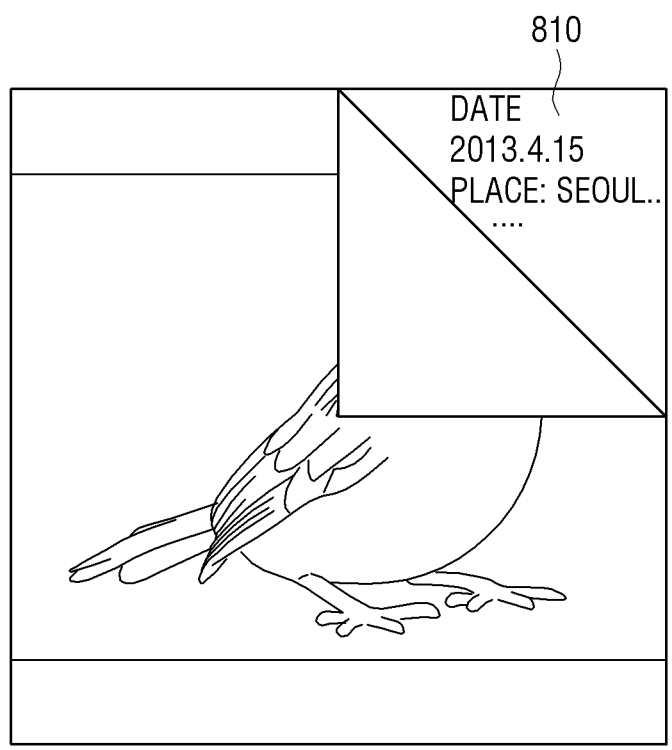
Figure 8C:
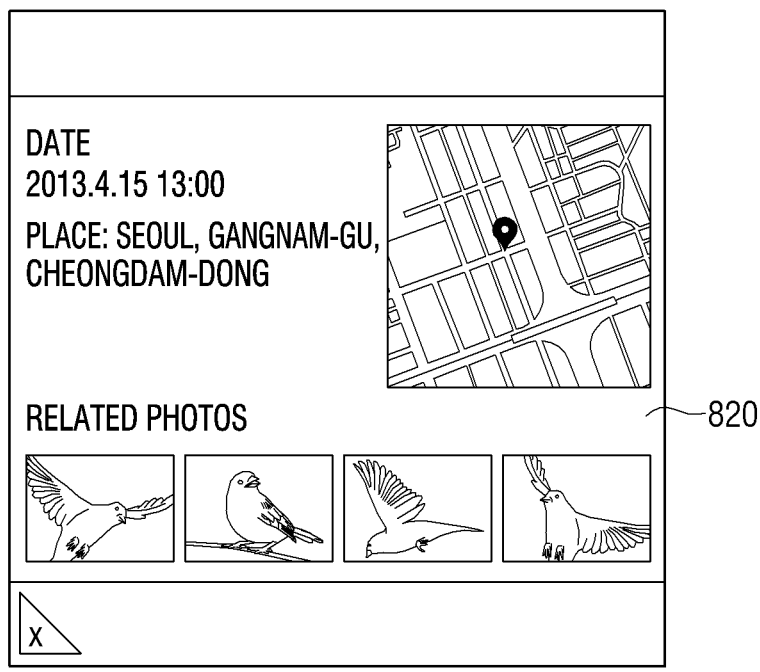

While the photo content 800 is displayed, when the diagonal interaction is detected at a corner area in a right upper end portion, the controller 290, as illustrated in FIG. 8B, may control the display 230 to fold the right top corner are where the diagonal interaction is detected, and display the information 810 (for example, photographing date, photographing place, etc.) related to the photo content on a folded corner area of the diagonal interaction. In this case, when the diagonal interaction continues to a left bottom corner area, the controller 290, as illustrated in FIG. 8C, may control the display 230 to display information 820 (for example, photographing data, photographing place, map information of photographing place, relevant photo information, etc.) on the display screen.

Figure 9A:
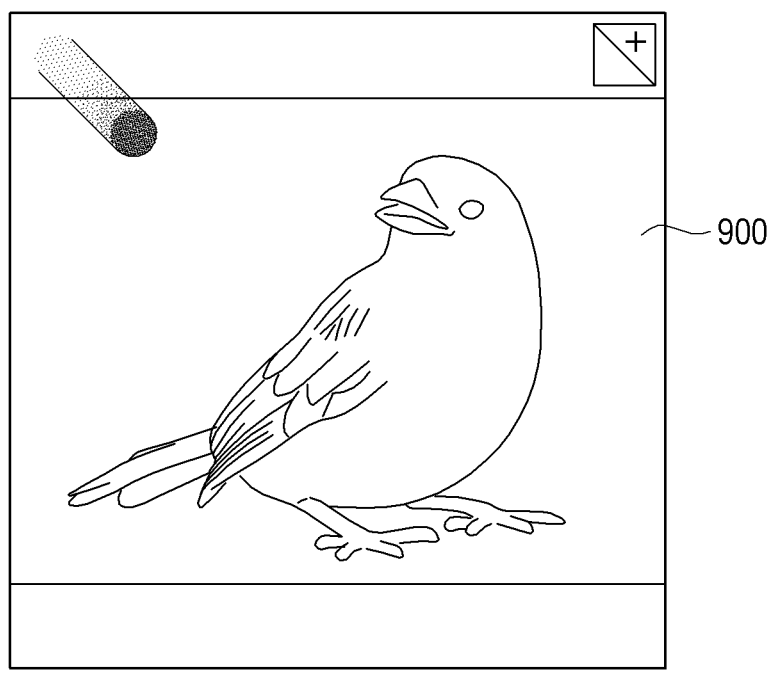
Figure 9B:
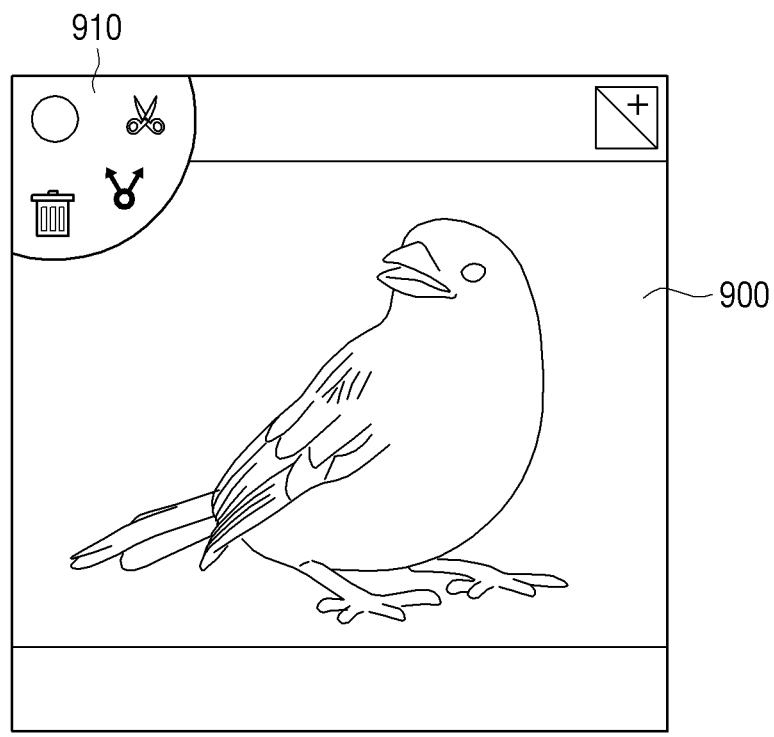

As illustrated in FIG. 9A, while the photo content 900 is displayed, when the diagonal interaction is detected at corner area in a left upper end portion, the controller 290, as illustrated in FIG. 9B, may control the display 230 to display a menu 910 (for example, deleting, editing, sharing, etc.) which may perform various tasks regarding a photo content at a left to corner area where the diagonal interaction is detected.

Figure 10A:
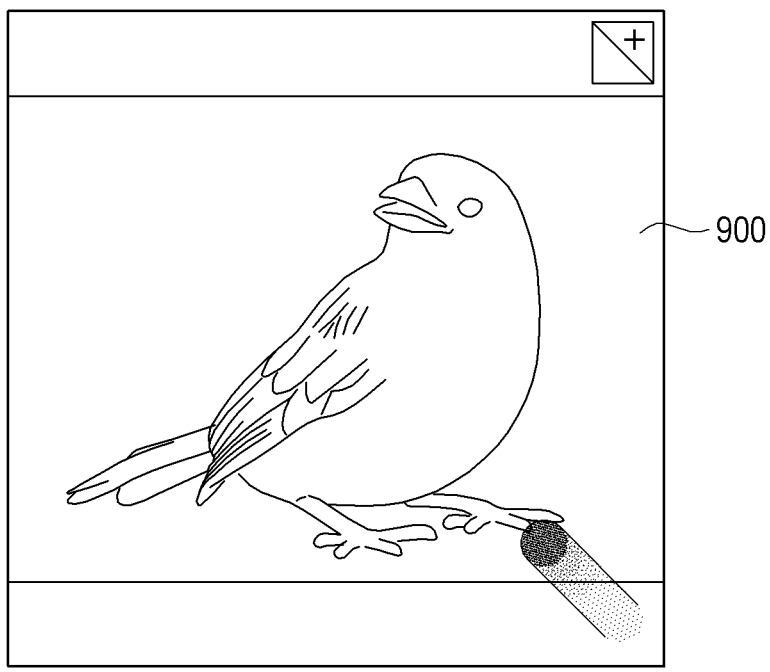
Figure 10B:
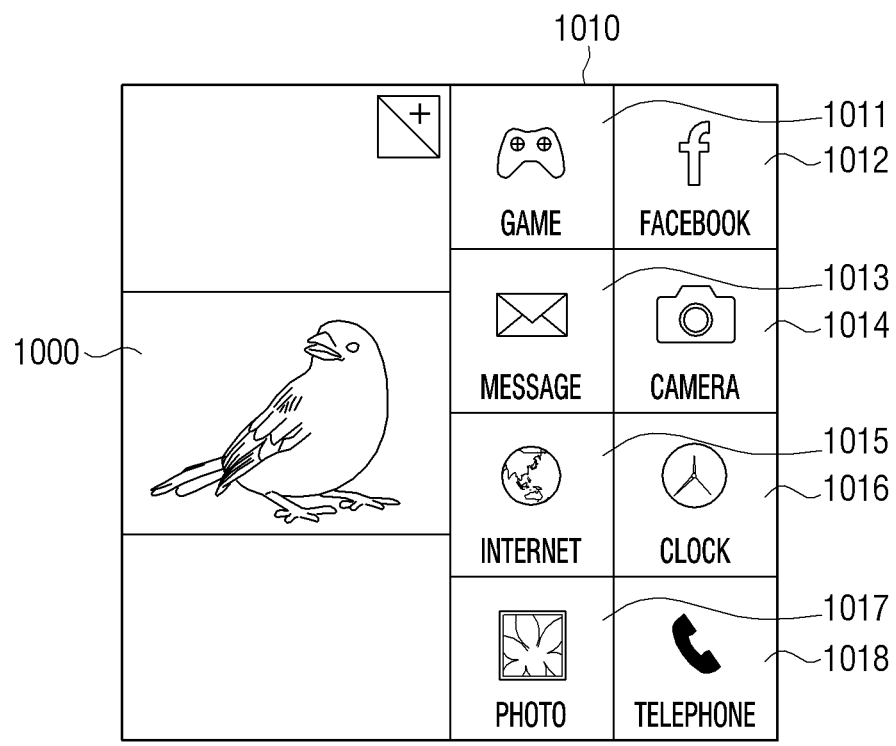
Figure 10C:
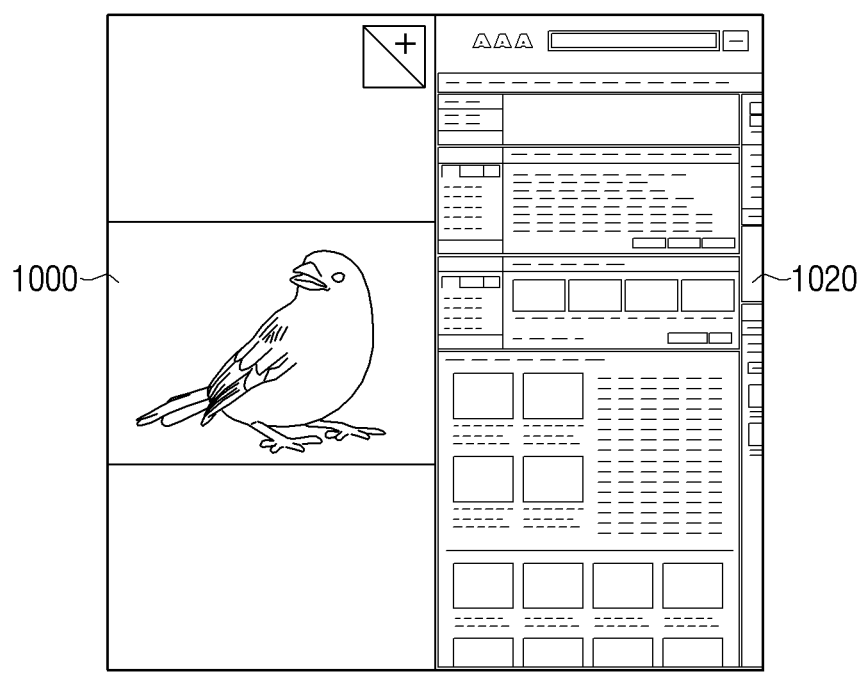

As illustrated in FIG. 10A, while the photo content 900 is displayed, when the diagonal interaction is detected at a corner area in a right lower end portion, the controller 290, as illustrated in FIG. 10B, may control the display 230 to decrease the photo content 1000 and display the photo content on a left area of the display screen. In addition, the controller 290 may control the display 230 to display a menu window 1010 including a plurality of icons 1011-1018 which may perform various functions of the user terminal device 100 on a right area of the display screen. When the fifth icon 1015 is selected from among a plurality of icons 1011-1018 included in the menu window 1010, the controller 290 may control the display 230 to display an internet browsing screen 1020 which corresponds to the fifth icon 1015 as illustrated in FIG. 10C.

As described above, a user, while photographic content is displayed, may be provided with various functions according to position of a corner area where the diagonal interaction is detected.

The controller 290 may change size of the second screen according to dragging amount of the diagonal interaction, and change quantity of information included in the second screen according to size of the second screen.

In particular, in the case when a message is received from outside, while receiving the image content 1000, if the diagonal direction is detected at a corner area in a right upper end portion, the controller 290 may control the display 230 to display information on a message received at a corner area in a right upper end portion.

Figure 11A:
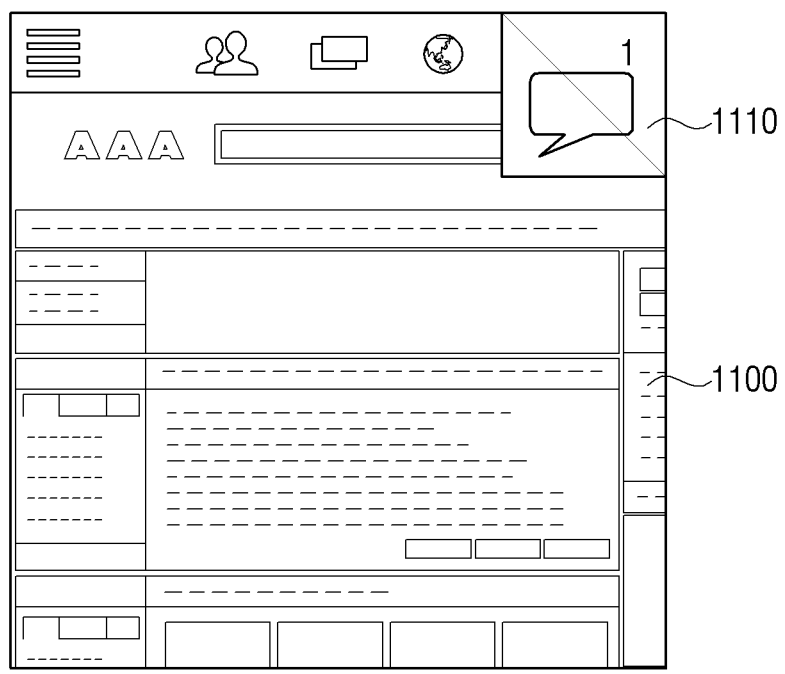

In particular, when a dragging amount or distance of the diagonal interaction is less than the first value, the controller 290, as illustrated in FIG. 11A, may control the display 230 to display the icon indicting that a message is received on the second screen 1110 at a corner area in a right upper end of a first screen 1100.

Figure 11B:
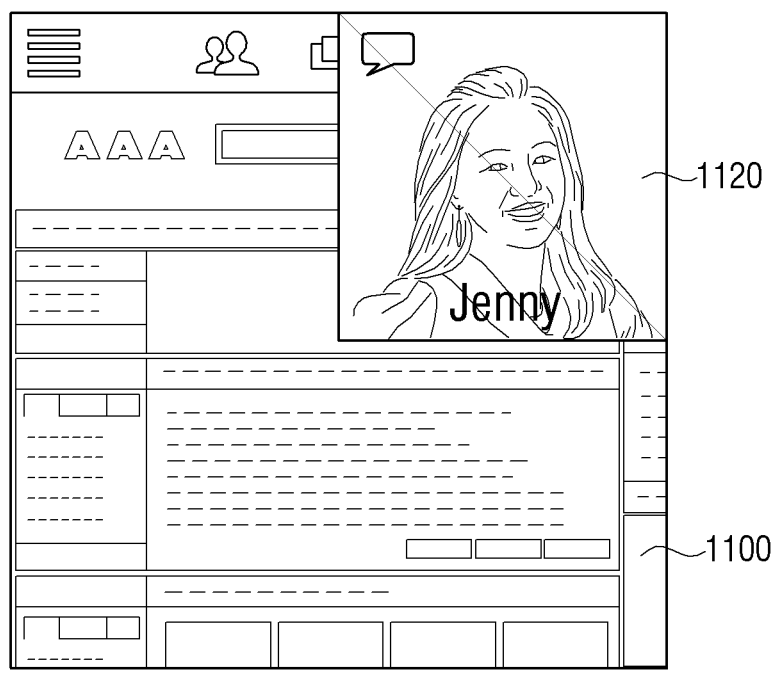

In addition, when dragging amount of the diagonal interaction is greater than the first value and less than the second value, the controller 290, as illustrated in FIG. 11B, may control the display 230 to display the second screen 1120 which includes information (for example, name of a caller, a photo of a caller, etc.) on a caller at a corner area in a right upper end.

Figure 11C:
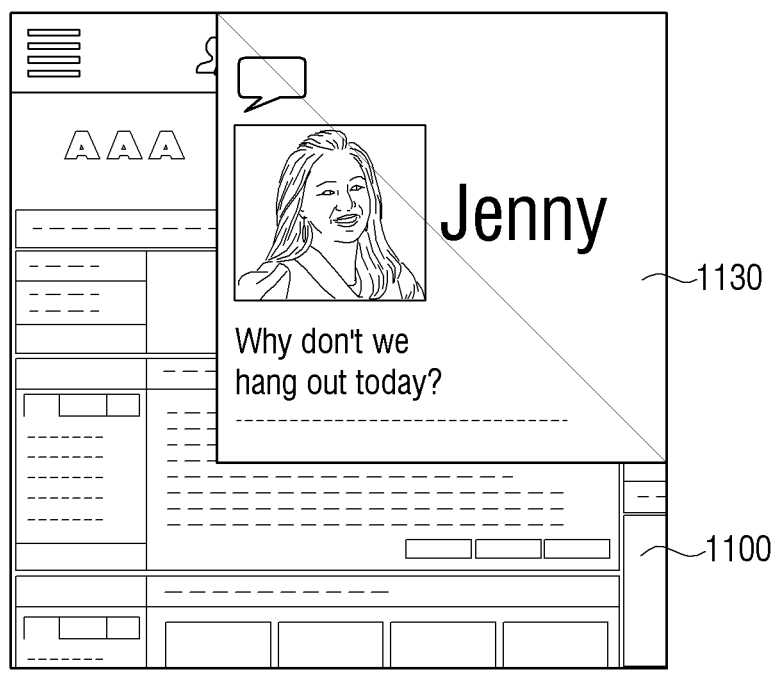

Further, when the dragging amount of the diagonal interaction is greater than the second value and less than the third value, the controller 290, as illustrated in FIG. 11C, may control the display 230 to display the second screen 1130 which includes at least a part of the information on a caller and a part of the contents of the message at a corner area in a right upper end.

Figure 11D:
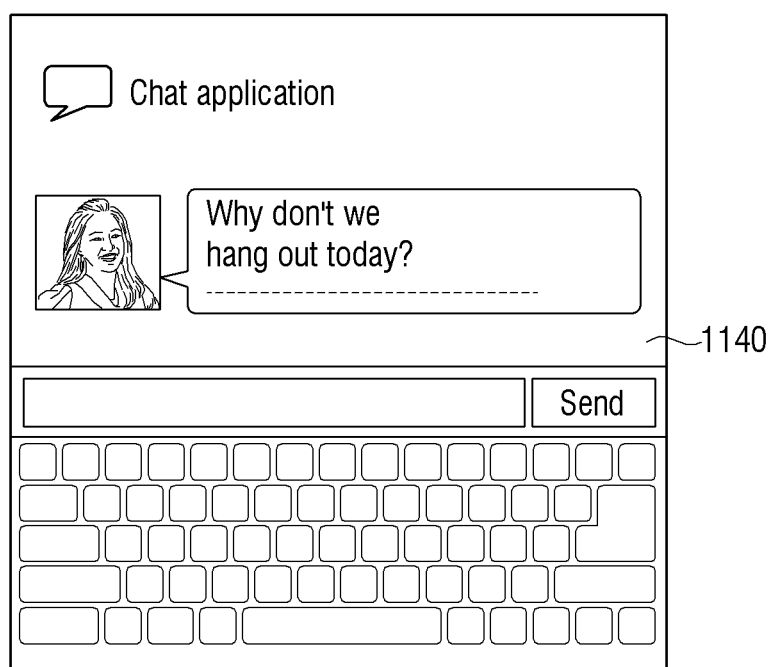

In addition, when the dragging amount of the dragging interaction is greater than the third value, the controller 290, as illustrated in FIG. 11D, may control the display 230 to display a chatting screen 1140 to respond to the received message on a full screen.

In addition, when a plurality of diagonal interactions are detected at the same corner area, the controller 290 may successively provide information corresponding to the same corner area according to the diagonal interactions.

Figure 12A:
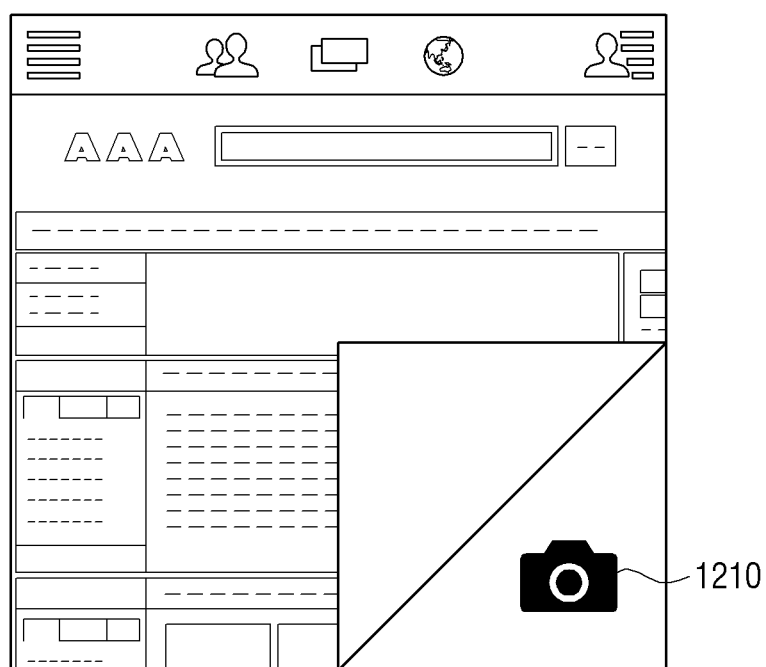

In particular, when the diagonal interaction is detected at a corner area in a right lower end portion while the image content is displayed, the controller 290, as illustrated in FIG. 12A, may control the display 230 so that the right bottom corner area where the diagonal interaction is detected is folded once, and quick access information 1210 (for example, an icon corresponding to a camera application) on an application designated by a user is displayed.

Figure 12B:
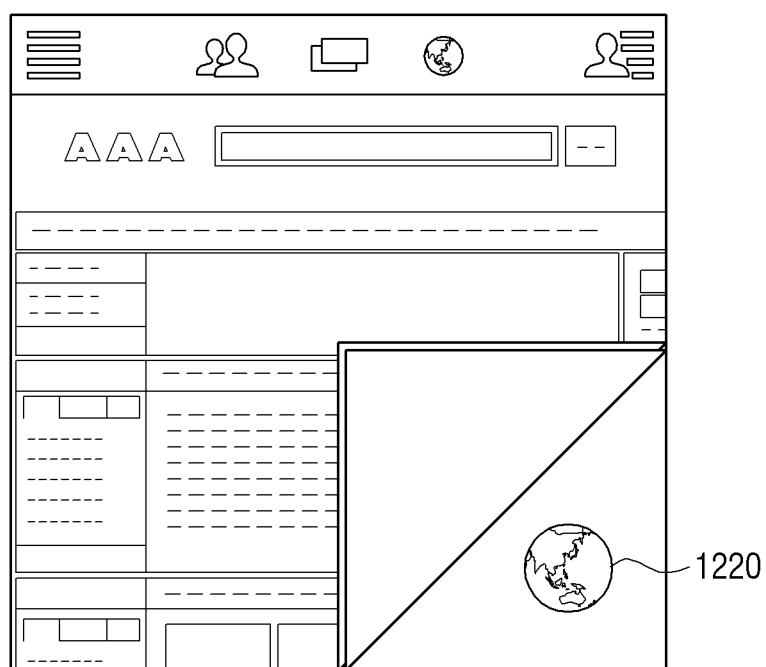

In addition, the diagonal interaction is detected again at a right bottom corner area while the image content is displayed along with the quick access information 1210, the controller 290, as illustrated in FIG. 12B, may control the display 230 so that the corner area in a right lower end portion where the diagonal interaction is detected is folded twice, and quick access information 1220 (for example, an icon corresponding to internet application) on another application designated by a user at a corner area in a right lower end portion is displayed.

Figure 13A:
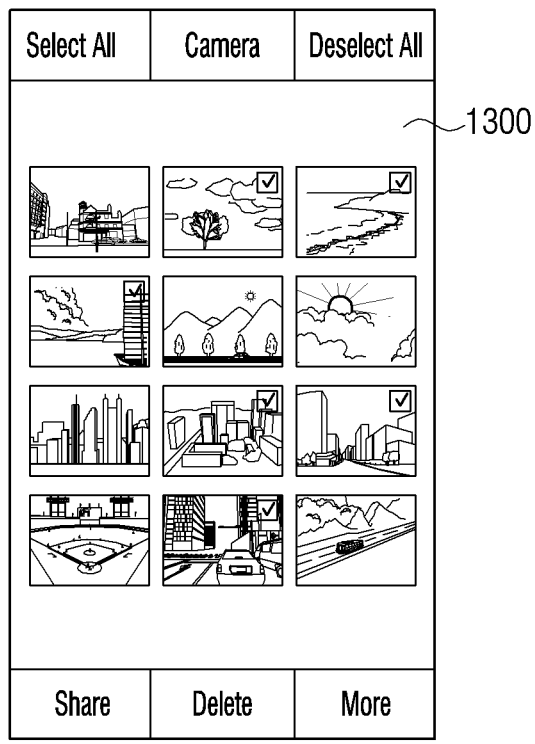

In addition, the controller 290 may perform a checking function through the diagonal interaction. In particular, in the past, if a part of a plurality of items are selected, and a part of a plurality of items is touched, the controller 290, as illustrated in FIG. 13A, may control the display 230 to display a check mark on a side (for example, a right upper end) of the touched item on screen 1300.

Figure 13B:
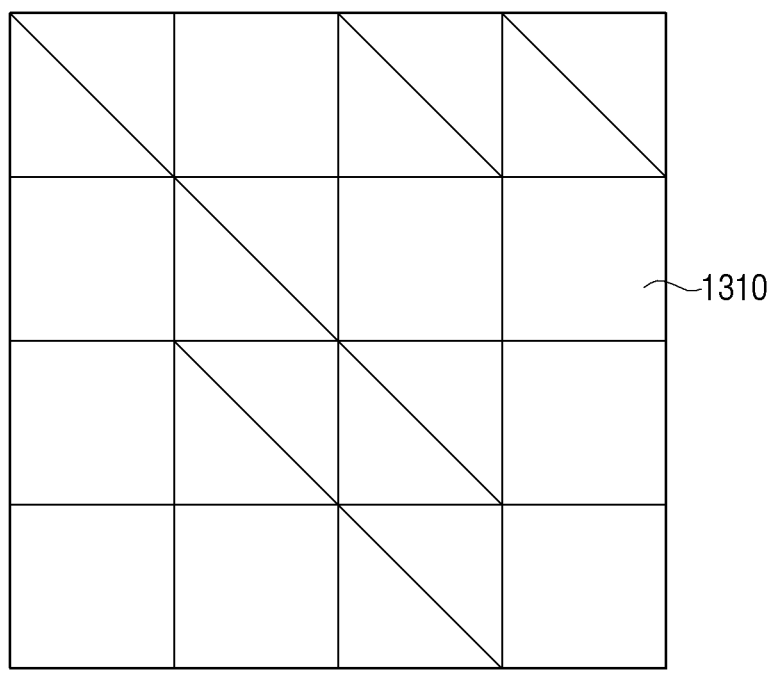

According to an exemplary embodiment, if a part of a plurality of items is selected, and when the diagonal interaction is detected on a part of the plurality of items, the controller 290, as illustrated in FIG. 13B, may control the display 230 to provide an image effect so that a part of items where the diagonal interaction is detected is folded as shown on screen 1310.

Further, when the diagonal interaction is detected for at least one of a plurality of display items included in one screen, the controller 290 may control the display 230 to convert the at least one display item where the diagonal interaction is detected into another screen related to at least one display item, and display the screen.

Figure 14A:
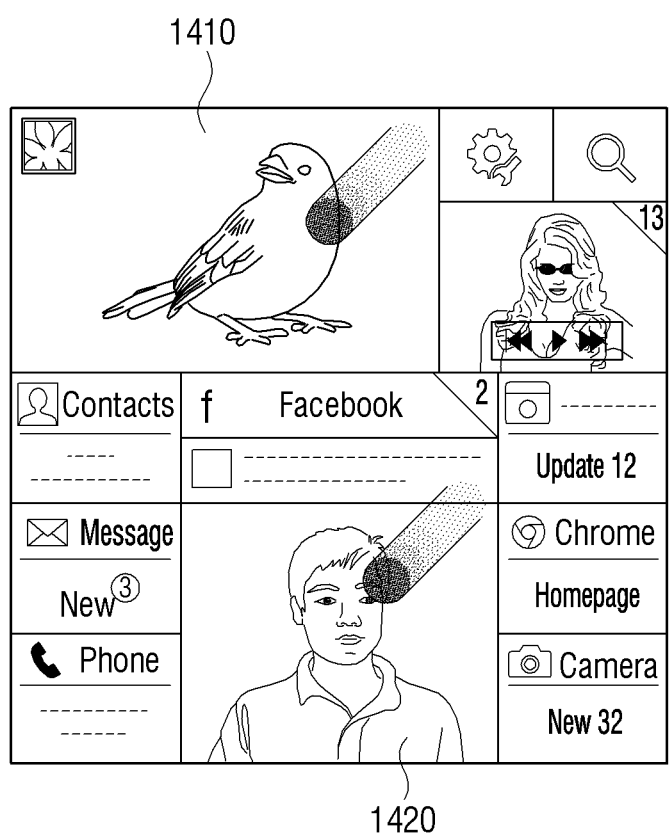
Figure 14B:
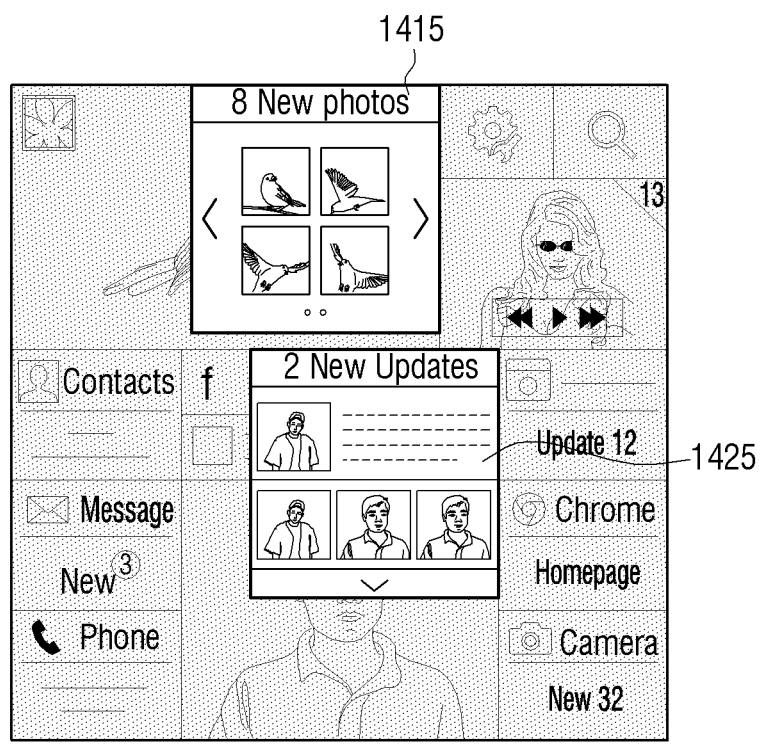
Figure 15A:
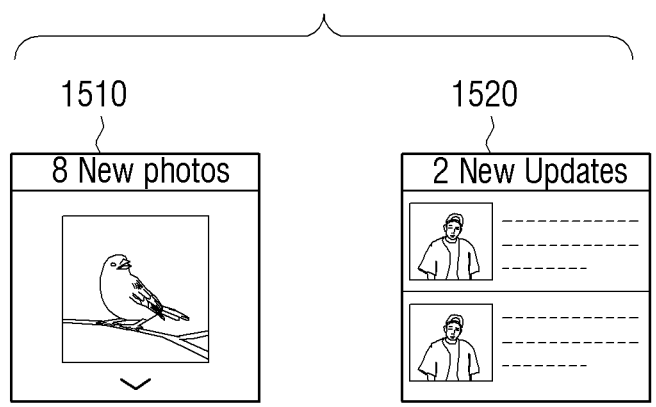
Figure 15B:
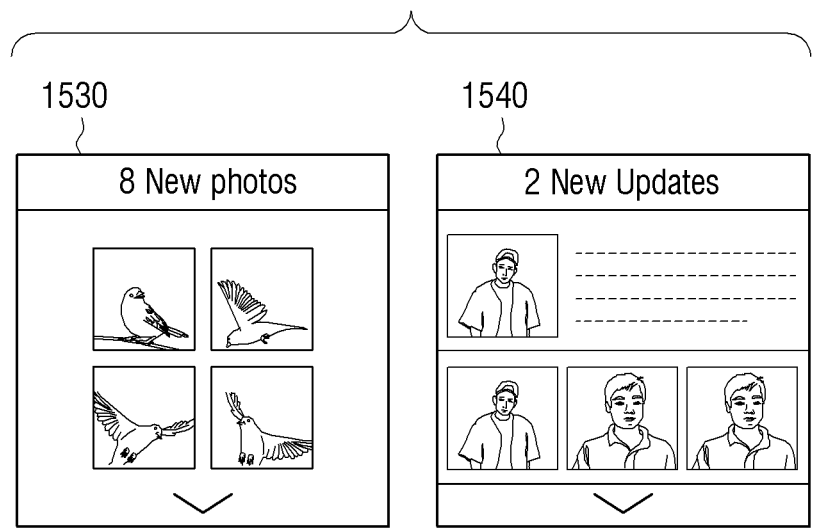

In particular, the controller 290, as illustrated in FIG. 14A, may control the display 230 to display a home screen including an icon 1410 on a photo application and an icon 1420 on a social networking service (SNS) application.

At this time, when the diagonal interaction is detected on the icon 1410 on a photo application and the icon 1420 on the SNS application, the controller 290 may control the display 230 to convert the icon 1410 on a photo application into a thumbnail image 1415 including information (for example, information on new photo contents, etc.) on the photo application, and to convert the icon 1420 on an SNS application into a thumbnail image 1425 including information (for example, information on new mentions, etc.) on an SNS application.

In this case, the converted thumbnail images 1415 and 1425 may include an amount of information which is different according to the size of display items. For example, when the icon on a photo application in the first predetermined size is converted to a thumbnail image, the controller 290, as illustrated on the left of FIG. 15A, may control the display 230 to display a thumbnail image 1510 in a first mode which displays only a recently-photographed photo. In addition, when an icon on an SNS application with the first predetermined size is converted into a thumbnail image, the controller 290, as illustrated on the right of FIG. 15A, may control the display 230 to display the thumbnail image 1520 in the first mode including information on updated two mentions. However, when an icon on a photo application with the second predetermined size is converted to a thumbnail image, the controller 290, as illustrated on the left of FIG. 15B, may control the display 230 to display a thumbnail image 1530 in the second mode which displays four photos recently photographed. In addition, when an icon on the SNS application in the second predetermined size is converted into a thumbnail image, the controller 290, as illustrated on the right of FIG. 15B, may control the display 230 to display the thumbnail image 1540 in the second mode including one recently updated mention information and three update information.

The user interaction to touch one of a plurality of corner areas included in the first mode thumbnail image 1510 and 1520 and drag the touched area in an outward direction of the thumbnail image 1510 and 1520 is detected, the controller 290 may convert the first mode thumbnail image 1510 and 1520 to the second mode thumbnail image 1530 and 1540. In addition, when the user interaction to touch one of a plurality of corner areas included in the second mode thumbnail image 1530 and 1540, and drag the touched area to an outward direction or an inward direction of the thumbnail image 1530 and 1540 is detected, the controller 290 may convert the second mode thumbnail image 1530 and 1540 to the first mode thumbnail image 1510 and 1520.

In addition, when the diagonal interaction is detected on a display item, the controller 290 may provide a folding image effect that a display item for which the diagonal interaction is detected is folded, and when providing the folding image effect, a shadow image effect may be provided for more realistic graphic expression.

In particular, the controller 290 may control the display 230 to display a screen 1600 which includes four display items 1610-1640 having rectangular shape. In addition, when the diagonal interaction is detected for at least one of the four display items 1610-1640, the controller 290 may provide a folding image effect to a display item for which the diagonal interaction is detected is folded, and the shadow image effect for a specific light source. In an exemplary embodiment, it is assumed that the specific light source is located at an upper part of the image.

Figure 16A:
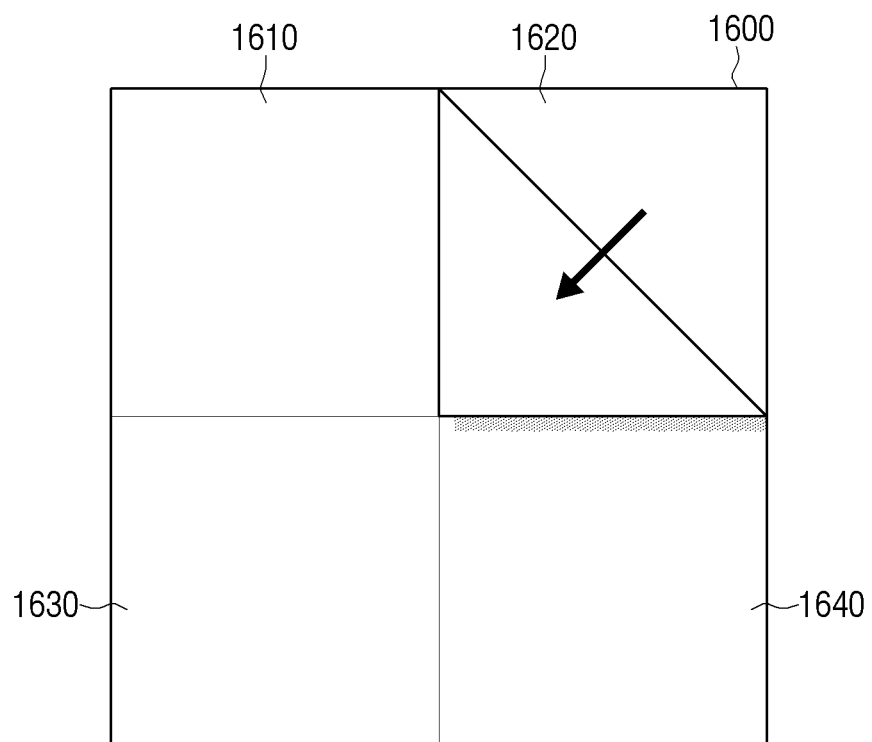
Figure 16B:
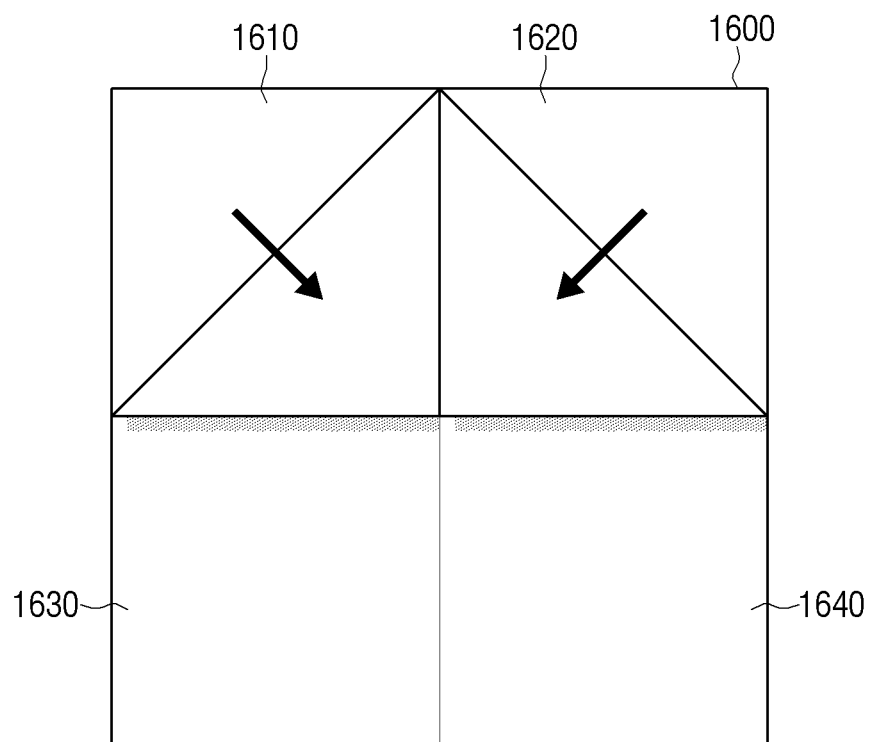
Figure 16C:
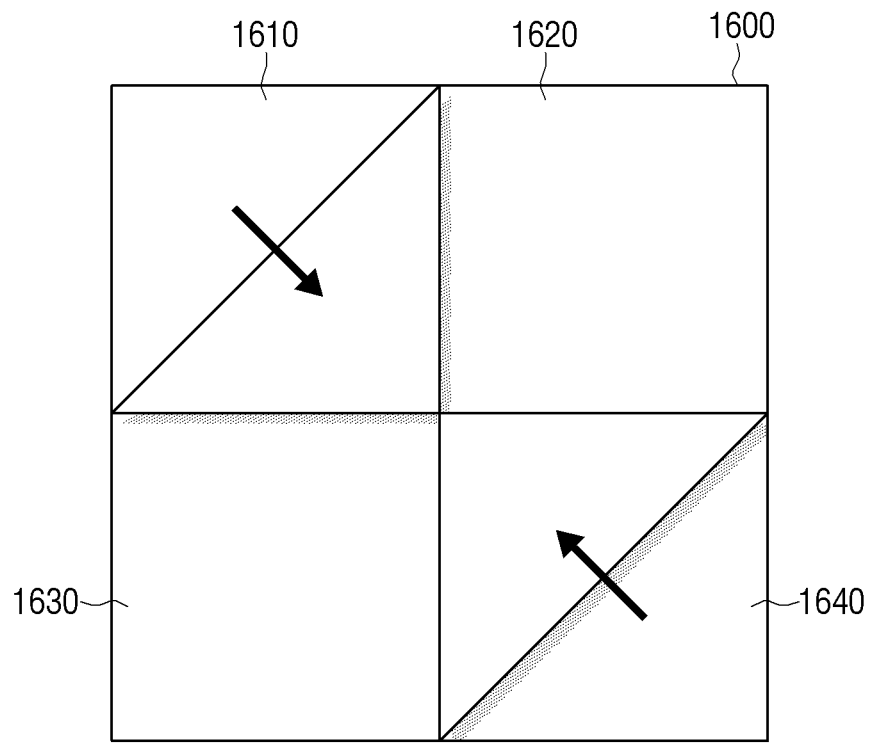

In particular, when the diagonal interaction is detected for a second display item 1620 among the four display items 1610-1640, the controller 290, as illustrated in FIG. 16A, may provide a folding image that the second display item 1620 is folded, and provide a shadow effect at a bottom side of the folded second display item 1620. In addition, when the diagonal interaction is detected for the first and second display items 1610 and 1620 among the four display items 1610-1640, the controller 290, as illustrated in FIG. 16B, may provide the folding image effect to fold the first and second display items 1610 and 1620, and provide a shadow effect on bottom sides of the folded first and second display items 1610 and 1620. In addition, when the diagonal interaction is detected for the first and fourth display item 1610 and 1640 among the four display items 1610-1640, the controller 290, as illustrated in FIG. 16C, may provide a folding image effect to fold the first and fourth display items 1610 and 1640, and provide a shadow effect on the bottom side of the folded first display item 1610 and on the diagonal line of the fourth display item 1640.

Figure 17:
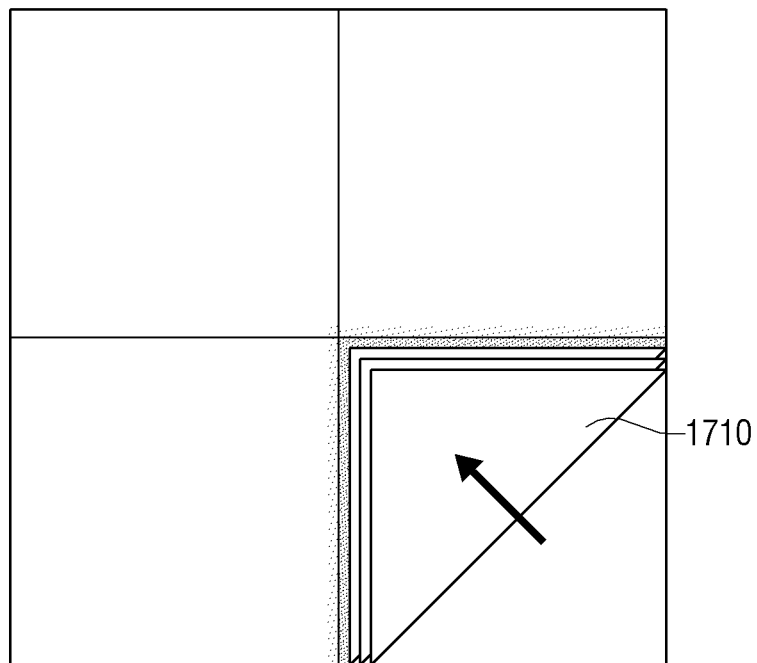

Further, when a plurality of diagonal interactions are detected for one display item, the controller 290 may control the display 230 to provide the image effect to fold the display item for which the diagonal interaction is detected for several times. In particular, when n times of diagonal interactions are detected for one display item 1710, the controller 290, as illustrated in FIG. 17, may control the display 230 to provide an image effect that the display item 1710 is folded for n times.

In addition, when the diagonal interaction is detected from one of corner areas of the first screen, the controller 290 may control the display 230 to display a plurality of items at a corner area where the diagonal interaction is detected. In addition, when a direction of the drag interaction is changed, and a drag interaction toward one of a plurality of items is detected, the controller 290 may execute a function which corresponds to the item where the drag interaction is detected.

Figure 18A:
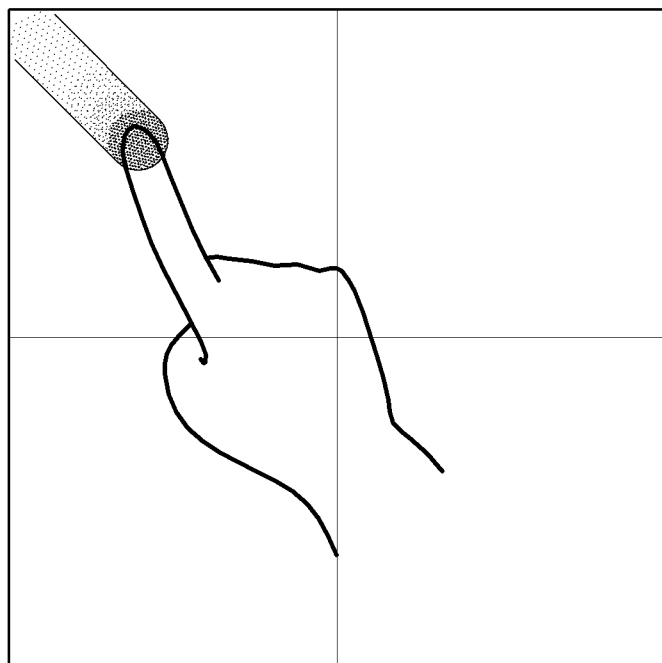
Figure 18B:
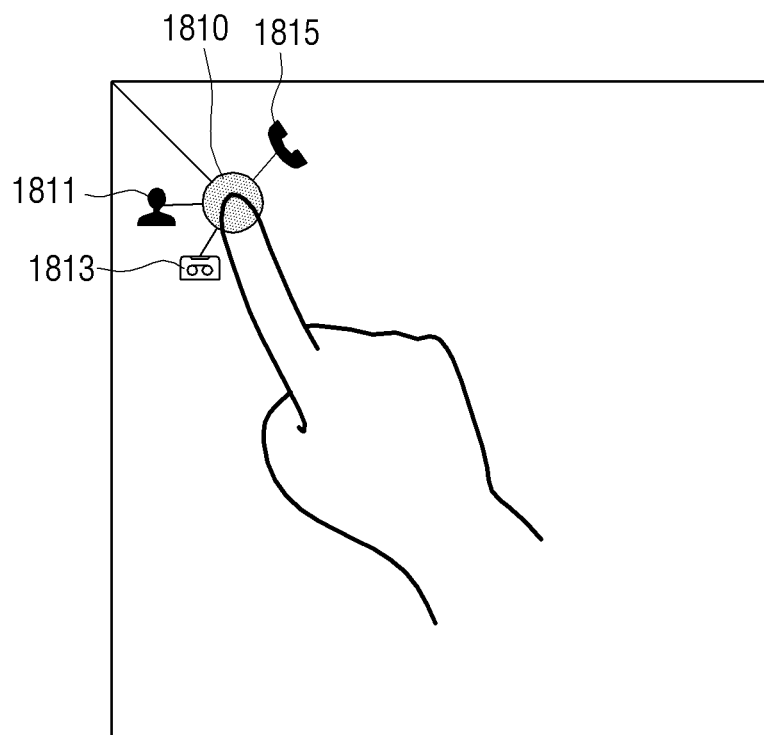

In particular, as illustrated in FIG. 18A, when the diagonal interaction is detected at a corner area in a left upper end portion, the controller 290, as illustrated in FIG. 18B, may control the display 230 to display a menu 1810 which includes a contact list item 1811, a recording item 1813, and a phone item 1815 at a corner area in a left upper end portion. In this case, the items included in the menu may have different numbers according to a drag length of the diagonal interaction.

Figure 18C:
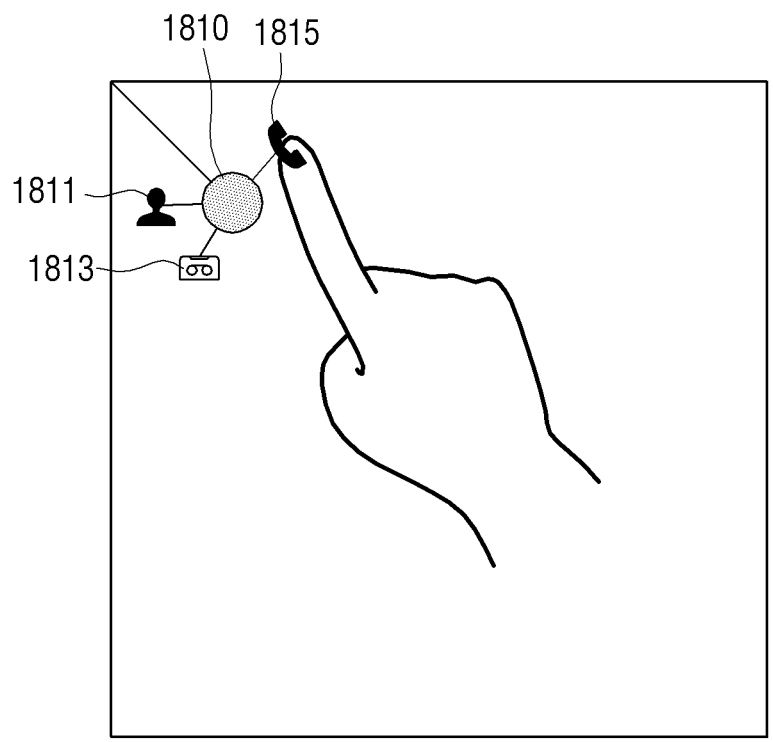

While a menu 1810 is displayed, when a user changes a dragging direction toward a telephone item 1815 in a right upper end, the controller 290 may execute a telephone application which corresponds to the telephone item 1815 as shown in FIG. 18C.

As described above, the displaying of a menu and executing a function may be performed at the same time through the diagonal interaction and the drag interaction in which the direction is changed.

In addition, in the aforementioned exemplary embodiment, it has been described that, when the diagonal interaction to touch one of the corner areas of the first screen and drag the touched screen in a diagonal direction is detected, the display 230 displays the second screen at a corner area where the diagonal interaction is detected, but this is merely exemplary, and even when another user interaction is detected at a corner area, the display 230 may display the second screen at a corner area where the user interaction is detected.

<Grid Screen>

According to another exemplary embodiment, the display 230 may display a grid screen that includes a plurality of square cells. In addition, the display 230 may display a plurality of objects on the plurality of square cells. In this case, each of the plurality of objects may be displayed on at least one of a plurality of square cells. In addition, when a user interaction to touch and drag the first object from among the plurality of objects is detected, the controller 290 may adjust size of the first object by adjusting the number of cells where the first object is displayed according to dragging distance and direction of the user interaction.

Figure 19A:
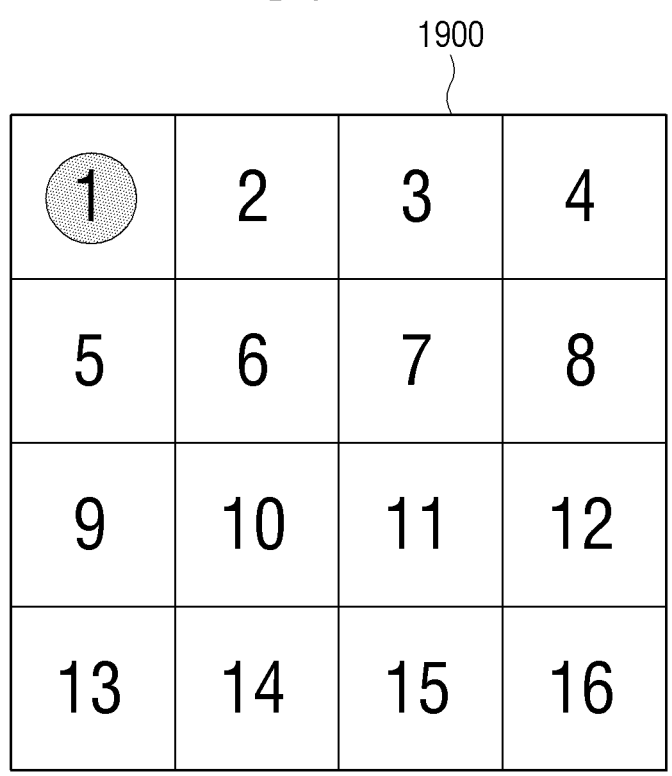
FIGS. 19A to 32C are views illustrating performing various functions on a grid screen composed of a plurality of square cells, according to various exemplary embodiments.

In particular, as illustrated in FIG. 19A, the display 230 may display sixteen objects on each of a plurality of square cells included in a grid screen 1900. In addition, when a preset user interaction (for example, an interaction to press the first object for a preset time) is detected on the first object, the controller 290 may change a mode of the user terminal device 200 to a grid editing mode 1910. When the mode is changed to the grid editing mode, size of the sixteen objects displayed on the square cell may decrease as illustrated in FIG. 19B.

Figure 19B:
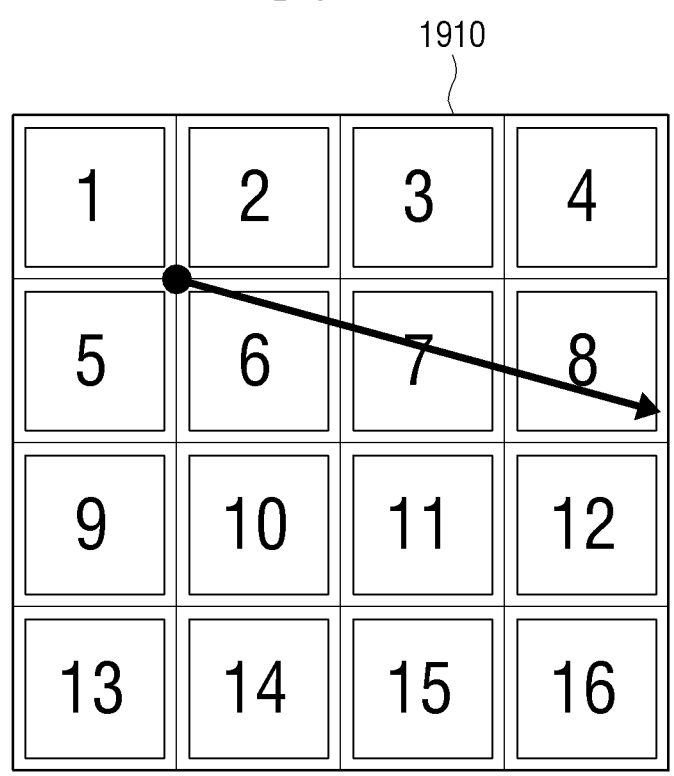
Figure 19C:

In addition, when a user action to touch and drag an interaction point among the first object, second object, fifth object, and sixth object in a direction of 4 o'clock is detected, as illustrated in FIG. 19B, the controller 290, as illustrated in FIG. 19C, may control the display 230 to determine that the square cell where the first object is displayed is the first to eighth square cell, enlarge the first object so that the first object is displayed on the determined first to eighth cell, and display the first object. In this case, when the tenth to sixteenth object are deleted from display screen 1920, the second to ninth object, as illustrated in FIG. 19C, may change location of the square cell which is displayed.

In particular, a first user interaction to touch and drag the first object in an outward direction is detected, the controller 290 may increase the number of square cell areas in which the first object is displayed, thereby increasing size of the first object, move a part of the plurality of objects excluding the first object to another square cell, and delete another part from the display screen. In addition, when a second user interaction to touch and drag the first object in an inward direction of the first object is detected, the controller 290 may decrease the number of square cell areas where the first object is displayed, thereby reducing size of the first object, move a part of a plurality of objects excluding the first object into another square cell area, and add a new object to the display screen.

Figure 20A:
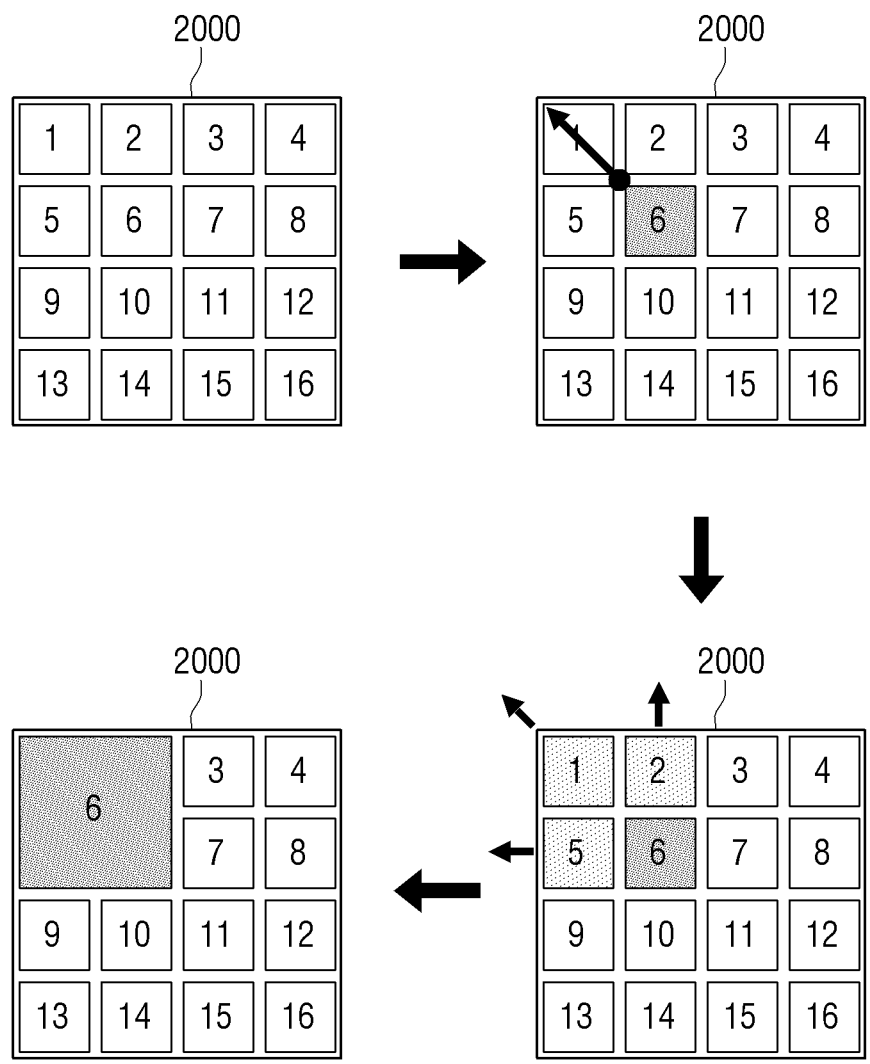

In particular, as illustrated in FIG. 20A, while sixteen objects are displayed on each of the sixteen square cells included in the grid screen 2000, when a user interaction to touch and drag the sixth object in an outward direction of the sixth object toward a right upper end is detected, the controller 290 may delete the first object, the second object, and the fifth object from the display screen and increase size of the sixth object so that the sixth object is located on four square cells.

That is, in a case of an object of which line or apex is in contact with the object of which size increases, the object may move in an opposite direction of the line or apex according to a user interaction. In addition, an object in which a square cell does not exist at a moved position may be deleted from the display screen. In addition, when an object is generated later, the object which is deleted from the display screen may be relocated according to a user interaction. For example, as the fourth screen of FIG. 20A, when a user interaction to drag the sixth object in an inward direction while the sixth object is located on four square cells is detected, the controller 290, as illustrated in the first screen of FIG. 20A, may relocate the first object, the second object, and the fifth object which were removed from the display screen.

Figure 20B:
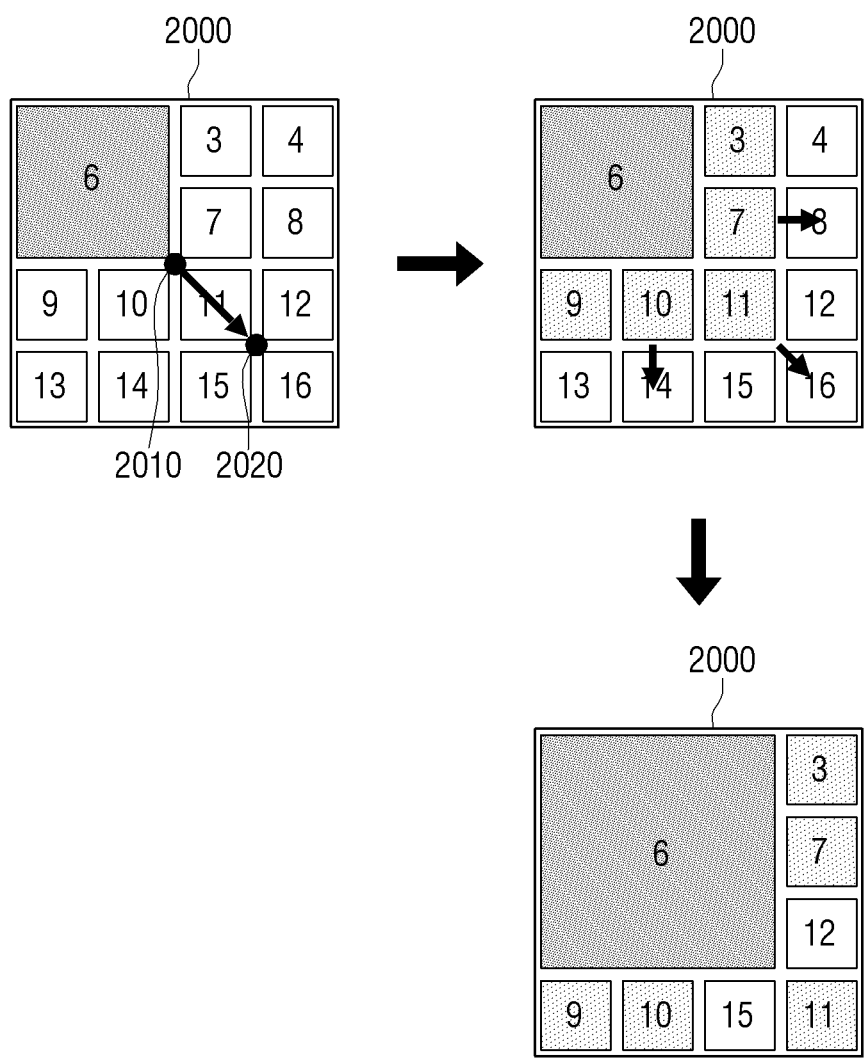

In addition, as illustrated in a first screen of FIG. 20B, when a user interaction to touch and drag a first point 2010 to a second point 2020 in a right lower direction is detected, the controller 290, as illustrated in a third screen of FIG. 20B, may control the display 230 to move the third object, the seventh object, tenth object, and the eleventh object with which a line or an apex of the sixth object is in contact to another location to correspond to a dragging direction, and delete from the display screen the fourth object, eighth object, thirteenth object, fourteenth object, and sixteenth object which were displayed.

When an object displayed on the display 230 is widget of an application, if length of one line of the enlarged object is the same as length of one line of the display 230, the controller 290 may change the widget of an application to a screen to execute the application.

Figure 20C:
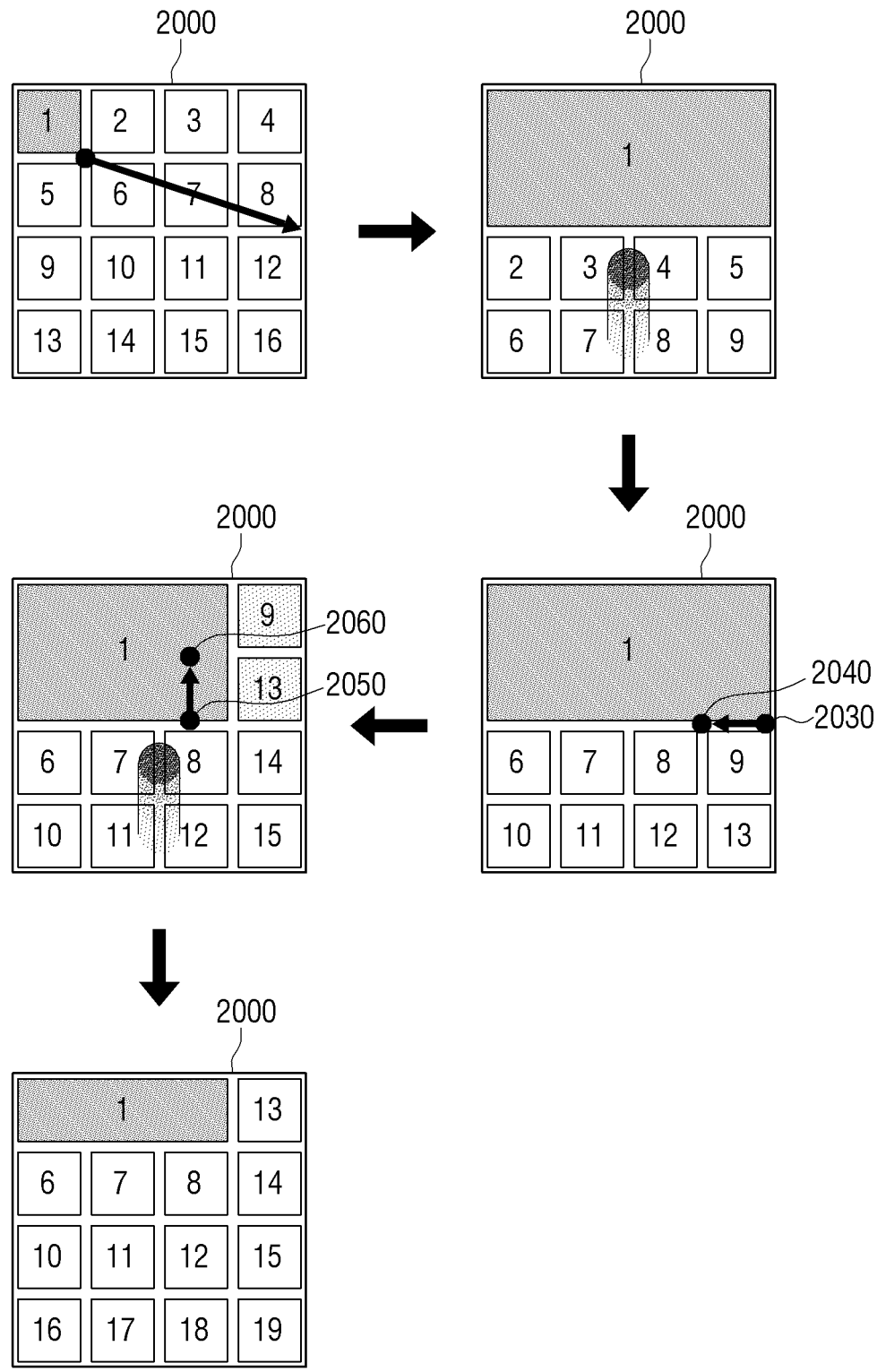

In particular, as illustrated in a first screen of FIG. 20C, when a user interaction to touch and drag the first object in a widget type to an area where the eighth object is displayed is detected, the controller 290 may increase size of the first object, and change the first object in a widget format to an application screen.

In addition, when a user interaction to scroll an area where the second to ninth objects are displayed is detected, the controller 290 may control the display 230 to fix the first object, delete the second to fifth objects from among the second to ninth objects from the display screen, move location of the sixth to ninth objects in an upward direction, and newly add the tenth to thirteenth objects.

As illustrated in the third screen of FIG. 20C, when a user interaction to touch and drag a third point 2030 of the first object to a fourth point 2040 is detected, the controller 290, as illustrated in a fourth drawing of FIG. 20C, may control the display 230 to decrease size of the first object, move location of the ninth to thirteenth objects in an upward direction, and display fourteenth to fifteenth objects which are new objects.

In addition, as illustrated in a fourth drawing of FIG. 20C, when a user interaction to touch a fifth point 2050 of the first object and drag toward a sixth point 2060 is detected, the controller 290, as illustrated in a fifth drawing of FIG. 20C, may control the display 230 to decrease size of the first object, delete the ninth object from the display screen, move the sixth object, seventh object, eighth object, and tenth to fifteenth object in another upper direction, and display sixteenth to nineteenth object which are new objects.

In addition, the controller 290 may change the contents included in the first object in accordance with the number of square cells which the first object takes in the grid screen.

Figure 21A:
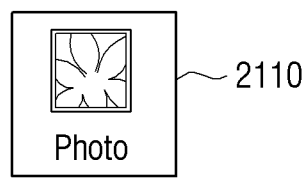

In particular, when an object on a photo application is located at one square cell, the controller 290, as illustrated in FIG. 21A, may control the display 230 to display an icon corresponding to the photo application as an object 2110.

Figure 21B:
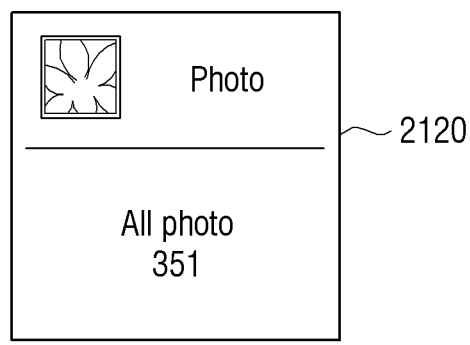

When an object on a photo application is located at four square cells, the controller 290, as illustrated in FIG. 21B, may control the display 230 to display an object 2120 that includes brief information (for example, stored photo information) of the photo application.

Figure 21C:
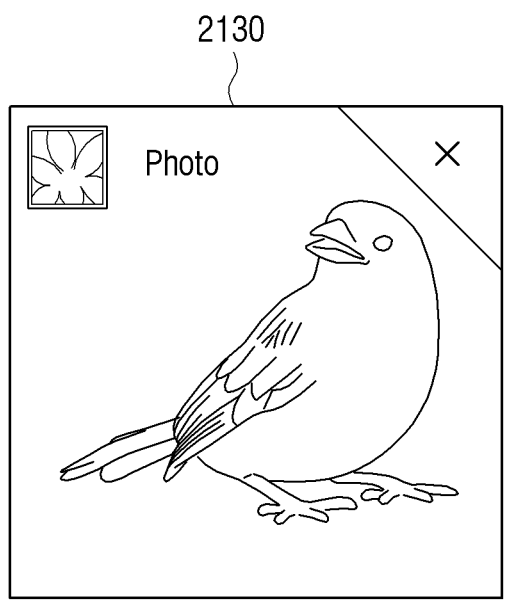

In addition, when an object on a photo application is located at nine square cells, the controller 290, as illustrated in FIG. 21C, may control the display 230 to display an object 2130 that includes detailed information (for example, thumbnail image information on a photo recently taken, etc.) of the photo application.

Figure 21D:
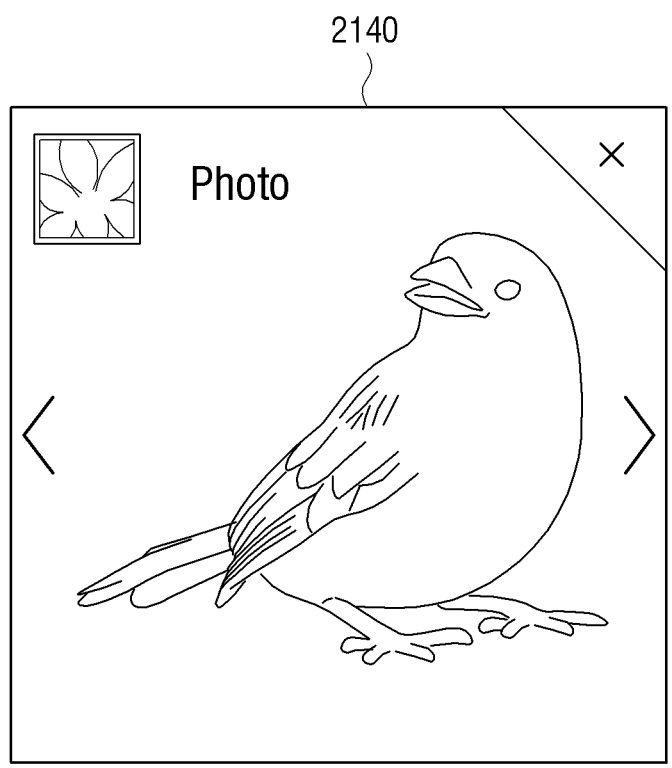

When an object on a photo application is located at sixteen square cells, the controller 290, as illustrated in FIG. 21D, may control the display 230 to display an object 2140 that includes a screen (for example, a photo list, etc.) for executing the photo application.

However, as described above, that there may be four different steps according to the number of square cells corresponding to an object size of an object is merely exemplary, and there may be a plurality of steps. For example, the controller 290 may differently display an object into three steps according to the number of square cells which an object occupy or size of an object.

Figure 22A:
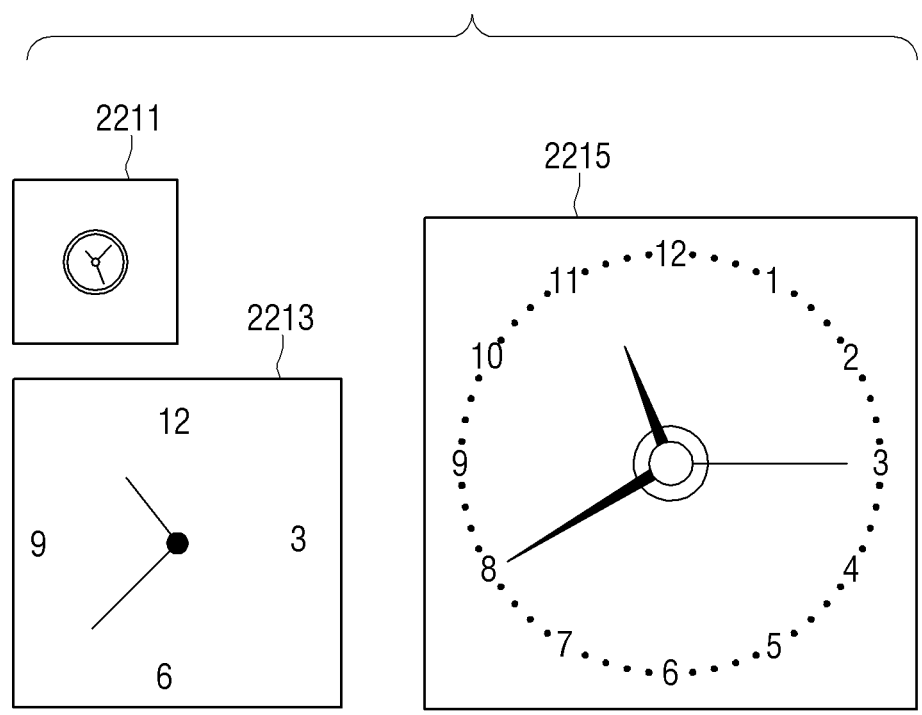

In particular, as illustrated in FIG. 22A, when an object corresponds to a clock application, when size of the object occupies a square cell of the first number, the controller 290 may control the display 230 to display an object 2211 as an icon which corresponds to the clock application. In addition, when a size of an object occupies a square cell of the second number, the controller 290 may control the display 230 to display an object 2213 as a simple clock. In addition, when size of an object occupies a square cell of the third number, the controller 290 may control the display 230 to display an object 2215 as a detailed clock (that is, a clock including a second hand and minute intervals).

Figure 22B:
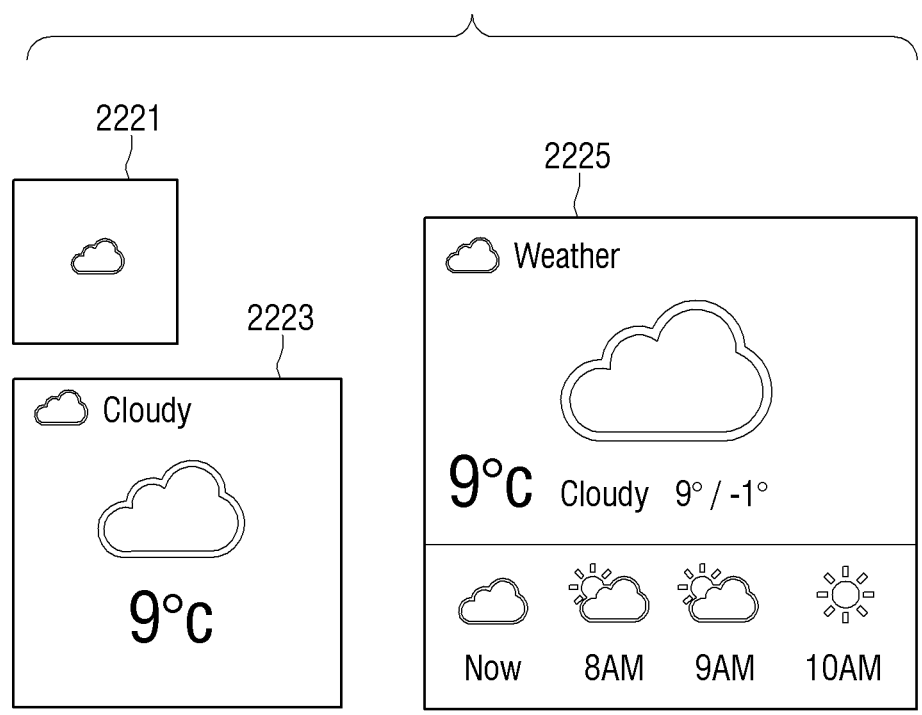

As illustrated in FIG. 22B, when an object corresponds to a weather application, if the object occupies a square cell of the first number, the controller 290 may control the display 230 to display an object 2221 as an icon which corresponds to the weather application. In addition, when size of the object is a square cell of the second number, the controller 290 may control the display 230 to display an object 2223 including brief weather information (for example, current weather of a region where a user is located). In addition, when size of the object is a square cell of the third number, the controller 290 may control the display 230 to display an object 2225 that includes detailed weather information (for example, present weather information and future weather information).

Figure 22C:
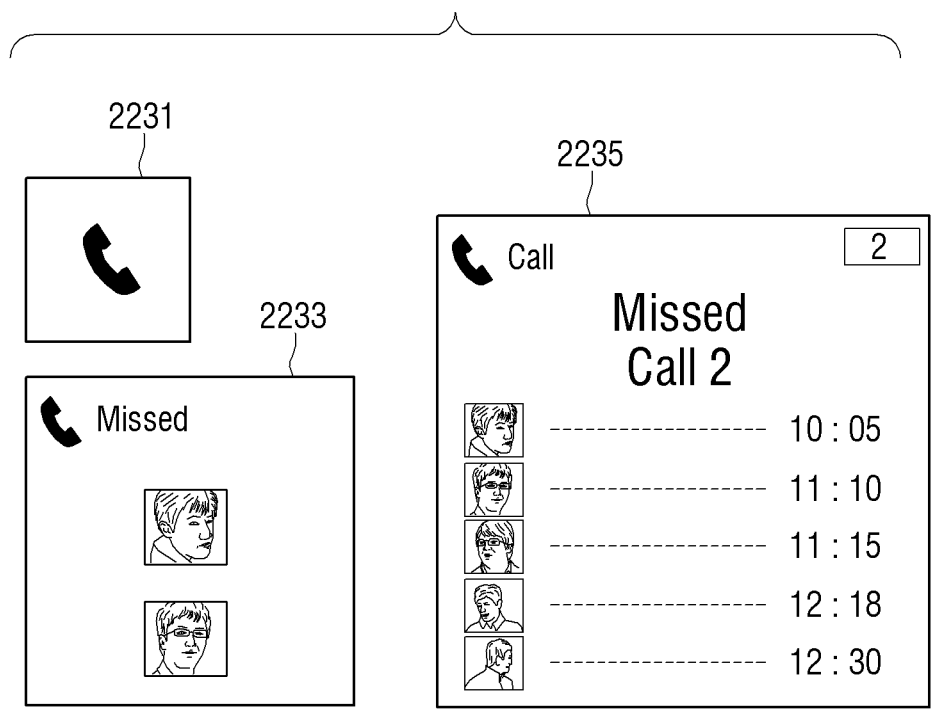

As illustrated in FIG. 22C, when an object corresponds to a telephone application, if the object occupies a square cell of the first number, the controller 290 may control the display 230 to display an object 2231 as an icon which corresponds to a telephone application. In addition, when the object occupies a square cell of the second number, the controller 290 may control the display 230 to display an object 2233 including two items of contact information. When the object occupies a square cell of the third number, the controller 290 may control the display 230 to display an object 2235 including a telephone screen which includes five items of contact information.

Figure 22D:
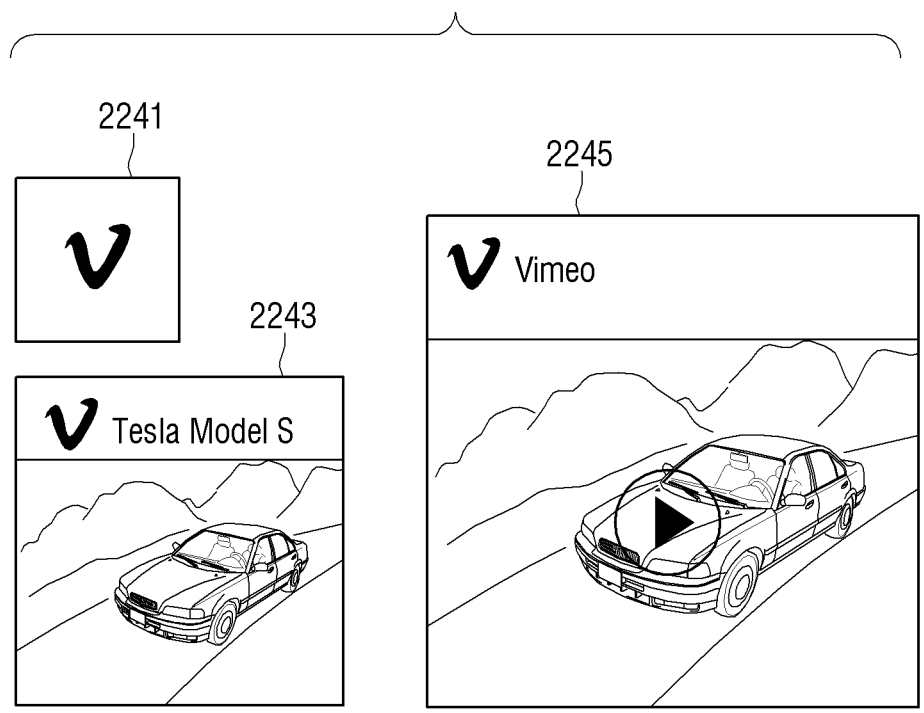

As illustrated in FIG. 22D, when an object corresponds to a video sharing application, if the object occupies a square cell of the first number, the controller 290 may control the display 230 to display an object 2241 as an icon which corresponds to the video sharing application. In addition, when the object occupies a square cell of the second number, the controller 290 may control the display 230 to display an object 2243 including a thumbnail image of specific video. If size of the object occupies a square cell of the third number, the controller 290 may control the display 230 to display an object 2245 which includes a screen for executing a video.

Figure 22E:
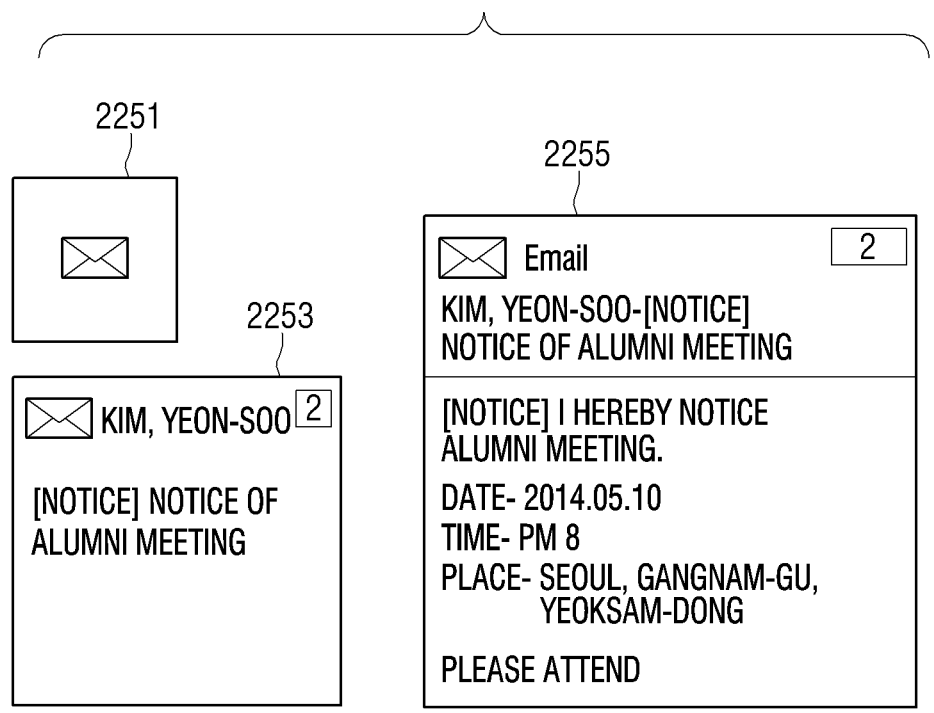

As illustrated in FIG. 22E, when an object corresponds to an e-mail application, if the object occupies a square cell of the first number, the controller 290 may control the display 230 to display an object 2251 as an icon which corresponds to the e-mail application. When the object occupies a square cell of the second number, the controller 290 may control the display 230 to display an object 2253 which includes brief information (for example, name of a sender, title, etc.) of the received e-mail. When the object occupies a rectangular cell of the third number, the controller 290 may control the display 230 to display an object 2255 which includes detailed information (for example, name of a sender, data of receipt, contents of e-mail, etc.) of the received e-mail.

Figure 22F:
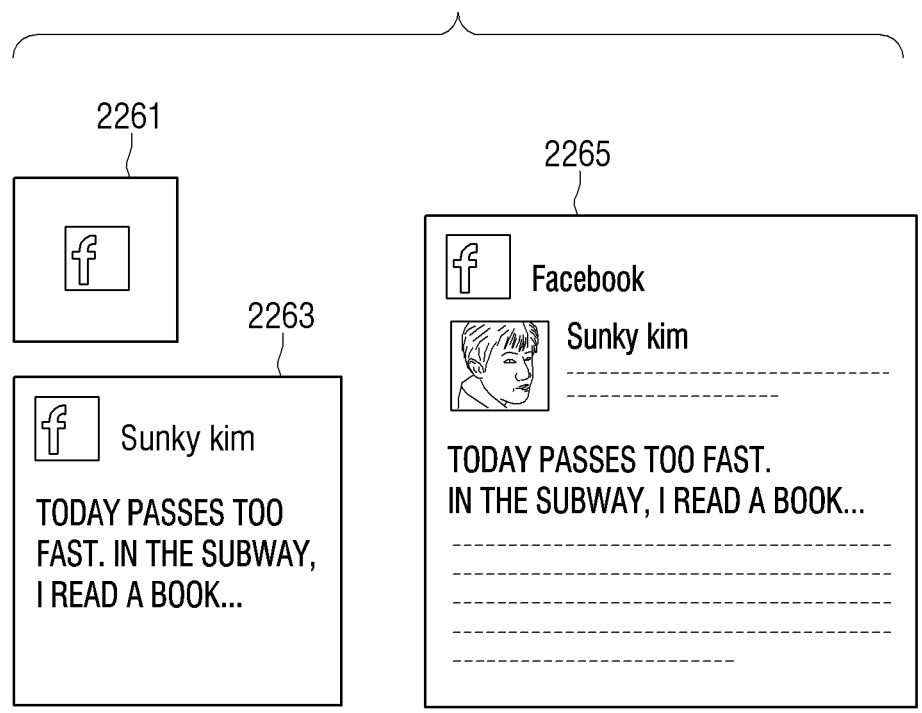

As illustrated in FIG. 22F, when an object corresponds to an SNS application, when the object occupies a square cell of the first number, the controller 290 may control the display 230 to display an object 2261 as an icon which corresponds to the SNS application. In addition, when the object occupies a square cell of the second number, the controller 290 may control the display 230 to display an object 2263 which includes brief information (for example, writer, contents of writing, etc.) of recently updated writing. Further, when the object occupies a square cell of the third number, the controller 290 may control the display 230 to display an object 2265 which includes detailed information (for example, a profile image, a recommendation icon, a reply, etc.) of a recently-updated writing.

Hereinafter, with reference to FIGS. 23A to 23D, as described above, an example which describes that the number of square cells on a grid screen which an object occupies according to a user interaction, and contents displayed on the object of which the number of cells is adjusted are changed will be described.

Figure 23A:
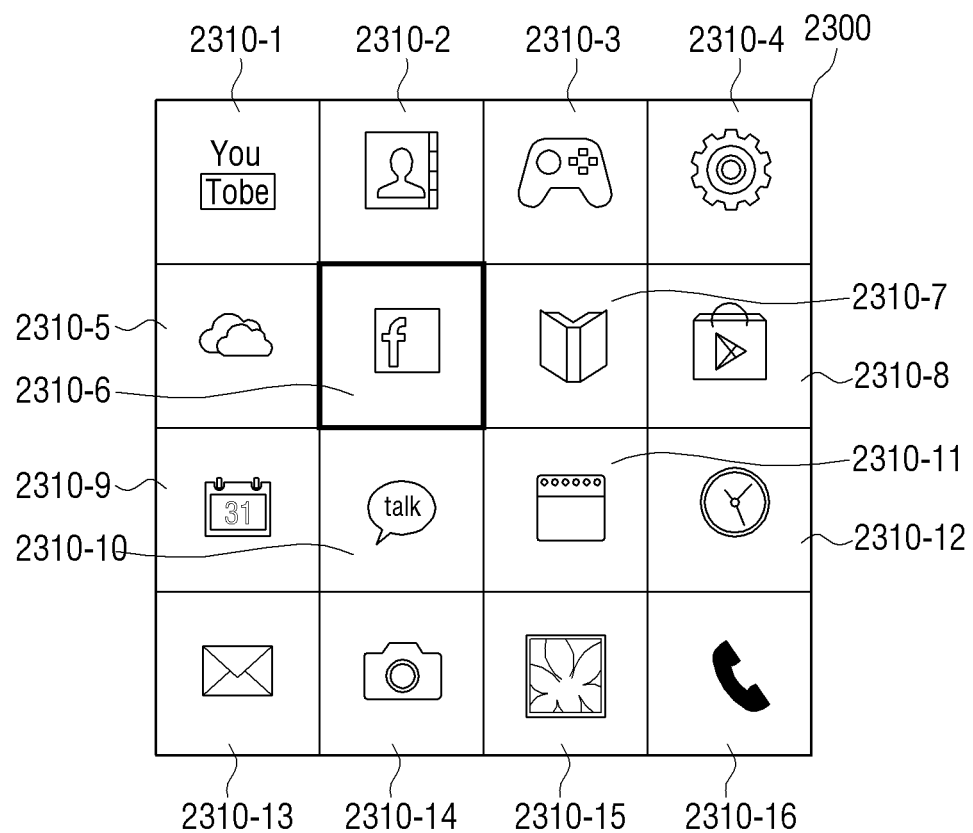
Figure 23B:
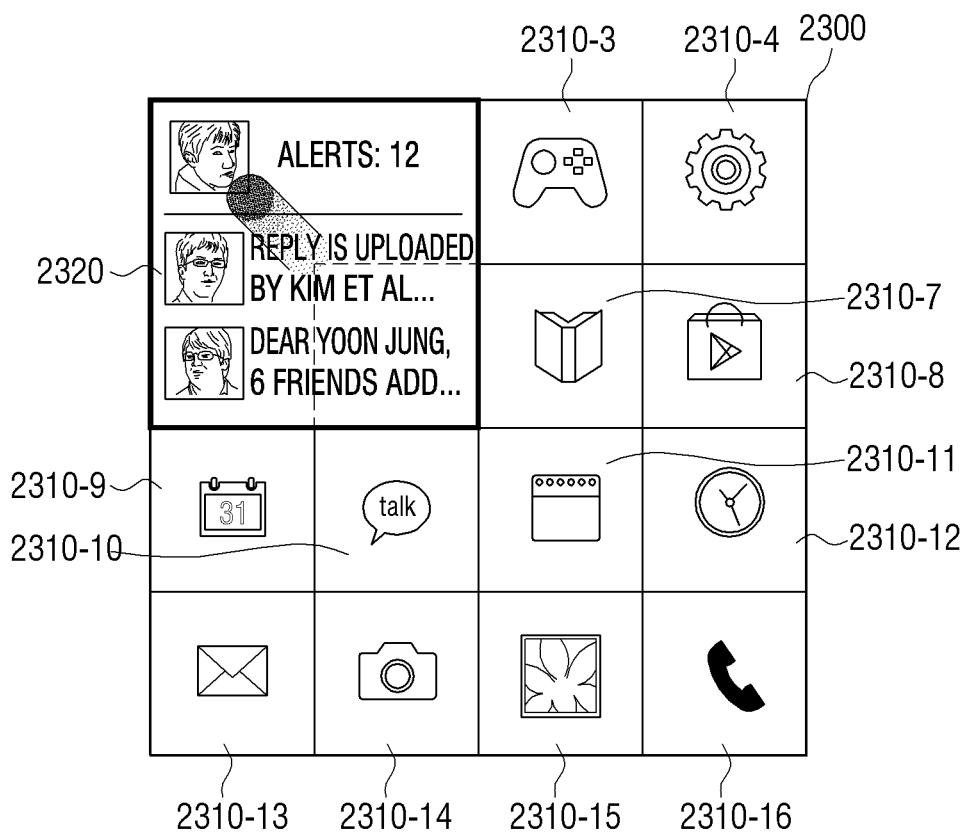

As illustrated in FIG. 23A, the display 230 displays sixteen objects 2310-1 to 2310-16 on a grid screen 2300. In this case, the sixteen objects 2310-1 to 2310-16 may include icons of the corresponding applications respectively.

In addition, when a user interaction to touch a sixth object 2310 which corresponds to the SNS application from among the sixteen objects 2310-1 to 2310-16 and drag the object in a right upper end is detected, the controller 290 may control the display 230 to increase size of the sixth object 2310-6 to occupy four cells, and change and display the object to an object 2320 which includes brief information on a recently updated writing. In this case, the controller 290 may control the display 230 to remove the first object 2310-1, the second object 2310-2, and the fifth object 2310-5 from a display screen.

Figure 23C:
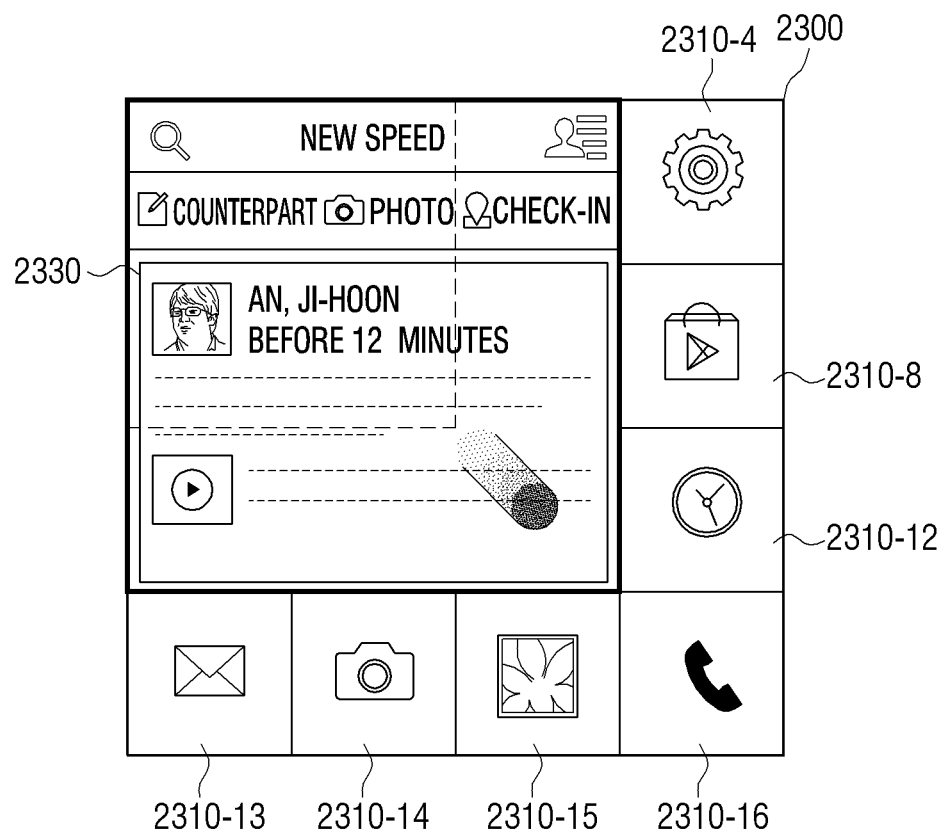

As illustrated in FIG. 23C, when a user interaction to drag the object 2320 which includes brief information on a recently updated writing in a right down direction is detected, the controller 290 may control the display 230 to increase size of the sixth object 2320 so that the object 2320 which includes brief information on a recently updated writing occupies nine cells, and change the object 2320 which includes brief information on a recently updated writing to an object 2330 which includes detailed information on a recently updated writing. At this time, the controller 290 may control the display 230 to remove the third object 2310-3, the seventh object 2310-7, the ninth object 2310-9, the tenth object 2310-10, and the eleventh object 2310-11 from a display screen.

Figure 23D:
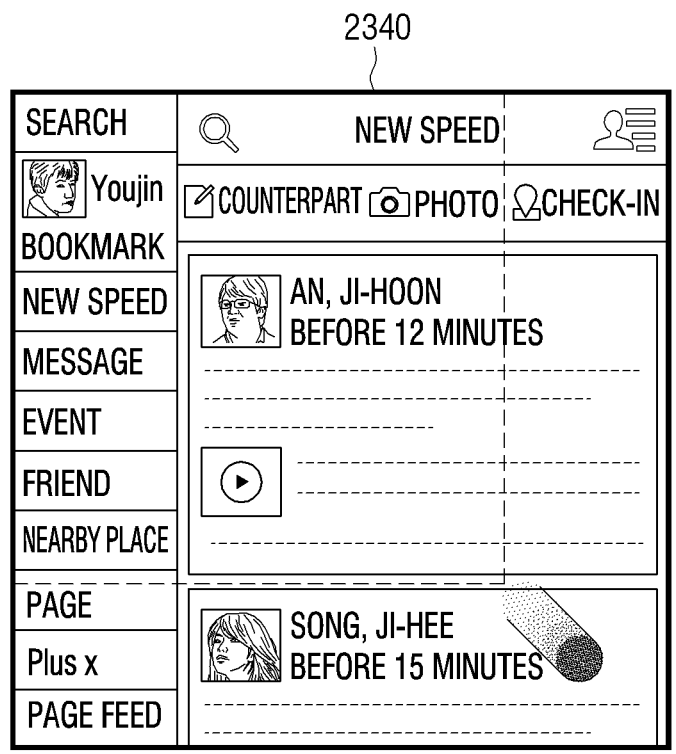

As illustrated in FIG. 23D, when a user interaction to drag the object in a right lower direction is detected, the controller 290 may control the display 230 to increase size of the sixth object 2330 so that the object 2330 which includes detailed information on a recently updated writing occupies all the sixteen cells, change the object 2330 which includes detailed information on a recently updated writing to an object 2340 which includes a screen for executing an SNS application, and display the object 2340. At this time, the controller 290 may control the display 230 to remove the fourth object 2310-4, the eighth object 2310-8, the twelfth object 2310-12, and the sixteenth object 2310-16 from a display screen.

In addition, when the number of square cells which occupies the object increases according to a user interaction, the controller 290 may change size and contents of the object using different methods according shape of an object which is displayed at a plurality of square cells.

Figure 24A:
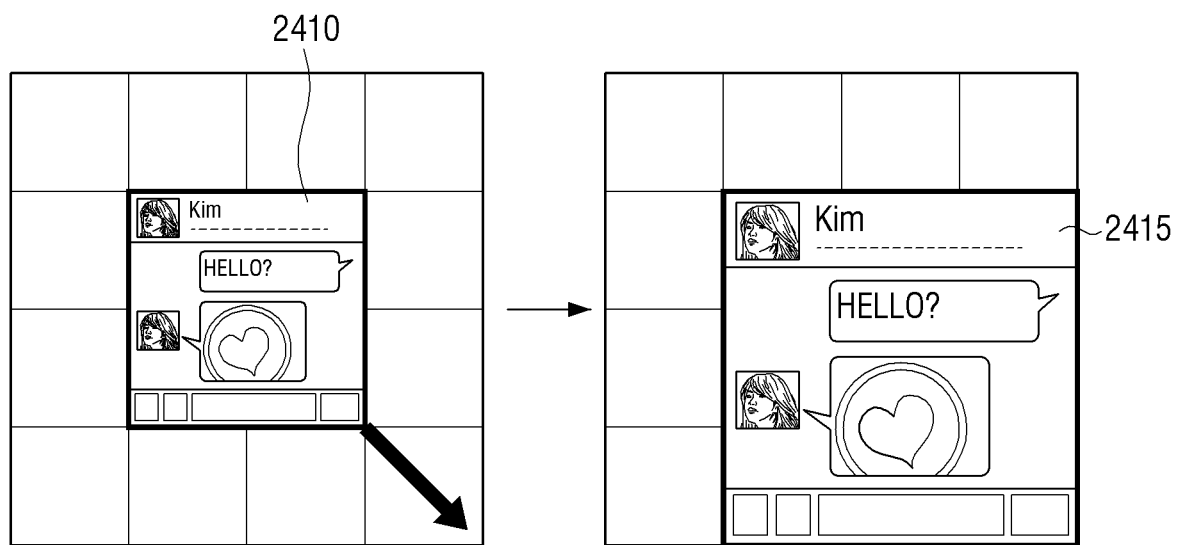

In particular, as illustrated in FIG. 24A, when a user interaction to touch an object 2410 which displays a chatting screen on four square cells and then drag the object in a right lower direction is detected, the controller 290 may increase size of the object 2415 to increase a screen ratio and display the chatting screen on nine square cells without changing contents of the chatting screen.

Figure 24B:
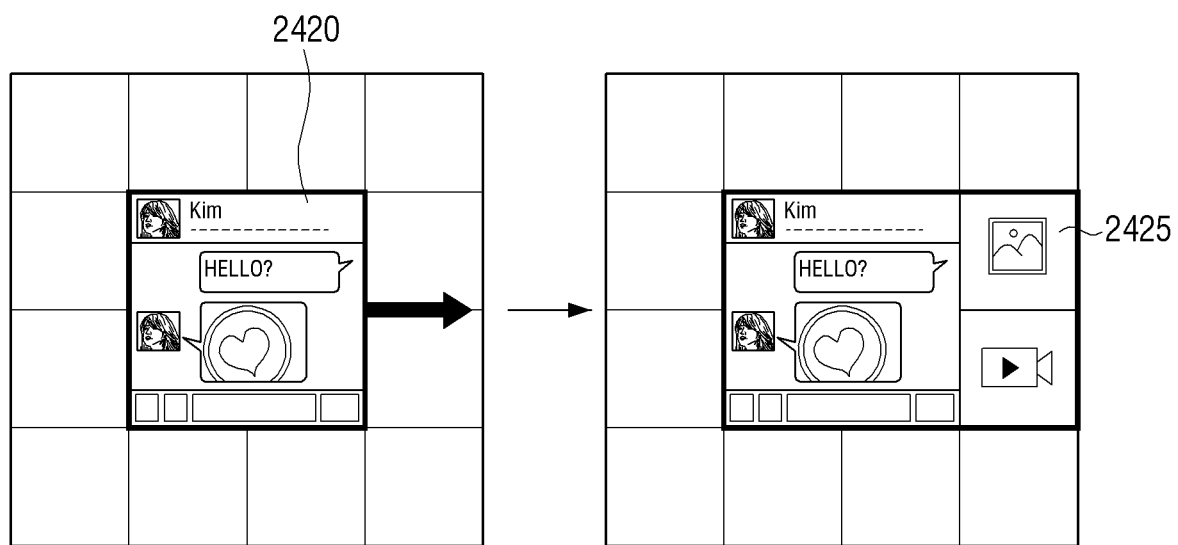

In addition, as illustrated in FIG. 24B, when a user interaction to touch an object 2420 which displays a chatting screen on four square cells and then drag the object in a right direction is detected, the controller 290 may increase size of the object 2425 so as to display the chatting screen on four square cells and display a menu related to the chatting application on two cells.

Figure 24C:
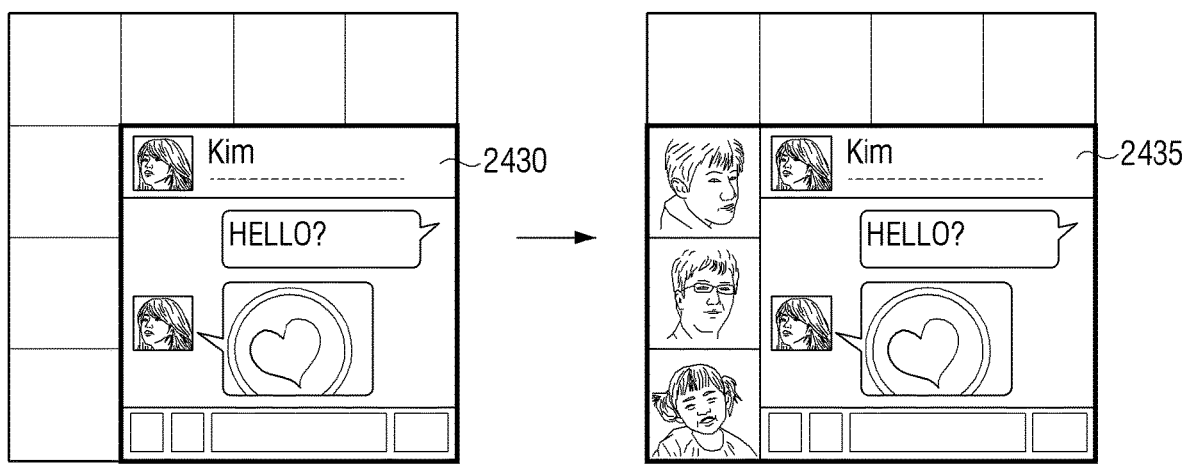

In addition, as illustrated in FIG. 24C, when a user interaction to touch an object 2430 which displays a chatting screen on nine square cells and then drag the object in a left direction is detected, the controller 290 may increase size of the object 2435 to so as to display the chatting screen on nine square cells and display chatters on three cells.

Figure 24D:
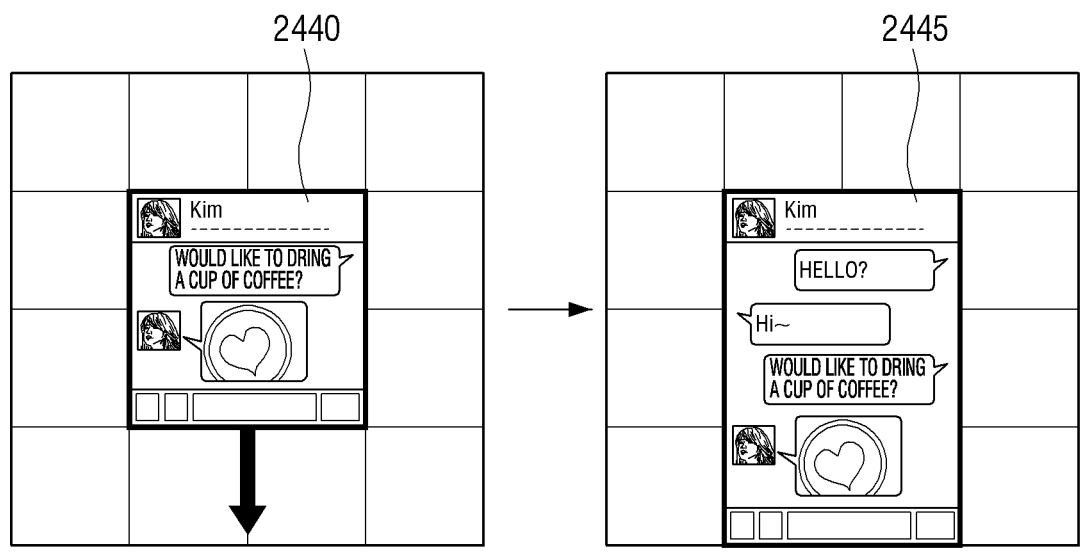

In addition, as illustrated in FIG. 24D, when a user interaction to touch an object 2440 which displays a chatting screen on four square cells and then drag the object in a downward direction is detected, the controller 290 may increase size of the object 2435 to display a chatting screen which may include more chatting contents.

Further, while displaying an image content on a plurality of square cells, when a user interaction is input, the controller 290 may enlarge or reduce the image contents according to a location of the square cell to which a user interaction is input and a direction of a user interaction.

Figure 25A:
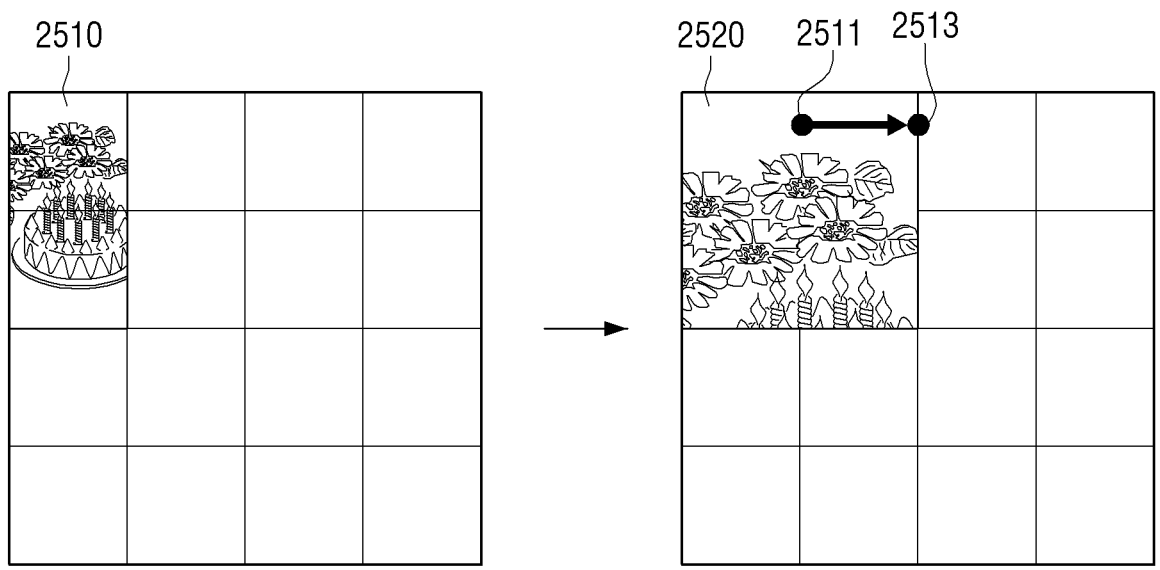

In particular, as illustrated in FIG. 25A, while a photo content 2510 is displayed on two square cells, when a user interaction to touch a first point 2511 of the content and then drag the point in a right direction to a second point 2513 is detected, the controller 290, as illustrated in right of FIG. 25A, may control the display 230 to display an image 2520 which enlarges a cell that is located at an upper area out of two square cells.

Figure 25B:
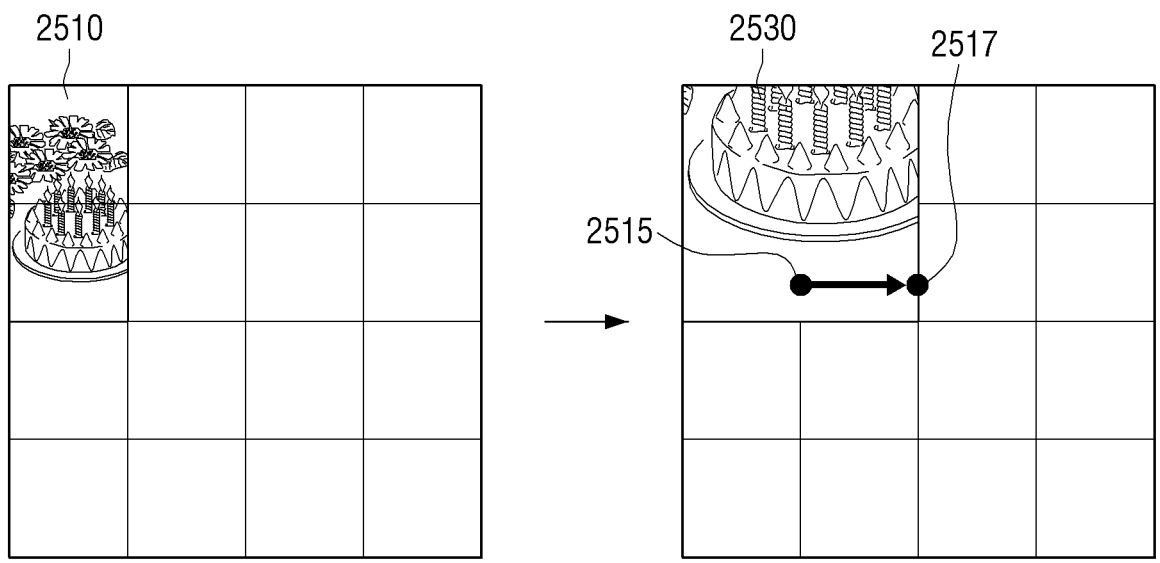

As illustrated in FIG. 25B, while a photo content 2510 is displayed on two square cells, when a user interaction to touch a third point 2515 of a photo content and then drag the point in a right direction to a fourth point 2517 is detected, the controller 290, as illustrated in right portion of FIG. 25B, may control the display 230 to display an image 2530 which enlarges a cell that is located at a lower end portion of two square cells.

Figure 25C:
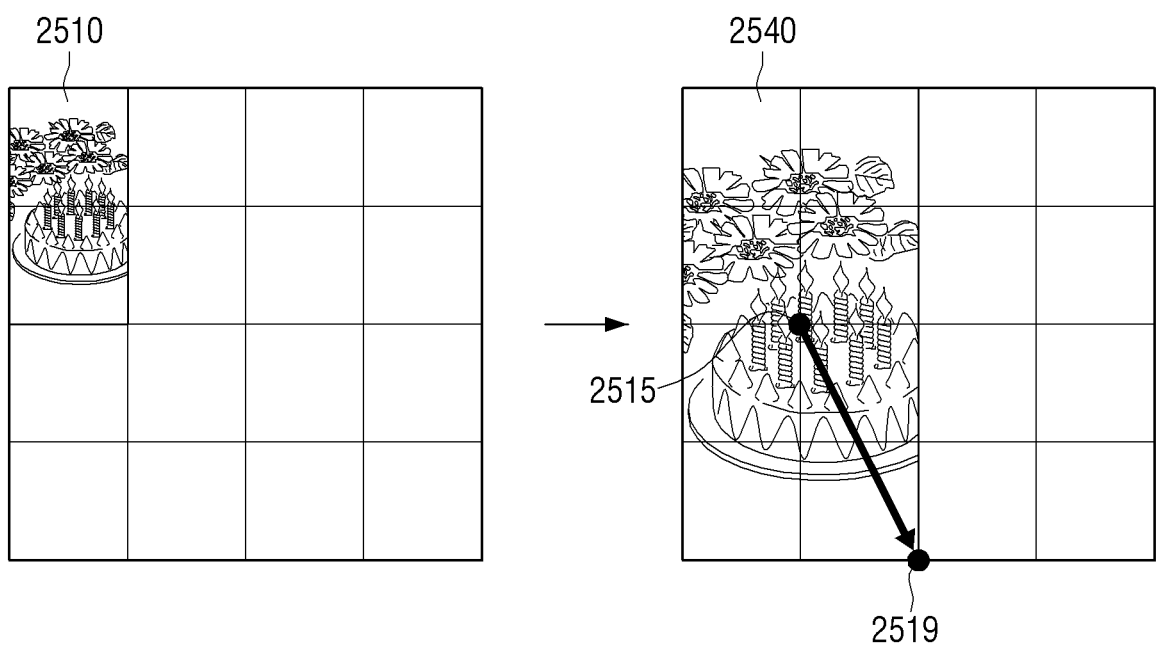
Figure 26:
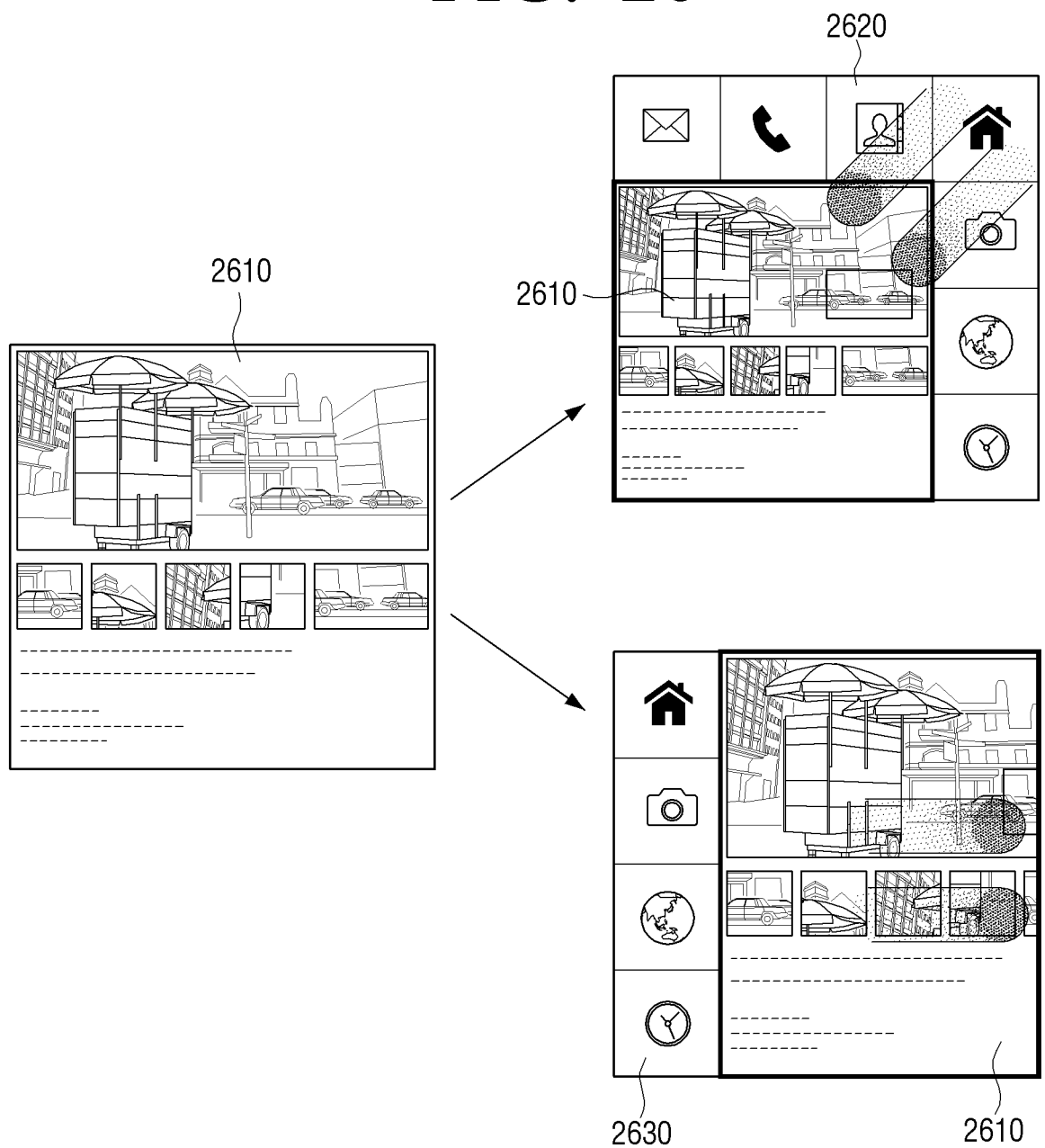

As illustrated in FIG. 25C, while a photo content 2510 is being displayed on two square cells, when a user interaction to touch a third point 2515 of the photo content and drag the point to a fifth point 2519 in a diagonal direction is detected, the controller 290, as illustrated in right of FIG. 25C, may control the display 230 to display an image 2540 which enlarges the photo content 2510 to be displayed on eight rectangular cells.

In addition, while one object is being displayed on a grid screen, when a user interaction to touch and drag two fingers at the same time is detected, the controller 290 may control the display 230 to move an object according to a user interaction and display a menu to control the user terminal device 200.

In particular, as illustrated in FIG. 26A, while a specific application screen 2610 is displayed, when a user interaction to touch a specific application screen 2610 with two fingers at the same time and drag in a left lower direction is detected, the controller 290 may control the display 230 to move a specific application screen 2610 in a left lower end direction, and display a menu 2620 which corresponds to various functions provided by the user terminal device at an upper end and right side of a display screen.

In addition, while a user interaction to touch a specific application screen 2610 with two fingers at the same time, and then drag in a right direction is detected, the controller 290 may control the display 230 to move the application screen 2610 in a right direction and display a menu 2630 which corresponds to various functions provided by the user terminal device on a left side of the display screen.

At this time, a menu which is generated according to moving of the specific application screen 2610 may include different menus according to a position of a display. For example, a menu which is displayed on an upper area is a notification menu which notifies a received message, received telephone, received e-mail, or the like, and a menu which is displayed at a right side or a left side is a menu which may execute frequently-used menu, and a menu which is displayed on an apex menu may be a menu to move to a home screen.

In addition, when a user interaction to touch and drag with two fingers is input for a plurality of times, the controller 290 may control the display 230 to move the application screen according to a user interaction and display a new application screen.

Figure 27A:
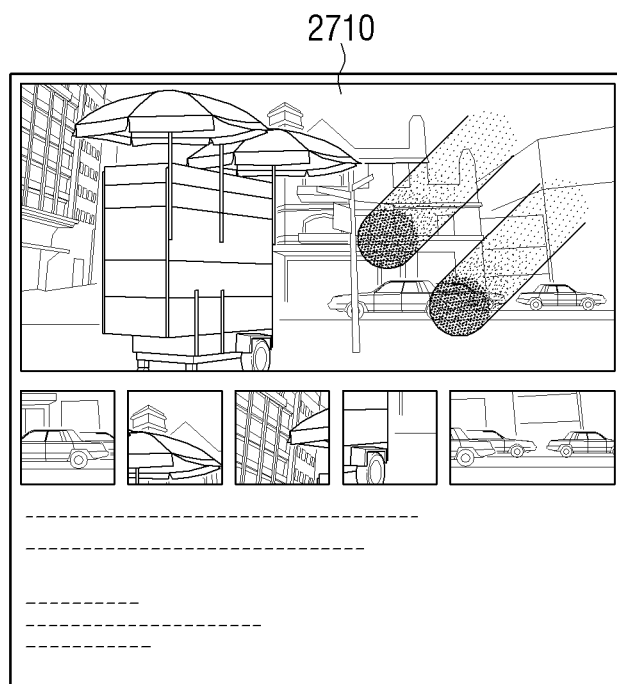
Figure 27B:
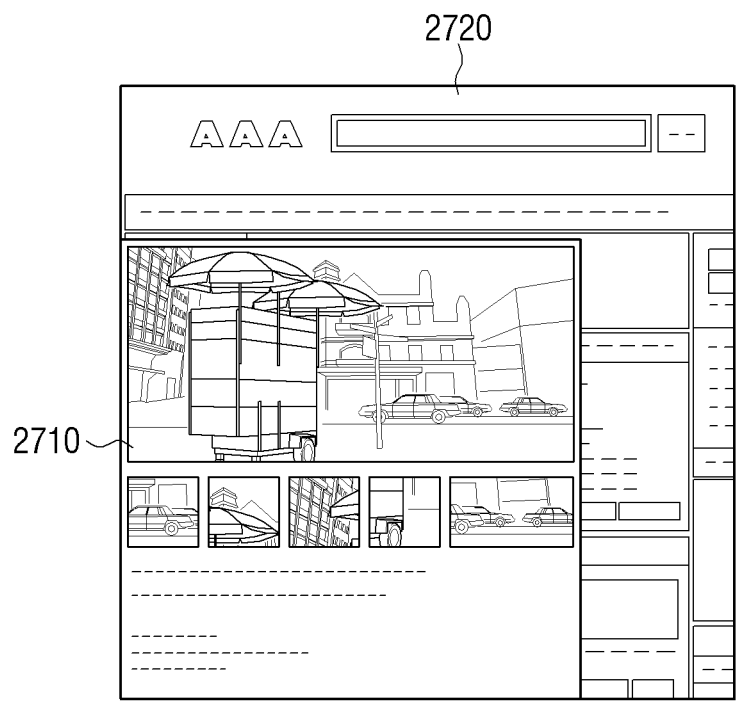

In particular, as illustrated in FIG. 27A, while a first application screen 2710 is displayed, when a user interaction to touch the first application screen 2710 with two fingers at the same time and drag in a left lower end direction is detected, the controller 290, as illustrated in FIG. 27B, may control the display 230 to move a first application screen 2710 in a left lower end direction and display a part of a second application screen 2720 on an upper end and right side of the display screen. At this time, the second application may be an application which was executed prior to the first application.

Figure 27C:
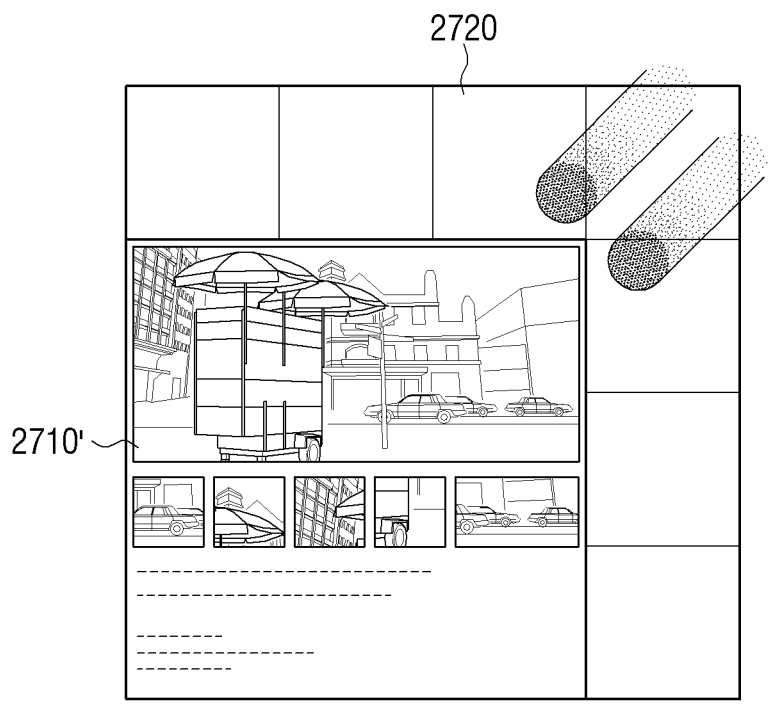
Figure 27D:
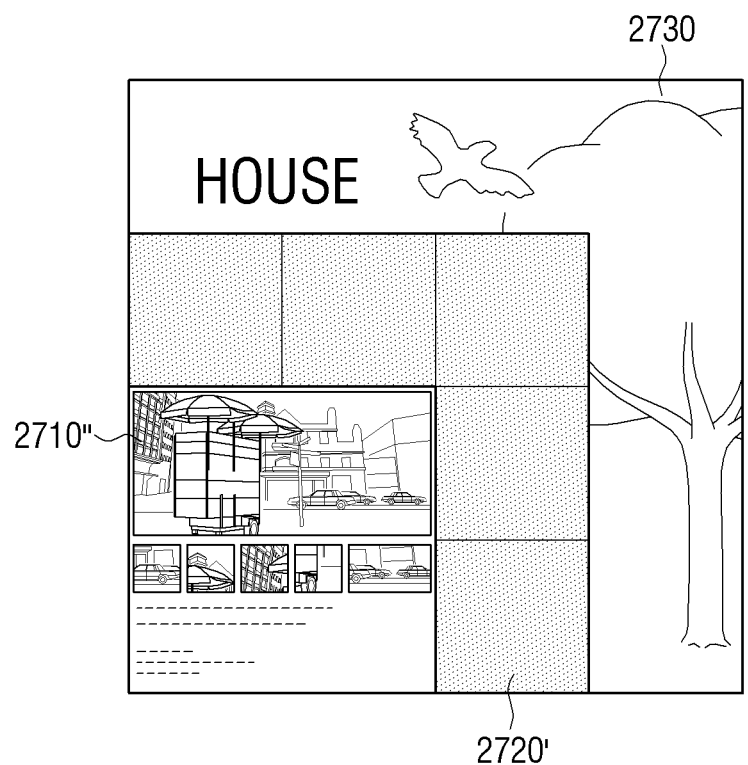

In addition, as illustrated in FIG. 27C, while the first application screen 2710' and a second application screen 2720 are displayed at the same time, when a user interaction to touch the second application screen 2720 with two fingers at the same time and drag in a left lower end direction is detected, the controller 290, as illustrated in FIG. 27D, may control the display 230 to move a first application screen 2710" and a second application screen 2720' in a left lower end direction and display a part of a third application screen 2730 at an upper and a right area of the display screen. In this case, the third application may be an application which was executed prior to the second application.

While the first application screen 2710' and the second application screen 2720 are displayed at the same time, when a user interaction to touch the first application screen 2710' with two fingers at the same time and drag in a left lower end direction is detected, the controller 290 may keep moving the first application screen 2710' in a left lower end direction and enlarge an area where the second application screen 2720 is displayed.

When a user interaction to touch and drag an intersection point of an area where a plurality of objects are displayed is detected, the controller 290 may adjust a screen ratio regarding a plurality of objects and a number of displayed objects according to a user interaction.

Figure 28A:
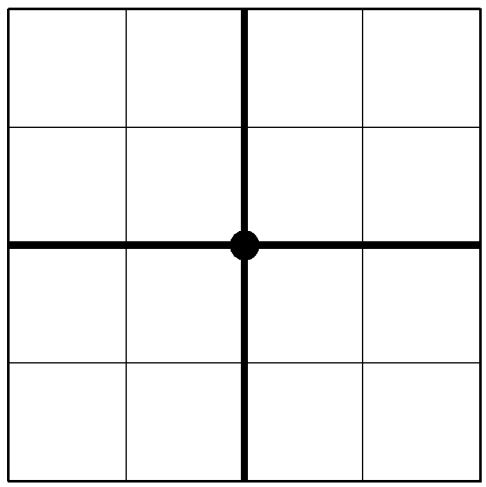
Figure 28B:
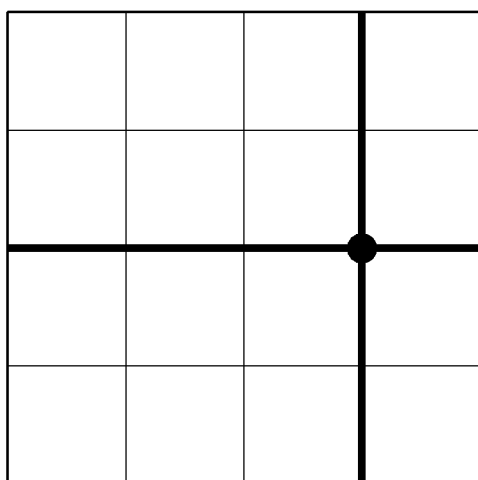

In particular, as illustrated in FIG. 28A, while four objects are displayed, when a user interaction to touch the intersection point and move the intersection point in a right direction by as much as the size of one rectangular cell is detected, the controller 290, as illustrated in FIG. 28B, may increase size of the first object and the third object, and reduce size of the second object and the fourth object.

Figure 28C:
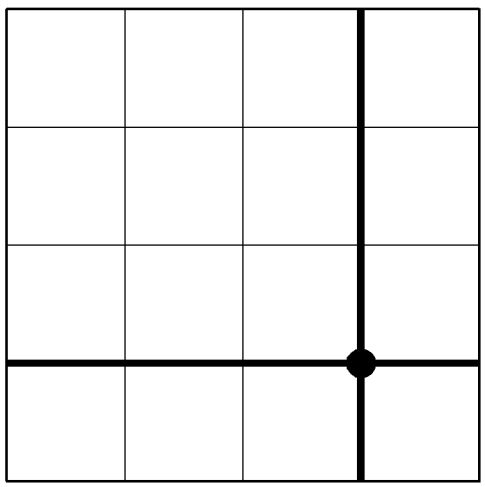

In addition, as illustrated in FIG. 28B, while four objects are displayed, when a user interaction to touch an intersection point and drag the point in a downward direction as much as size of one rectangular cell is detected, the controller 290, as illustrated in FIG. 28C, may increase size of the first object and the second object, and reduce size of the third object and the fourth object.

Figure 28D:
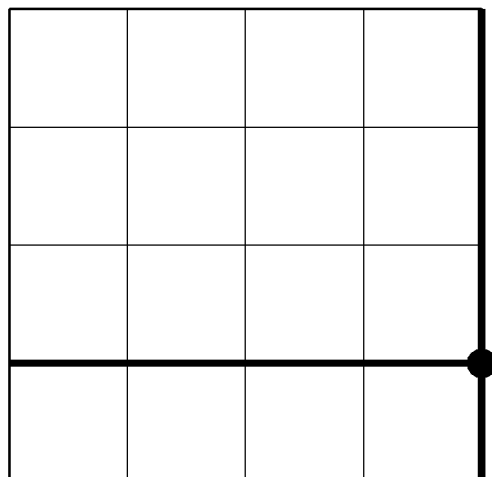

In addition, as illustrated in FIG. 28C, while four objects are displayed, when a user interaction to touch an intersection point and move the point in a right direction as much as size of one square cell is detected, the controller 290, as illustrated in FIG. 28D, may increase size of the first object and the third object and remove the second object and the fourth object from a display screen.

Figure 28E:
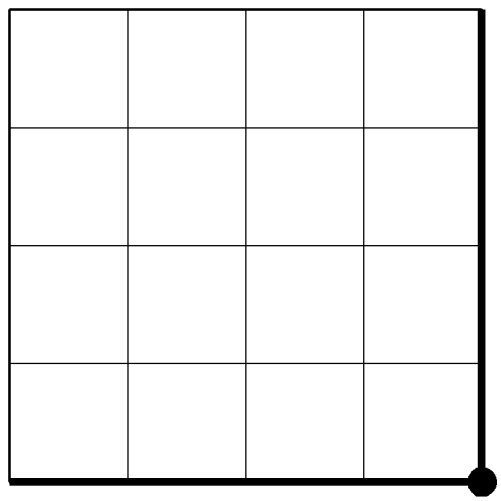

As illustrated in FIG. 28D, while two objects are displayed, when a user interaction to touch an intersection point and move the point in a downward direction as much as size of one rectangular cell is detected, the controller 290, as illustrated in FIG. 28E, may increase size of the first object and remove the third object from a display screen.

As described above, by touching and dragging the intersection point, a screen ratio of the object and the number of objects which may perform a plurality of tasks may be controlled at the same time.

When a user interaction (that is, long press interaction or a touch and hold input, etc.) to touch an intersection point of an area where a plurality of objects displayed is detected, the controller 290 may control the display 230 to integrate a plurality of objects which share the intersection point, generate one new object, and display the object.

Figure 29A:
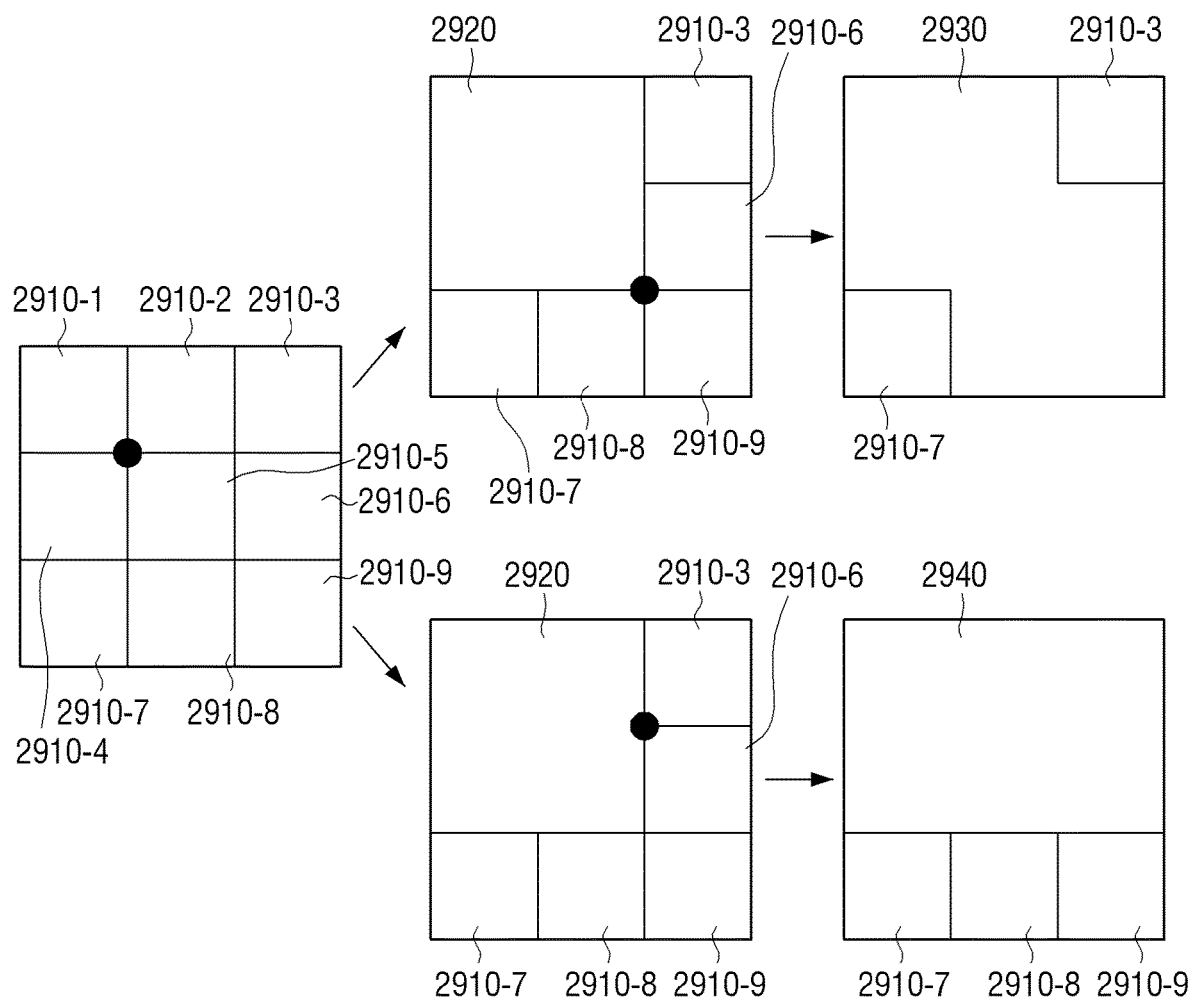

In particular, as illustrated in FIG. 29A, while a first object to a ninth object 2910-1 to 2910-9 are displayed, when a user action to touch an intersection point of the first object 2910-1, a second object 2910-2, a fourth object 2910-4, and a fifth object 2910-5 for a preset time is detected, the controller 290 may control the display 230 to display a tenth object 2920 by incorporating the first object 2910-1, the second object 2910-2, the fourth object 2910-4, and the fifth object 2910-5.

In addition, when a user interaction to touch an intersection point of the tenth object 2920, a sixth object 2910-6, an eighth object 2910-8, and a ninth object 2910-9 for a preset time is detected, the controller 290 may control the display 230 to display a new eleventh object 2930 by integrating the tenth object 2920, the sixth object 2910-6, the eighth object 2910-8, and the ninth object 2910-9.

According to another exemplary embodiment, when a user interaction to touch an intersection point of the tenth object 2920, the third object 2910-3, and the sixth object 2910-6 for a preset time is detected, the controller 290 may control the display 230 to display a new twelfth object 2940 by integrating the tenth object 2920, the third object 2910-3, and the sixth object 2910-6.

In particular, when a plurality of objects are icons to execute a plurality of applications, when a long press interaction is detected at an intersection point of a plurality of objects, the controller 290 may generate a upper folder of the objects which share the intersection point at which the long press interaction is detected.

Figure 29B:
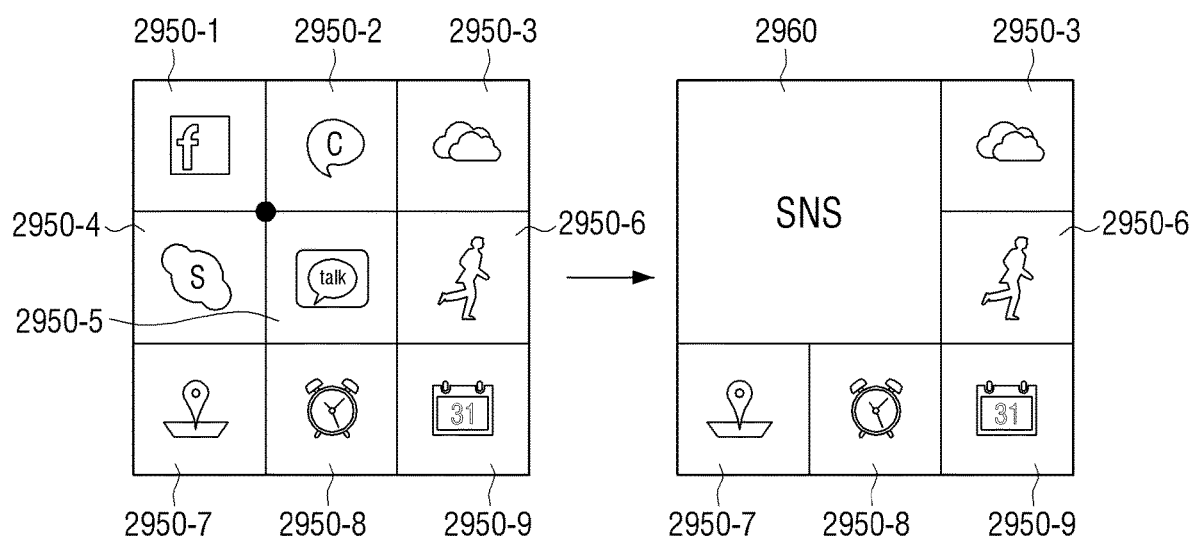

In particular, as illustrated in FIG. 29B, while the first execution icon to the ninth execution icon 2950-1 to 2950-9 are displayed, when a user interaction to long press an intersection point of the first execution icon 2950-1, the second execution icon 2950-2, the fourth execution icon 2950-4, and the fifth execution icon 2950-5 is detected, the controller 290 may control the display 230 to remove the first execution icon 2950-1, the second execution icon 2950-2, the fourth execution icon 2950-4, and the fifth execution icon 2950-5 from a display screen, and display an SNS folder 2960 which is an upper folder of the first execution icon 2950-1, the second execution icon 2950-2, the fourth execution icon 2950-4, and the fifth execution icon 2950-5. In this case, a folder name may be designated by a user.

In particular, in a case when a plurality of objects are a plurality of contents icons, when a long press interaction is detected at an intersection point of a plurality of objects, the controller 290 may generate a playlist including contents which share an intersection point in which a long press interaction is detected.

Figure 29C:
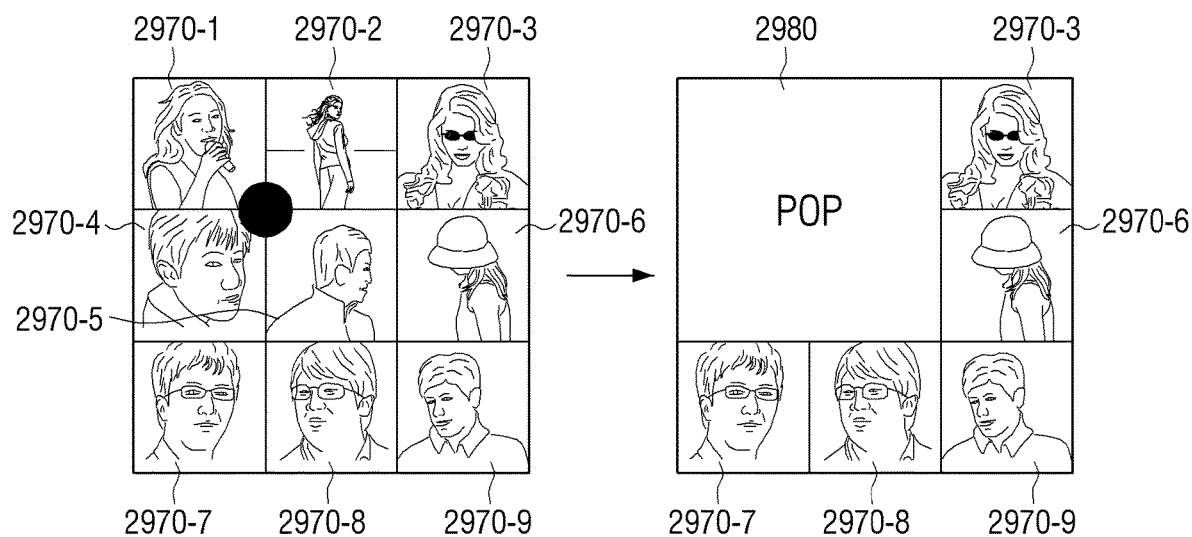

In particular, as illustrated in FIG. 29C, while the first contents icon to the ninth contents icon 2970-1 to 2970-9 are displayed, when an interaction to long press an intersection point of the first contents 2970-1, the second contents icon 2970-2, the fourth contents icon 29704, and the fifth contents icon 2970-5 is detected, the controller 290 may control the display 230 to remove the first contents icon 2970-1, the second contents icon 2970-2, the fourth contents icon 2970-4, and the fifth contents icon 2970-5 from the display screen, and display a POP list 2980 which is a playlist which includes the first contents icon 2970-1, the second contents icon 2970-2, the fourth contents icon 2970-4, and the fifth contents icon 2970-5. In this case, a name of the playlist may be designated by a user.

When a user interaction to touch and drag one of intersection points of a plurality of objects located at one side of the display screen is detected, the controller 290 may adjust the number of objects displayed on the display screen.

Figure 30A:
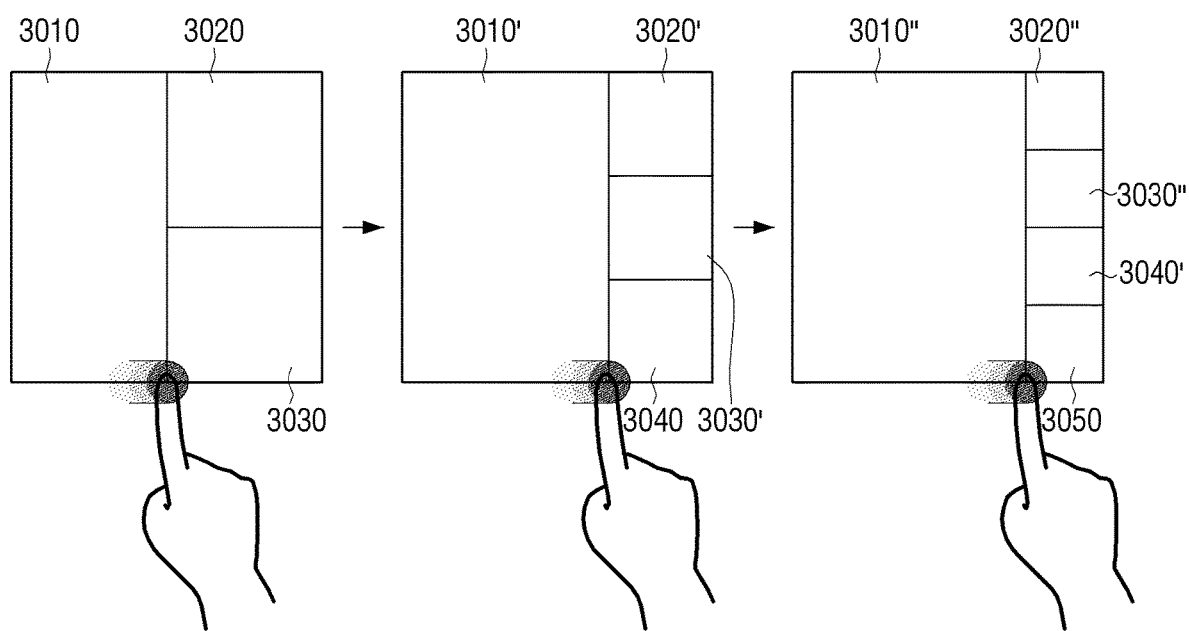

In particular, as illustrated in FIG. 30A, while the first object to the third object 3010 to 3030 are displayed, when a user interaction to touch and drag the first object 3010 and the third object 3030 in a right direction is detected, the controller 290 may control the display 230 to increase size of the first object 3010', reduce size of the second object 3020', and the third object 3030', and display the fourth object 3040 at a lower end of the third object 3030.

In addition, while displaying the first object to the fourth object 3010-3040, when a user interaction to touch an intersection point of the first object 3010' and the fourth object 3040 and drag the point in a right direction is detected, the controller 290 may control the display 230 to increase size of the first object 3010", reduce size of the second object 3020", the third object 3030", and the fourth object 3040', and display the fifth object 3050 at a lower end of the fourth object 3040'.

Figure 30B:
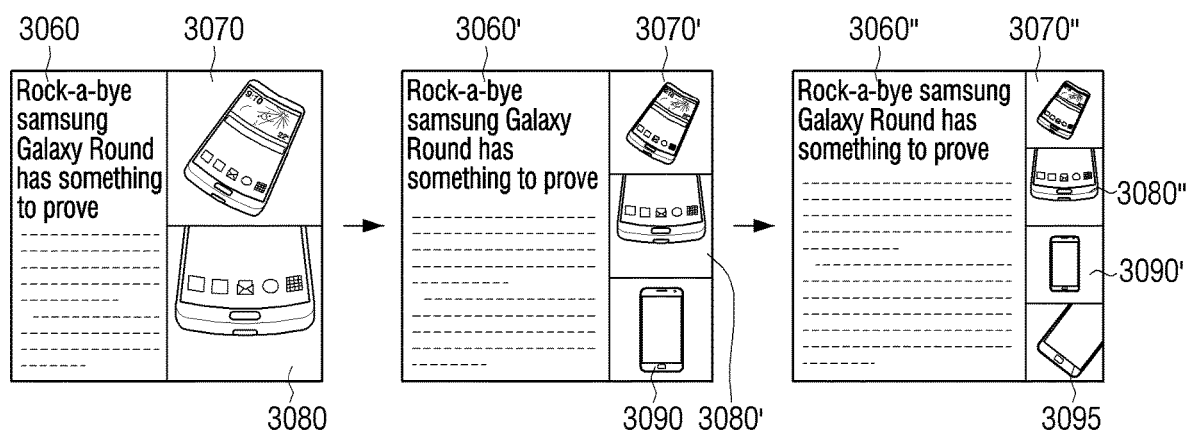

In particular, as illustrated in FIG. 30B, while a news content 3060, a first photo content 3070, and a second photo content 3080 are displayed, when a user interaction to touch an intersection point of the news content 3060 and the second photo content 3080 and drag in a right direction is detected, the controller 290 may control the display 230 to increase size of the news content 3060', reduce size of the first photo content 3070' and the second photo content 3080', and display a new third photo content 3090. In addition, when a user interaction to keep dragging in a right direction is detected, the controller 290 may control the display 230 to generate and display a new fourth photo content 3095 and increase size of the news content 3060", reduce size of the first photo content 3070", the second photo content 3080", and third photo content 3090'. In this case, the first to fourth photo content 3070, 3080, 3090, and 3095 may be related to news content 3060.

Figure 31A:
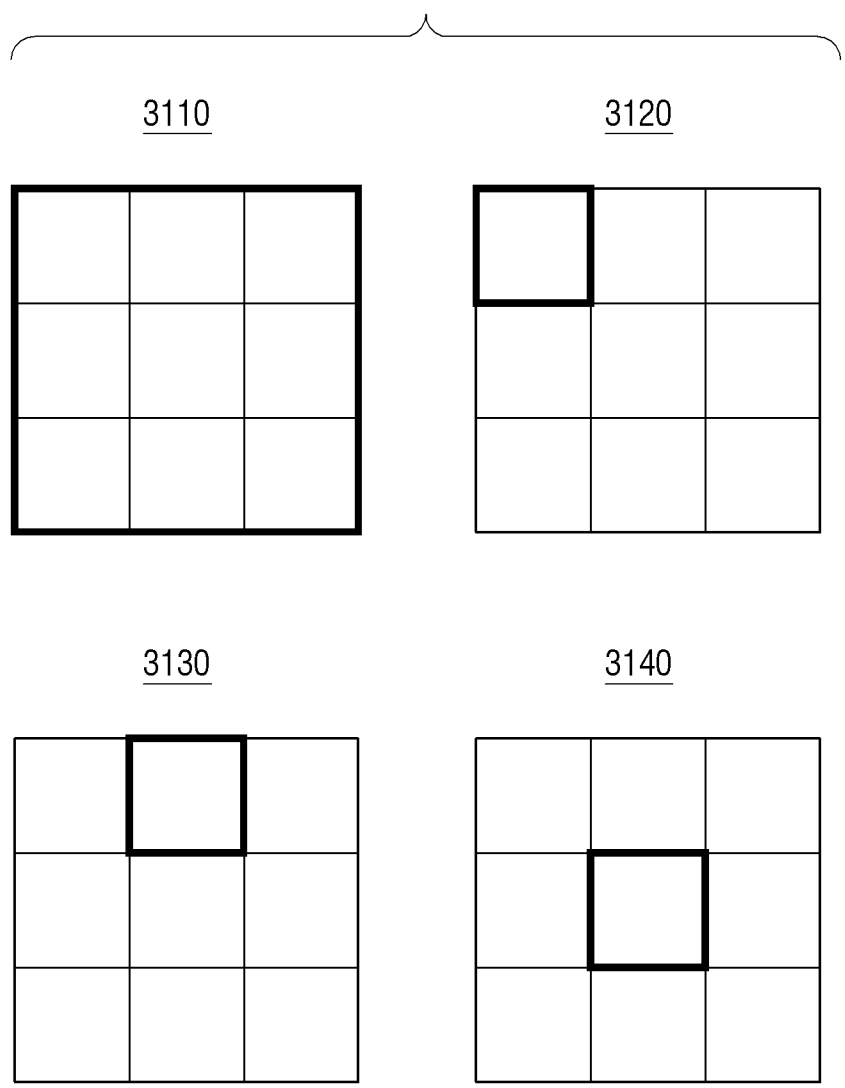

In addition, the controller 290 may provide different functions on a main object according to the number of lines which are in contact with each other from among a plurality of lines included in the display 230. In particular, the controller 290, as illustrated in FIG. 31A, when a main object 3110 is in contact with four lines of the display 230, as illustrated in FIG. 31B, when a main object 3120 is in contact with two lines of the display 230, as illustrated in FIG. 31C, when a main object 3130 is in contact with one line of the display 230, as illustrated in FIG. 31D, when a main object 3140 is not in contact with lines of the display 230, may provide different functions.

Figure 31B:
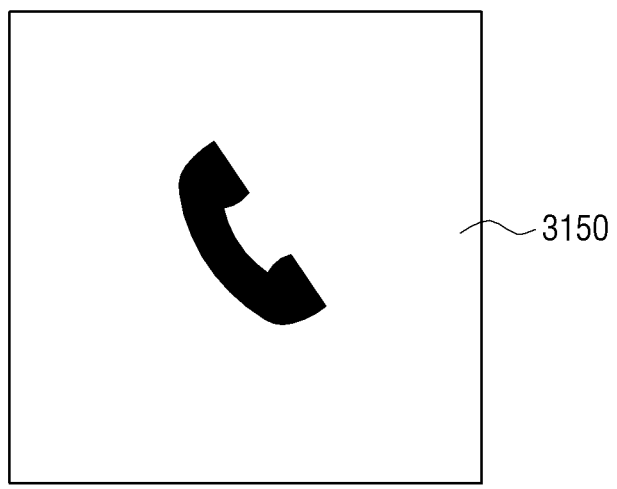
Figure 31C:
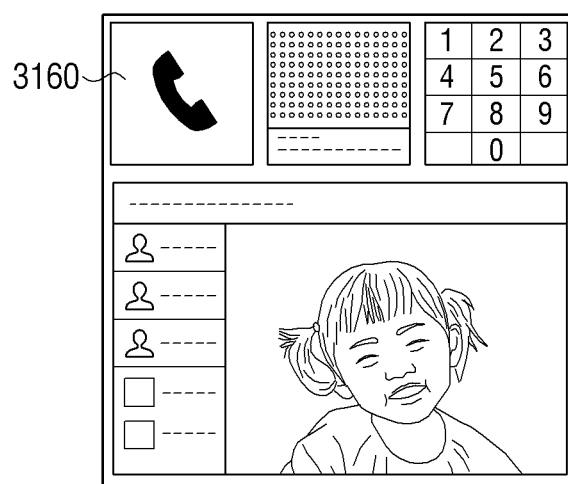
Figure 31D:
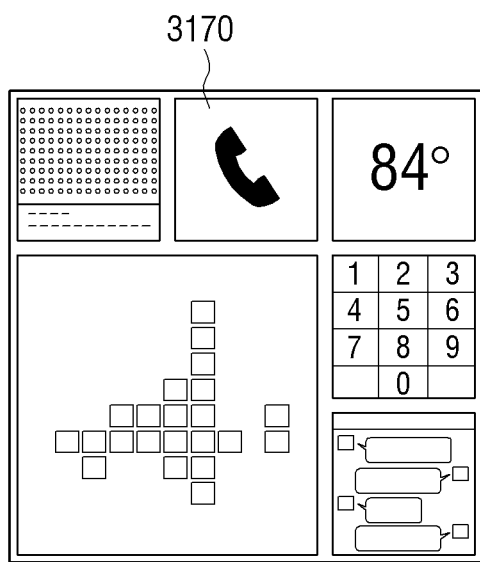
Figure 31E:
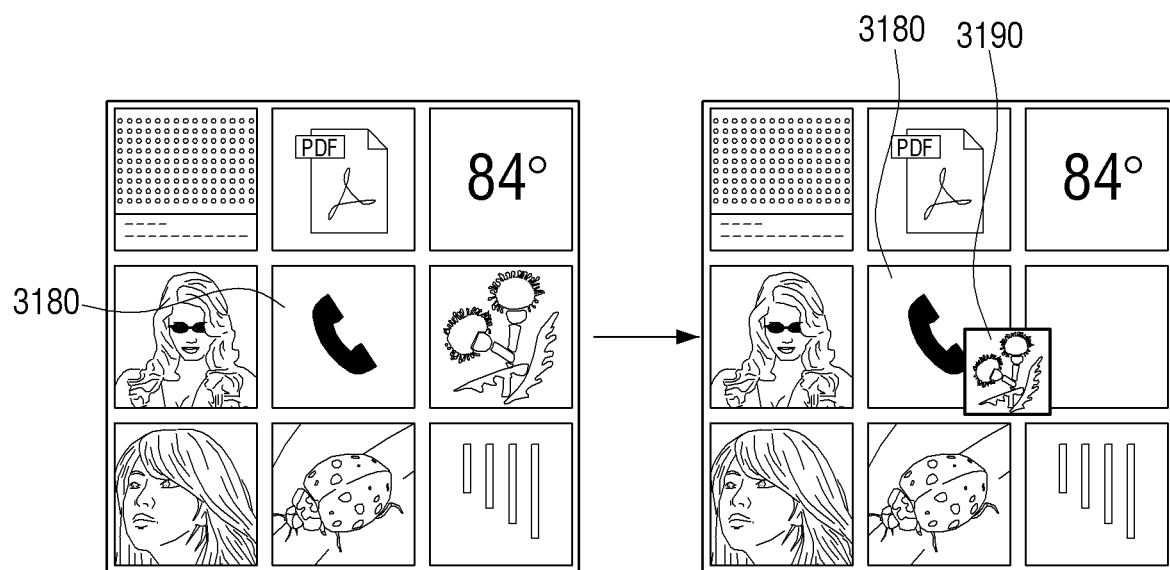

In particular, when a main object is an object which corresponds to a telephone application, as illustrated in FIG. 31B, when the main object 3150 is in contact with four lines of the display 230, the controller 290 may control the user terminal device 200 to perform telephone function. In addition, as illustrated in FIG. 31C, when a main object 3160 is in contact with two lines of the display 230, the controller 290 may control to pause a telephone function of the user terminal device 200 temporarily. In addition, as illustrated in FIG. 31D, when a main object 3170 is in contact with one line of the display 230, the controller 290 may enter a multi-tasking mode so that the user terminal device may perform not only telephone function but also other functions at the same time. In addition, as illustrated in FIG. 31E, when a main object 3180 is not in contact with one line of the display 230, if a user interaction to drag another object 3190 to an area where the main object 3180 is displayed is detected, the controller 290 may control the communicator 240 to share with a receiver of a phone call a content which corresponds to the another object 3190.

When a mode of the user terminal device 200 is a general mode not a grid editing mode, if a user interaction to select and drag one of a plurality of objects is detected, the controller 290 may control the display 230 so that items on the selected object may be displayed on an area which corresponds to the dragging direction.

Figure 32A:
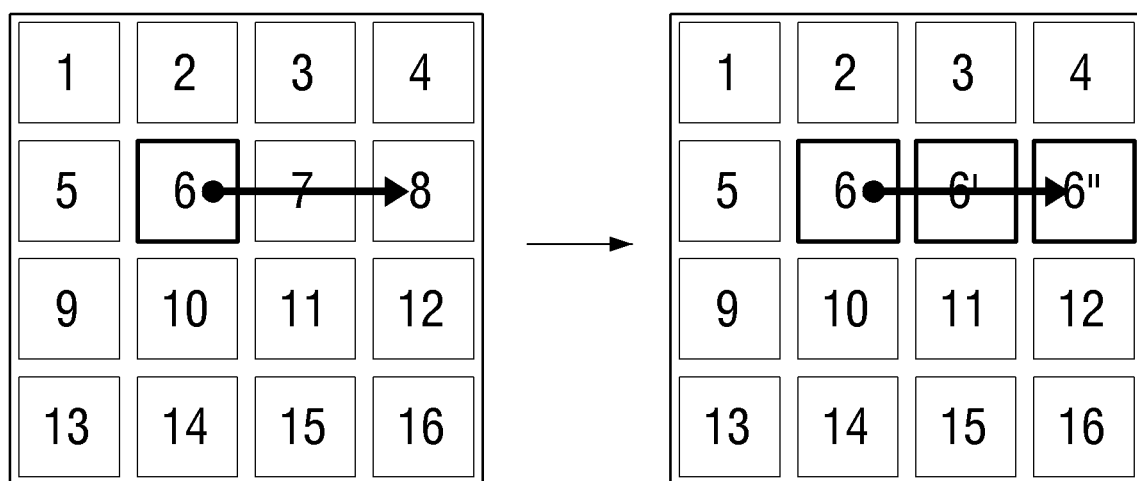

In particular, as illustrated in FIG. 32A, while the first object to the sixteenth object are displayed, when a user interaction to drag the sixth object is detected, the controller 290 may control the display 230 to remove the seventh object and the eighth object from the display screen, and display the items 6' and 6" on the sixth object on an area where the seventh object and the eighth object are displayed.

Figure 32B:
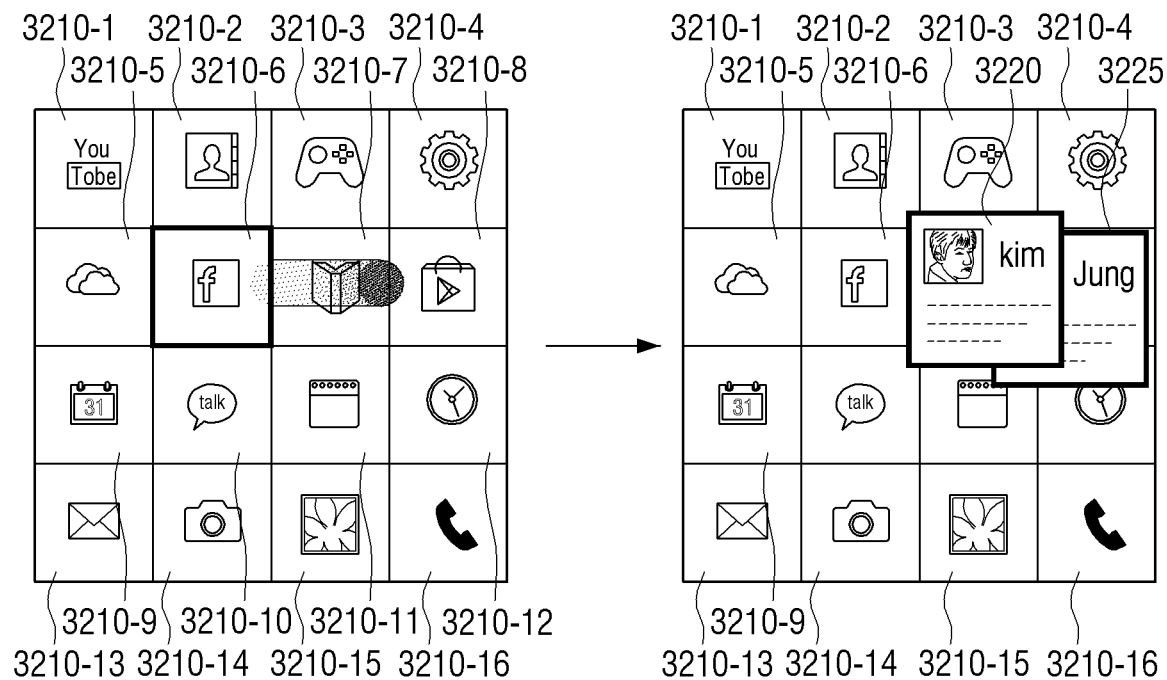

Referring to an exemplary embodiment, as illustrated in FIG. 32B, while displaying a plurality of objects 3210-1 to 3210-16 which correspond to a plurality of applications, when a user interaction to drag the six application 3210-6 which corresponds to the SNS application in a right direction is detected, the controller 290 may control the display 230 to display recently updated writings 3220 and 3225 which are the execution items of the SNS application on an area where the seventh object 3210-7 and the eighth object 3210-8 are displayed. In this case, the recently updated writings 3220 and 3225 may have size larger than one square cell, but this is merely exemplary, and the recently updated writings 3220 and 3225 may be displayed on one square cell respectively.

Figure 32C:
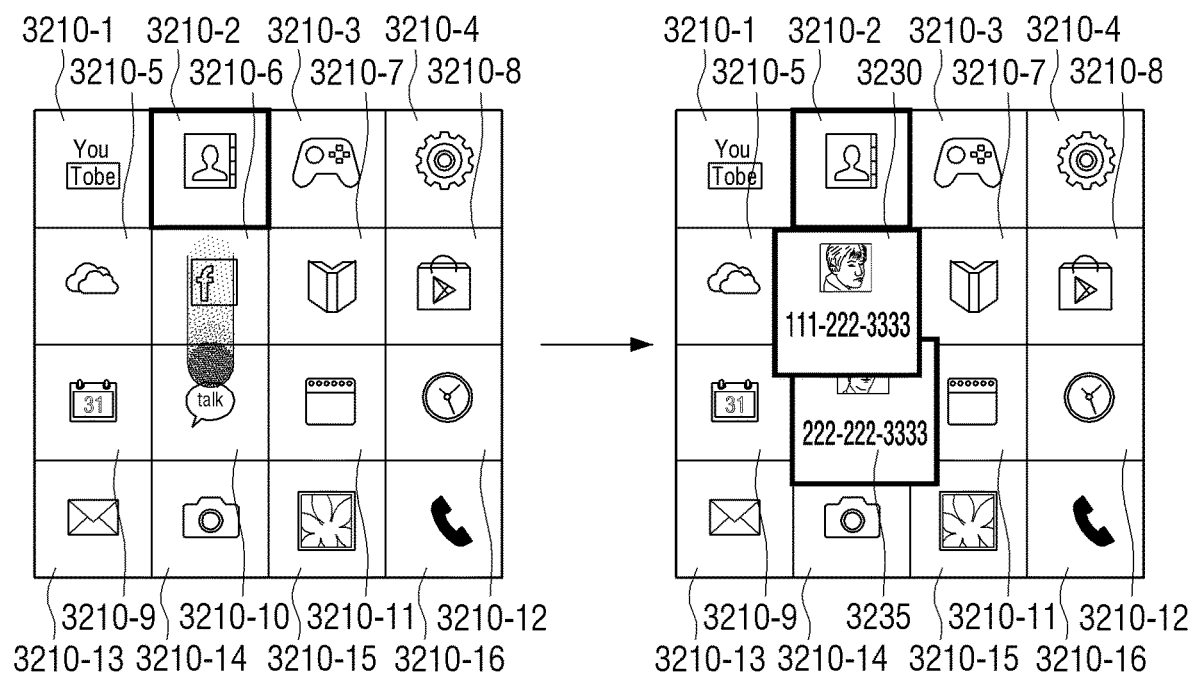

In addition, as illustrated in FIG. 32C, while a plurality of objects 3210-1 to 3210-16 which correspond to a plurality of applications are displayed, when a user interaction to drag the second application 3210-2 which corresponds to the contact list application in a downward direction is detected, the controller 290 may control the display 230 to display information 3230 and 3235 on the recently contacted contact list which are the execution items of the contact list application at an area where the sixth object 3210-7, the tenth object 3210-10, and the fourteenth object 3210-14 are displayed. In this case, the information 3230 and 3235 on the recently contacted contact list may have size larger than one square cell, but this is merely exemplary, and the information 3230 and 3235 on the recently contacted contact list may be displayed on one square cell respectively.

<Sharing Contents Among a Plurality of User Terminal Devices>

Figure 33:
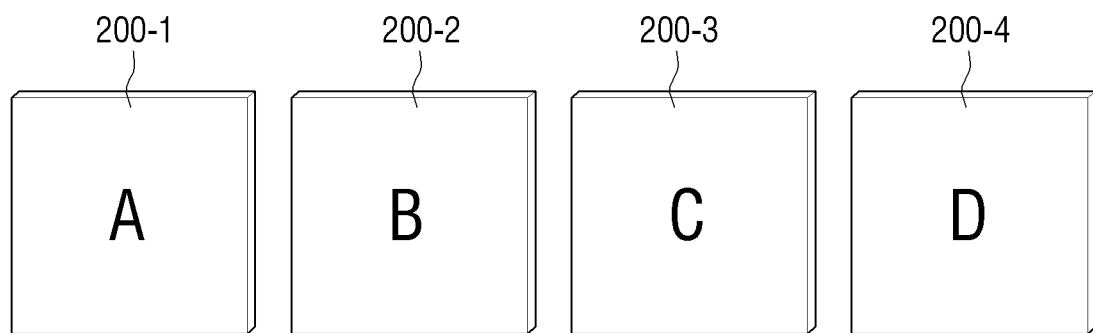
FIGS. 33 to 38 are views illustrating performing various functions using a plurality of user terminal devices according to various exemplary embodiments.

According to another exemplary embodiment, as illustrated in FIG. 33, a plurality of user terminal devices 200-1, 200-2, 200-3, 200-4 having a display panel in a square shape may share contents when a preset condition is satisfied. In particular, as there is a display panel in a square shape of which length of width and height is the same, when one line of a plurality of user terminal devices 200-1, 200-2, 200-3, 200-4 is in contact with each other regardless of direction, user terminal devices of which lines are in contact with may share contents.

At this time, the plurality of user terminal devices 200-1, 200-2, 200-3, and 200-4 may determine a proximity direction through various methods. As an exemplary embodiment, a plurality of user terminal devices 200-1, 200-2, 200-3, and 200-4 may determine proximity direction using NFC communication technology. In particular, each of a plurality of user terminal devices 200-1, 200-2, 200-3, and 200-4 may include four NFC chips 244 on four sides, and when the NFC chips 244 which are included in the lines which are in contact with each other are tagged to each other, the proximity direction among the user terminal devices may be determined. As another exemplary embodiment, a plurality of user terminal devices 200-1, 200-2, 200-3, and 200-4 may determine proximity direction among the user terminal devices using an infrared ray detector. Each of a plurality of user terminal devices 200-1, 200-2, 200-3, 200-4 may have four infrared ray detectors on four sides, and determine proximity direction among the user terminal devices thorough the infrared ray detector. In addition, a plurality of user terminal devices 200-1, 200-2, 200-3, and 200-4 may determine whether lines among the user terminal devices are in contact with each other using a touch detector. However, as described above, to determine proximity direction and whether lines among the user terminal devices are in contact with each other using NFC communication technology, an infrared ray detector, and a touch detector is merely exemplary, and the proximity direction and whether the lines among the user terminal devices are in contact with each other may be determined using another method.

At this time, a plurality of user terminal devices 200-1, 200-2, 200-3, 200-4 may determine a connection state by determining lines which are in contact with each other, and display a sharing area in which the contents may be shared based on the connection state. In addition, when a user interaction to drag a contents icon displayed on one of the plurality of user terminal devices 200-1, 200-2, 200-3, and 200-4 is detected, contents which correspond to a contents icon in which the user interaction is detected may be shared with another user terminal device.

Figure 34A:
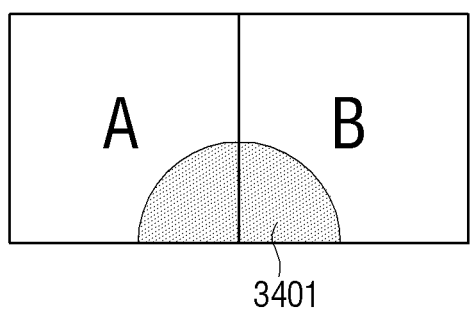

In particular, when a right line of the first user terminal device 200-1 is in contact with a left line of the second user terminal device 200-2, the first user terminal device 200-1 and the second user terminal device 200-2 may determine a connection state through at least one detector, and as illustrated in FIG. 34A, and display a shared area 3401 at a lower end portion of the lines in contact with each other of the user terminal device based on the determined connection state.

Figure 34B:
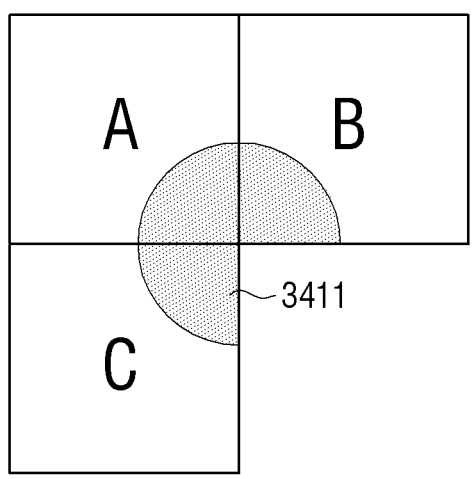

In addition, when a right line of the first user terminal device 200-1 is in contact with a left line of the second user terminal device 200-2, and a bottom line of the first user terminal device 200-1 is in contact with an upper line of the third user terminal device 200-3, the first to third user terminal devices 200-1 to 200-3 may determine a connection state through at least one detector, and as illustrated in FIG. 34B, display a shared area 3411 at an area where three user terminal devices are in contact with each other based on the determined connection state.

Figure 34C:
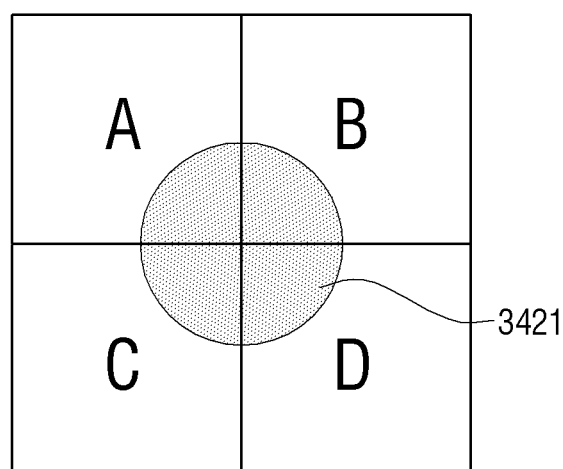

In addition, when a right line of the first user terminal device 200-1 is in contact with a left line of the second user terminal device 200-2, a bottom line of the first user terminal device 200-1 is in contact with an upper line of the third user terminal device 200-3, a bottom line of the second user terminal device 200-2 is in contact with an upper line of the fourth user terminal device 200-4, a right line of the third user terminal device 200-3 is in contact with a left line of the fourth user terminal device 200-4, the first to fourth user terminal devices 200-1 to 200-4 may determine a connection state through at least one detector, and as illustrated in FIG. 34C, display a shared area 3421 at an area where four user terminal devices are in contact with each other, based on the determined connection state.

Figure 34D:
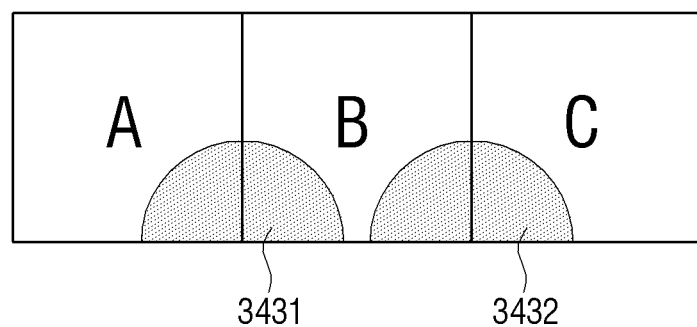

In addition, when a right line of the first user terminal device 200-1 is in contact with a left line of the second user terminal device 200-2, a right line of the second user terminal device 200-2 is in contact with a left line of the third user terminal device 200-3, the first to third user terminal devices 200-1 to 200-3 may determine a connection state through at least one detector, and as illustrated in FIG. 34D, may display a shared area 3431 at a bottom area where a line of the first user terminal device 200-1 is in contact with the second user terminal device 200-2 based on the connection state, and display a shared area 3432 at a bottom area where a line of the second user terminal device 200-2 is in contact with a line of the third user terminal device 200-3.

Figure 34E:
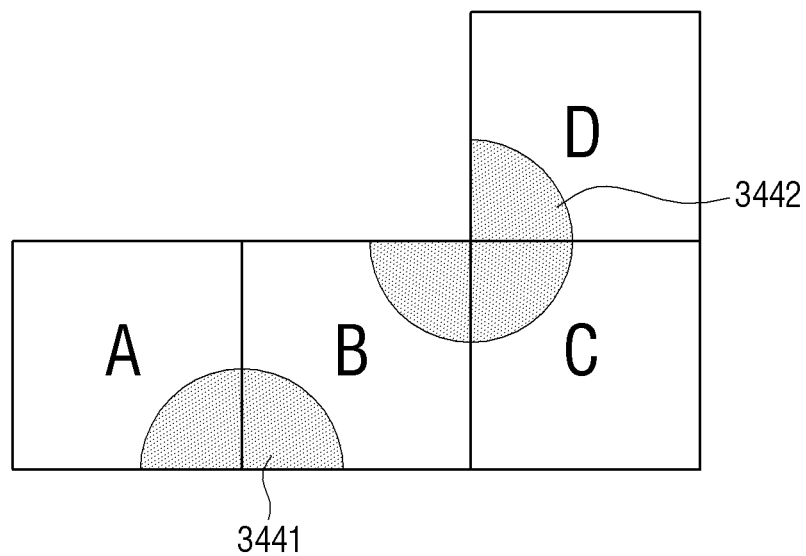

In addition, when a right line of the first user terminal device 200-1 is in contact with a left line of the second user terminal device 200-2, a right line of the second user terminal device 200-2 is in contact with the third user terminal device 200-3, an upper line of the third user terminal device 200-3 is in contact with a bottom line of the fourth user terminal device 200-4, the first to fourth user terminal devices 200-1 to 200-4 may determine a connection state through at least one detector, and as illustrated in FIG. 34E, may display a shared area 3441 at a bottom area of the line of the first user terminal device 200-1 which is in contact with a line of the second user terminal device 200-2, and display a shared area 3442 at an area where lines of the second user terminal device to the fourth user terminal device 200-2 to 200-4 are in contact with each other.

Figure 35:
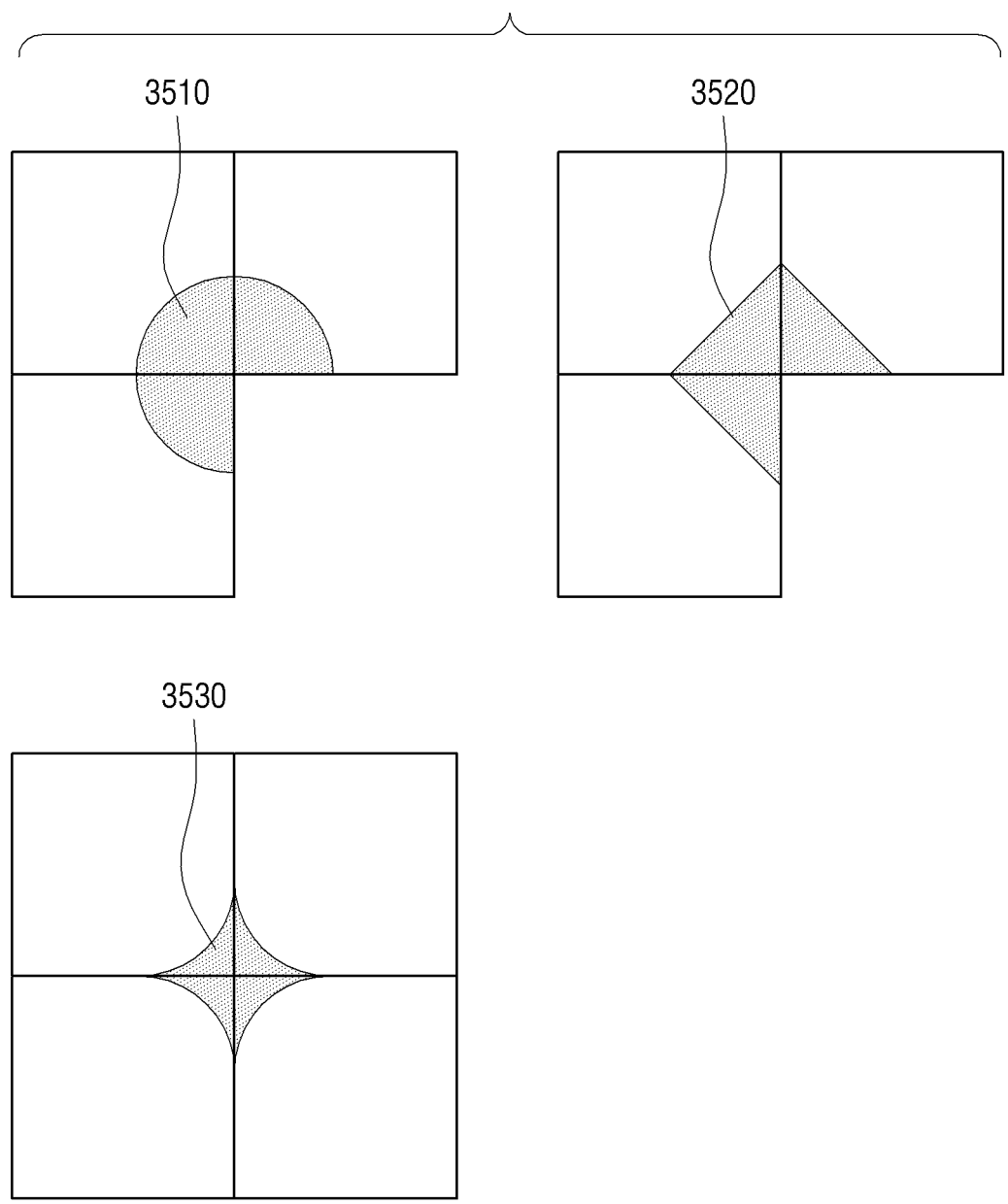

A shared area may be realized as various shapes. In particular, as illustrated in FIG. 35, one user terminal device may display a shared area 3510 as a fan shape, one user terminal device may display a shared area 3520 as a triangle shape, and one user terminal device may display a shared area 3530 as a shape which excludes a fan shape from a half circle.

In addition, the plurality of user terminal devices 200-1, 200-2, 200-3, and 200-4, after being connected to each other, may display a shared area, and when a shared area is connected to each other, may share content.

Figure 36A:
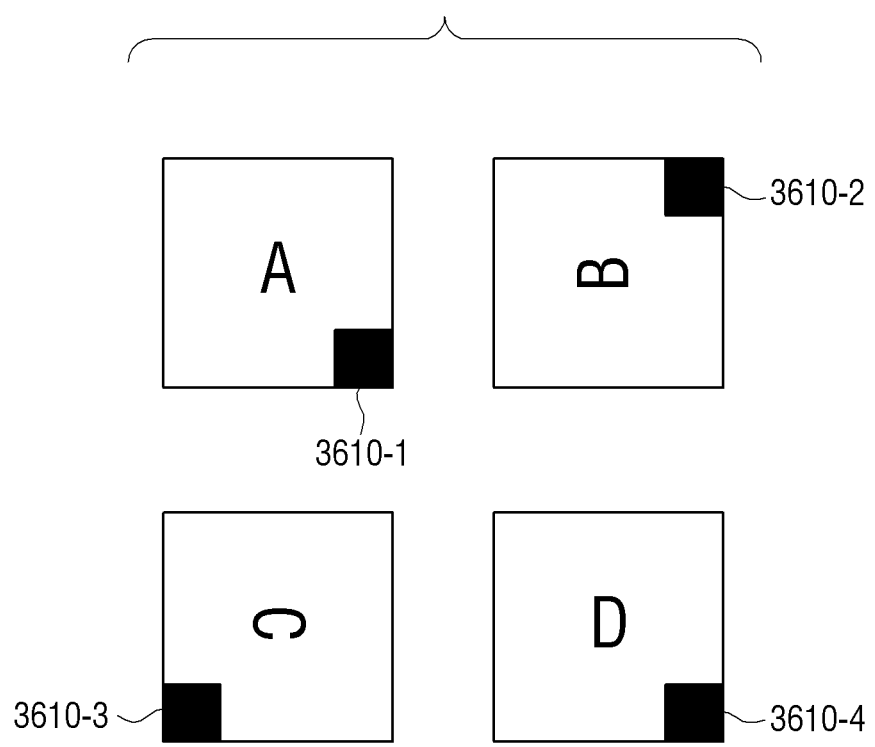
Figure 36B:
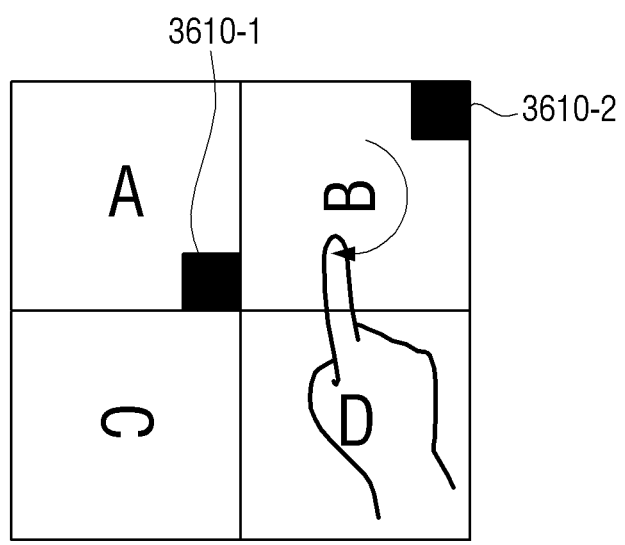
Figure 36C:
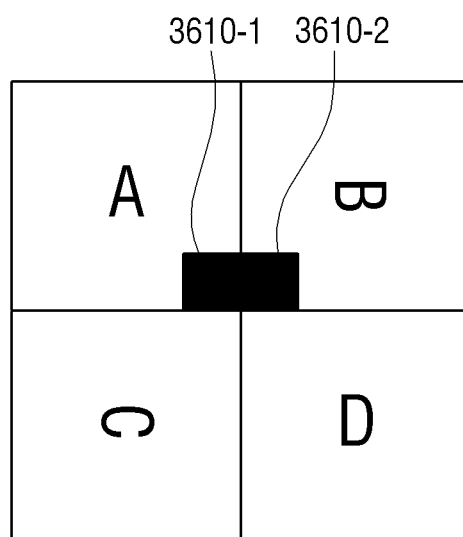

In particular, as illustrated in FIG. 36A, when a first sharing area 3610-1 is displayed at a right bottom end portion of the first user terminal device 200-1, a second sharing area 3610-2 is displayed at a right upper end of the second user terminal device 200-2, a third sharing area 3610-3 is displayed at a left bottom end part of the third user terminal device 200-3, and a fourth sharing area 3610-4 is at a right bottom end of the fourth user terminal device 200-4, as illustrated in FIG. 36B, four user terminal devices 200-1 to 200-4 may be connected with each other. When the second user terminal device 200-2 is rotated at an angle of 180 in a clockwise direction, the first sharing area 3610-1 and the second sharing area 3610-2 may be connected with each other. When the first sharing area 3610-1 is connected with the second sharing area 3610-2 as shown in FIG. 36C, one of the first user terminal device 200-1 and the second user terminal device 200-2 may transmit a content to another.

Figure 37A:
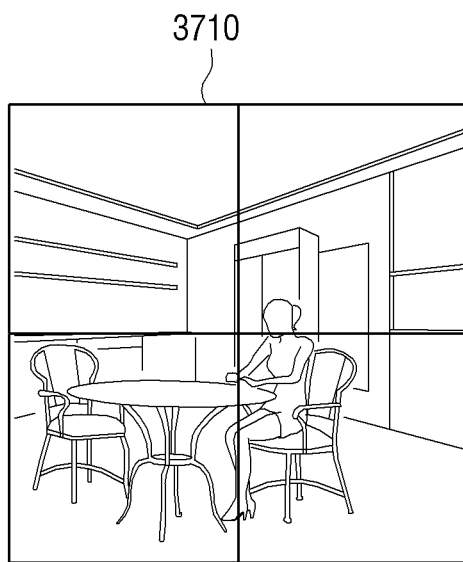
Figure 37B:
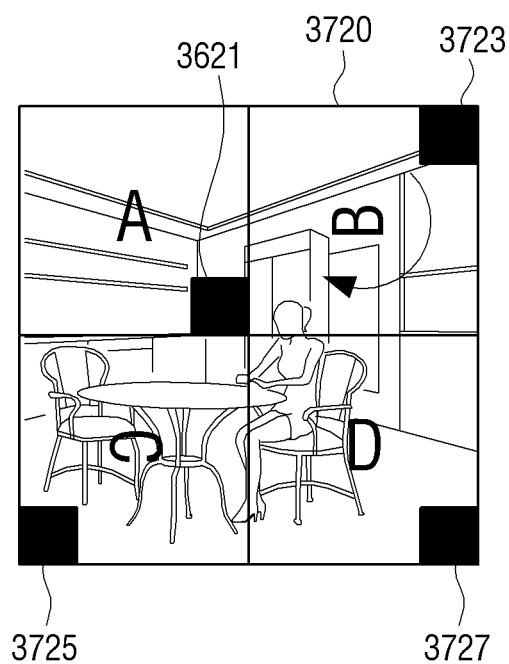
Figure 37C:
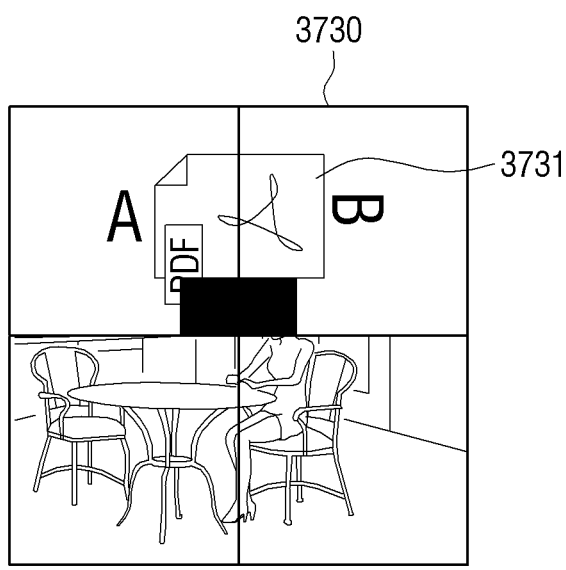
Figure 37D:
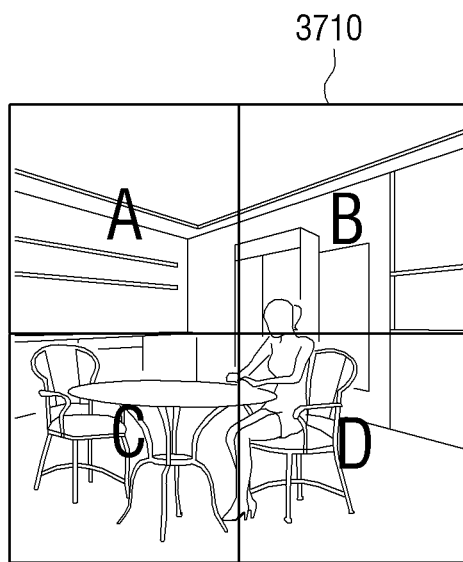

Referring to a detailed exemplary embodiment, the first user terminal device to the fourth user terminal device 200-1 to 200-4, as illustrated in FIG. 37A which are displayed in proximity with each other, may display one image content 3710. In this case, the image content 3710 may be stored in the second user terminal device 200-2. In a case of operating as a sharing mode, four user terminal devices 200-1 to 200-4, as illustrated in FIG. 37B, may display each of the sharing areas 3721, 3723, 3725, and 3727 on screen 3720. In addition, when the second user terminal device 200-2 is rotated clockwise at an angle of 180 and the first sharing area 3721 and 3723 are connected with each other as illustrated in FIG. 37C, the second user terminal device 200-2 may transmit data of the image content 3710 to the first user terminal device 200-1 as shown on screen 3730. While transmitting the data, an icon 3731 which indicates a file format of the image contents may be displayed. After completing file transmission, the first user terminal device to the fourth user terminal device 200-1 to 200-4, as illustrated in FIG. 37D, may display one image contents 3710.

In addition, when the plurality of user terminal devices 200-1 to 200-4 are connected to each other, the plurality of user terminal device 200-1 to 200-4 may provide a group playback function in various formats.

Figure 38:
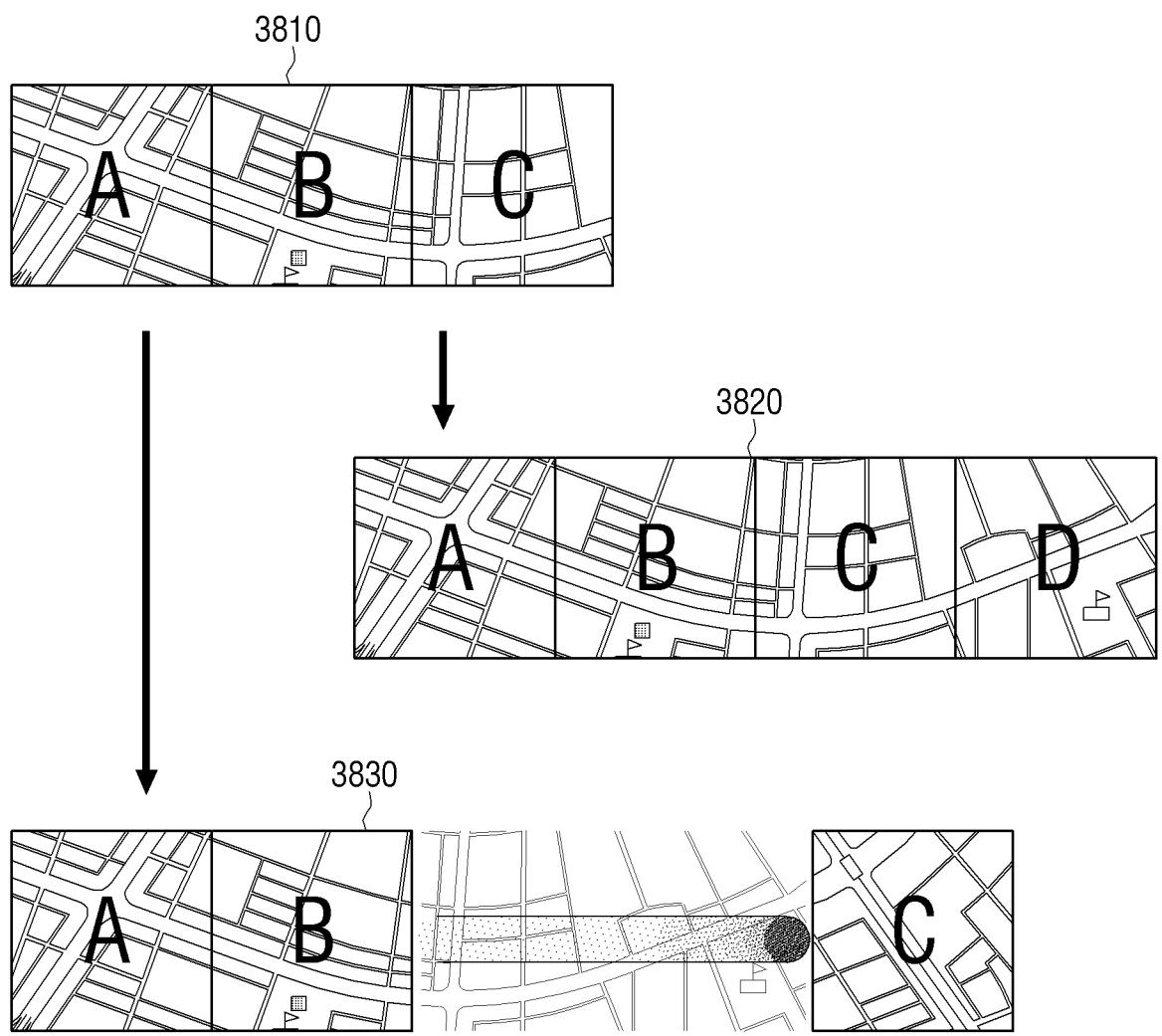

In particular, as illustrated in FIG. 38, when the fourth user terminal device 200-4 is connected while the first to third user terminal devices 200-1 to 200-3 displaying a map screen on specific areas at the same time 3810, when the fourth user terminal device 200-4 is connected, the fourth user terminal device 200-4 may display a west portion of the specific area additionally 3820. However, while the first to third user terminal devices 200-1 to 200-3 displaying a map screen on a specific area, when the third user terminal device 200-3 is pushed aside in a left direction, the third user terminal device 200-3 may determine distance with the second user terminal device 200-2 and additionally display a west area of the specific area based on the distance 3830.

As described above, by using a plurality of user terminal devices having a display panel in a square shape, various contents may be shared and a group playback function is available.

<Folding Interaction>

According to an exemplary embodiment, when a folding action in which to fold a display more than a preset angle with reference to a hinge 310 is detected, the controller 290 may control the display 230 to change an object which is played on a plurality of rectangular cells into another object and display the changed object. At this time, the controller 290, when the display is folded more than a preset angle using a bending detector 283, may detect that a folding interaction occurs.

Figure 39:
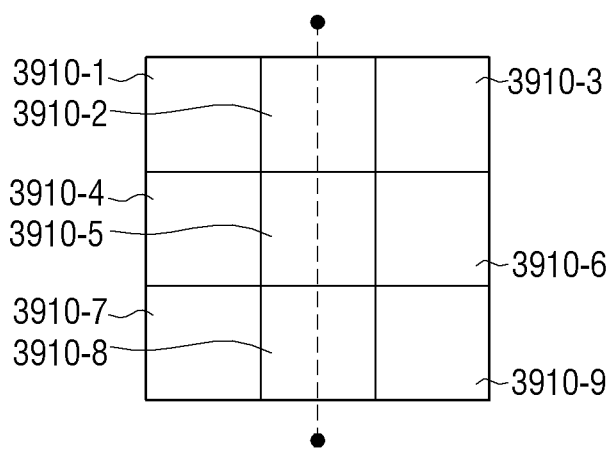
FIGS. 39 to 48B are views illustrating performing various functions of a user terminal device by folding interaction, according to various exemplary embodiments.
Figure 39:
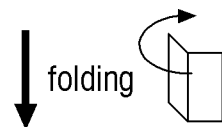
Figure 39:
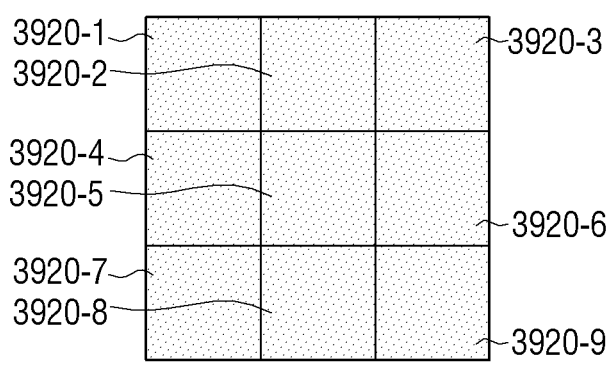

In particular, as illustrated in FIG. 39, while the first object to the ninth object 3910-1 to 3910-9 are displayed on a square cell, when a folding interaction is detected, the controller 290 may control the display 230 to remove the first object to the ninth object 3910-1 to 3910-9 from a display screen and display new tenth object to eighteenth object 3920-1 to 3920-9.

In particular, after touching one of a plurality of square cells, when a folding interaction is detected, the controller 290 may change an object which is in a row including the touched rectangular cell to another object, and maintain objects which are present in other rows without change.

Figure 40A:
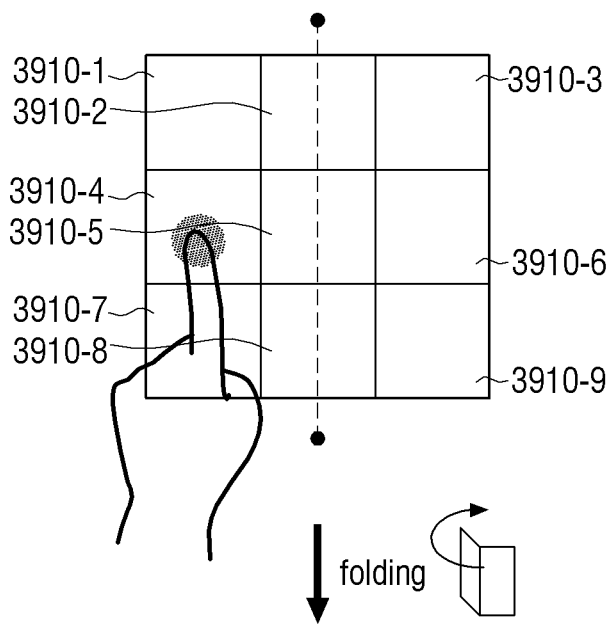
Figure 40A:
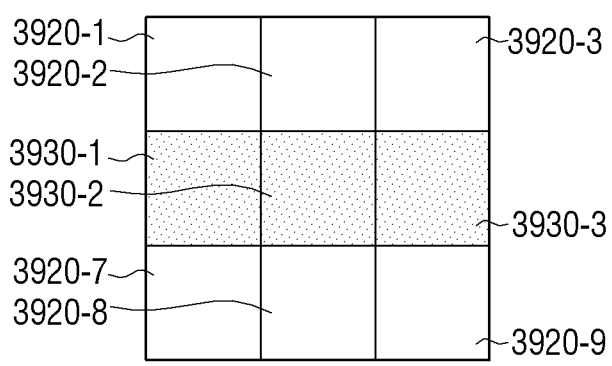

In particular, as illustrated on the left of FIG. 40A, while the first object to ninth object 3910-1 to 3910-9 are displayed, after the fourth object 3910-4 is touched, and then a folding interaction is detected, the controller 290, as illustrated in right of FIG. 40A, may control the display 230 to change an object in the second row which includes the fourth object 3910-4 to new tenth to twelfth object 3930-1 to 3930-3, and maintain objects which are displayed in the first and third rows without a change.

Figure 40B:
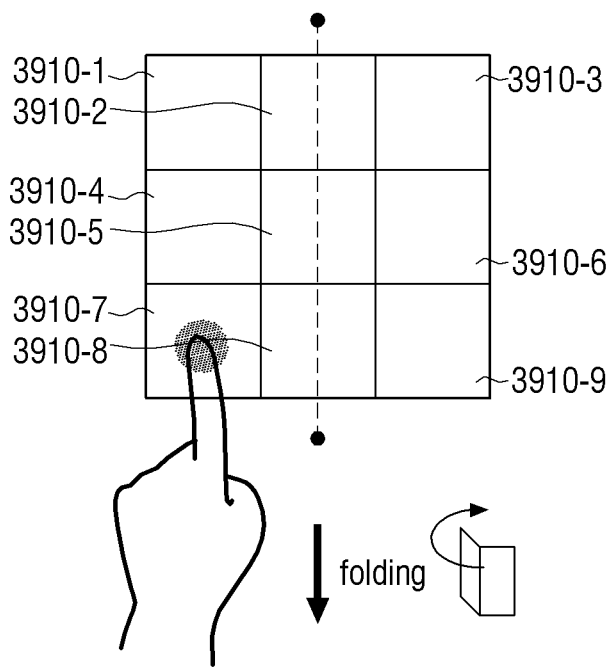
Figure 40B:
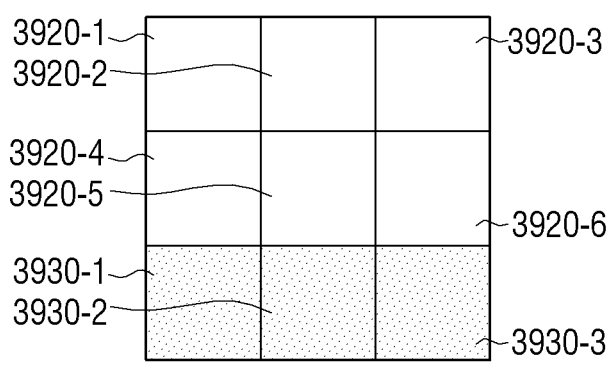

In addition, as illustrated on the left of FIG. 40B, while the first object to ninth object 3910-1 to 3910-9 are displayed, after the seventh object 3910-7 is touched, a folding interaction is detected, the controller 290, as illustrated in right of FIG. 40B, may control the display 230 to change an object in the third row which includes the seventh object 3910-7 to new tenth object to twelfth object 3930-1 to 3930-3, and maintain an object displayed on the first and second row without change.

Figure 41A:
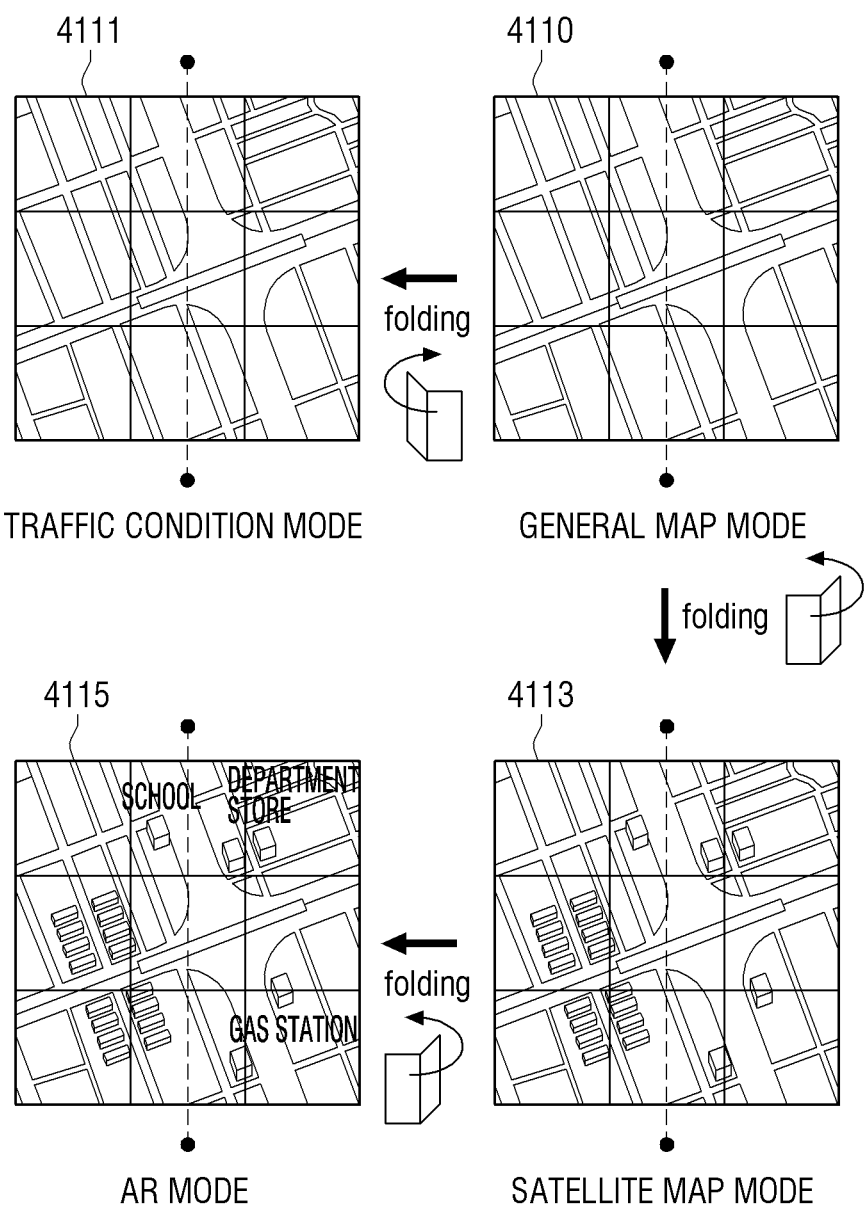

Referring to an exemplary embodiment, as illustrated in the second screen of FIG. 41A, while a general map screen 4110 is displayed in the first rectangular cell to the ninth square cell, when a folding interaction to touch a display panel in a right display panel direction is detected, the controller 290, as illustrated in the first figure of FIG. 41A, may change the general map mode 4110 which is displayed in a plurality of square cells to a traffic condition mode 4111. As illustrated in the second screen of FIG. 41A, while the general map mode 4110 is displayed in the first square cell to the ninth square cell, when a folding interaction to fold a right display panel in a left display panel direction is detected, the controller 290, as illustrated in the third screen of FIG. 41A, may change the general map mode 4110 to a satellite map mode 4113. In addition, as illustrated in the third screen of FIG. 41A, while the satellite map mode 4113 is displayed in the first square cell to the ninth square cell, when a folding interaction to fold a right display panel in a left display panel direction is detected, the controller 290, as illustrated in the fourth screen of FIG. 41A, may change the satellite map mode 4113 to an AR mode 4115 that displays point of interest information. That is, when a folding interaction is detected, the controller 290 may change a map display mode based on a direction of detected folding interaction.

Figure 41B:
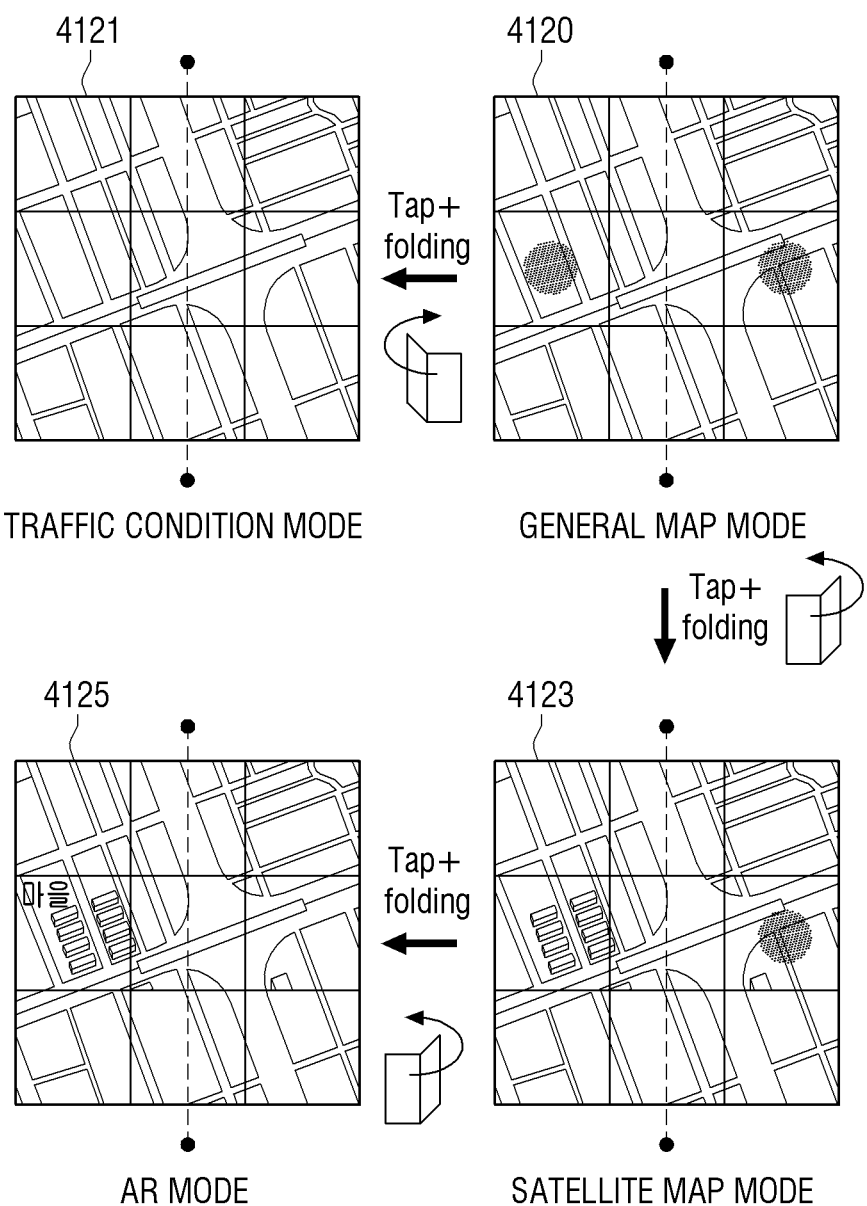

However, as illustrated in the second screen of FIG. 41B, while the general map mode 4120 is displayed in the first square cell to the ninth square cell, after a square cell included in the second row, when a tap plus folding interaction to fold a left display channel in a right display panel direction is detected, the controller 290, as illustrated in the first screen of FIG. 41B, may control the display 230 to maintain that the first and the third rows are maintained as the general map mode, and display a screen 4121 in which the second row is changed to a traffic condition mode. However, as illustrated in the second screen of FIG. 41B, while the general map mode 4120 is displayed in the first square cell to the ninth square cell, after the square cell which is included in the second row is touched, when a folding interaction to fold a right display panel in a left display panel direction is detected, the controller 290, as the third screen of FIG. 41B, may control the display 230 to maintain so that the first and the third rows as the general map mode and that the second row displays a screen 4123 which is changed to the satellite map mode. In addition, as illustrated in the third screen of FIG. 41B, while a screen 4123 which displays the general map mode and the satellite map mode at the same time in the first square cell to the ninth square cell is displayed, when a folding interaction to touch a square cell included in the second row and then fold a right display panel in a left display panel direction is detected, the controller 290, as the fourth screen of FIG. 41B, may control the display 230 to maintain the first row and the third row as the general map mode and display the screen 4125 which is changed to the AR mode on the second row. That is, after a specific square cell is touched, when a folding interaction is detected, the controller 290 may control the display 230 to change only rows which include the touched square cell.

In addition, while a main content is displayed in a plurality of square cells, after a specific square cell is touched, when a folding interaction is detected, the controller 290 may provide different contents or menus on columns which include a specific square cell according to a location of the touched specific square cell.

Figure 42A:
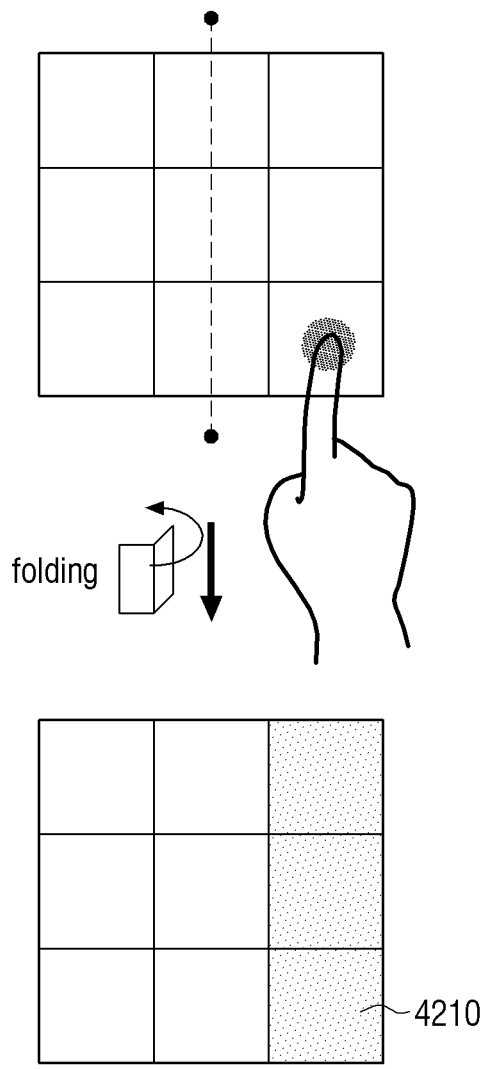
Figure 42B:
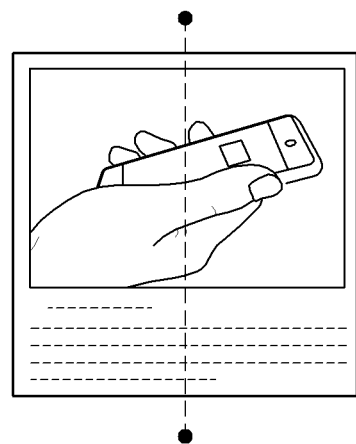
Figure 42B:
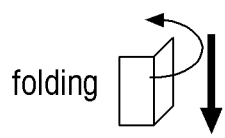
Figure 42B:
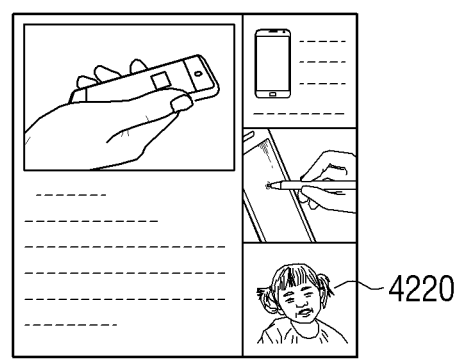

In particular, as illustrated in FIG. 42A, while an image content is displayed in nine square cells, after the ninth square cell is touched, when a folding interaction is detected, the controller 290 may control the display 230 to display a content 4210 which is related to the image content on the third column. As a detailed exemplary embodiment, as illustrated in FIG. 42B, while a news content is displayed in nine square cells, after the ninth square cell is touched, when a folding interaction is detected, the controller 290 may control the display 230 to display three news 4220 related to the news content on the third column.

Figure 43A:
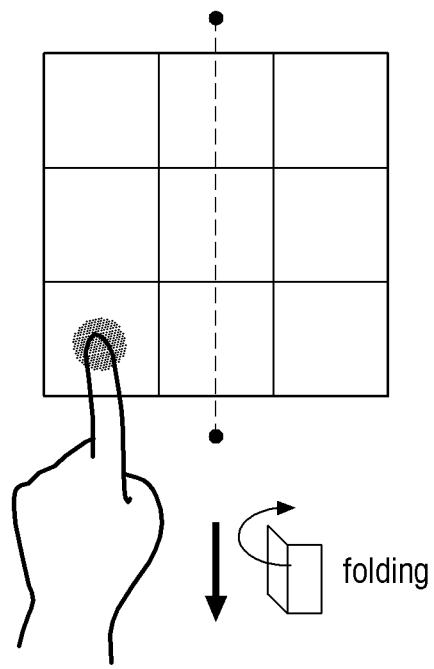
Figure 43A:
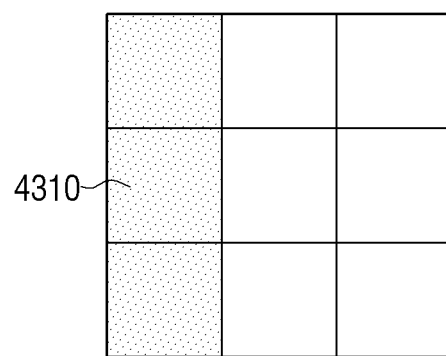
Figure 43B:
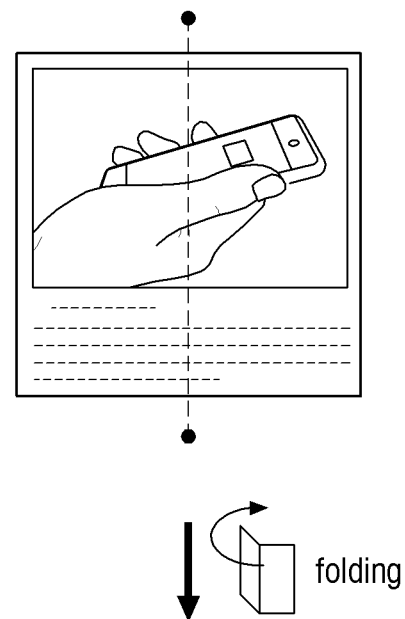
Figure 43B:
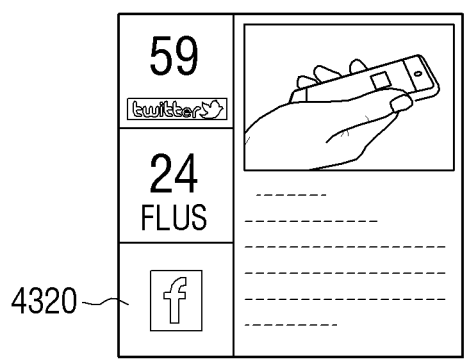

In addition, as illustrated in FIG. 43A, while an image content is displayed in nine square cells, after the seventh square cell is touched, when a folding interaction is detected, the controller 290 may control the display 230 to display a menu 4310 to control functions of the user terminal device on the first column. As a detailed exemplary embodiment, as illustrated in FIG. 43B, while news contents are displayed in nine square cells, after the seventh square cell is touched, when a folding interaction is detected, the controller 290 may control the display 230 to display a menu 4230 regarding the user terminal device on the first column.

In addition, the controller 290 may divide or integrate a display screen using a folding interaction and a rotation interaction.

Figure 44:
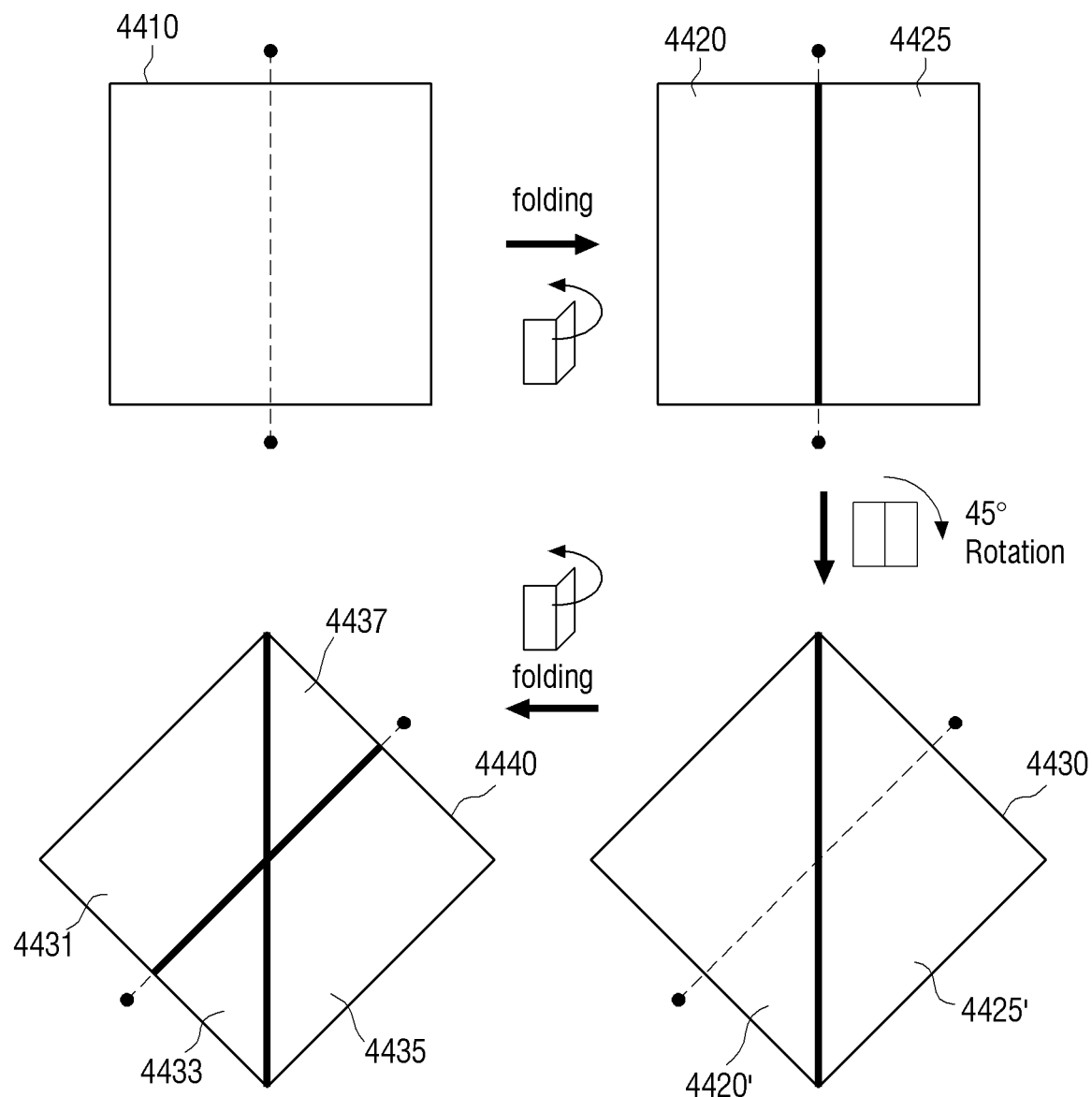

In particular, as illustrated in the first screen of FIG. 44, while one image content 4410 is displayed, when a folding interaction is detected with reference to the hinge 310, the controller 290, as illustrated in the second screen of FIG. 44, may control the display 230 to split the display screen into two screens and display two image contents 4420, 4425. In addition, while two image contents 4420 and 4425 are displayed as the second screen of FIG. 44, when a rotation interaction to rotate a display at an angle of 45 in a clockwise direction through a detector (for example, a tilting detector, a gyro detector, an accelerator detector, or the like) for detecting rotation of the user terminal device 200 is detected, the controller 290, as illustrated in the third screen of FIG. 44, may control the display 230 to rotate and display two image contents 4420' and 4425' so that split lines of two screens may be used. In addition, as the third screen 4430 of FIG. 44, while two image contents 4420' and 4425' are split, when a folding interaction is detected, the controller 290, as illustrated in the fourth screen of FIG. 44, may control the display 230 to split the display screen into four screens 4440 and display four image contents 4431, 4433, 4435, and 4437.

Figure 45:
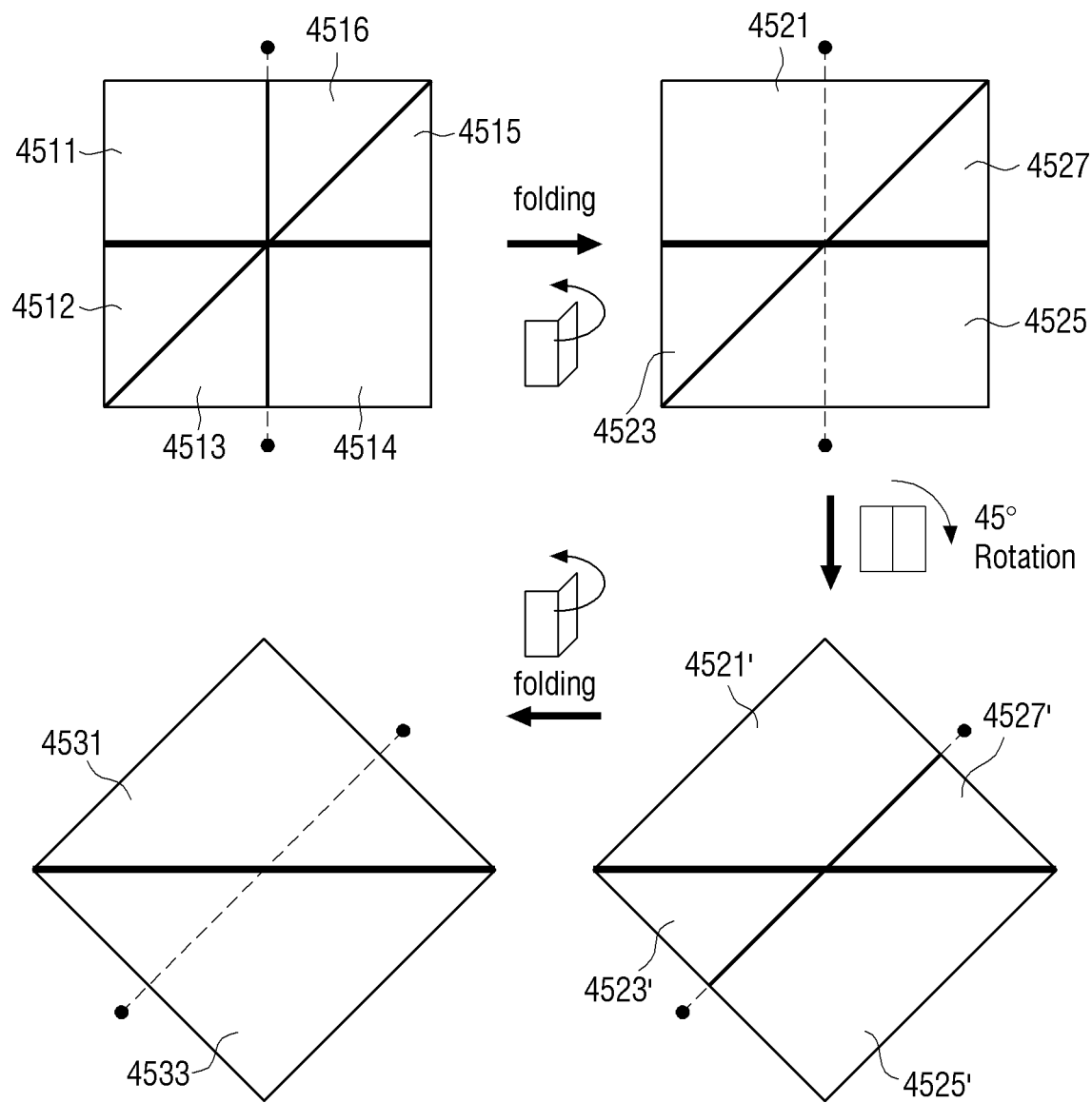

As the first screen of FIG. 45, while six image contents 4511 to 4516 are displayed, when a folding interaction with reference to the hinge 310 is detected, the controller 290 may control the display 230 to remove the split line with reference to the hinge 310, as illustrated in the second screen of FIG. 45, and display four image contents 4521, 4523, 4525, and 4527. In addition, as illustrated in the second screen of FIG. 45, while the four image contents 4521, 4523, 4525, and 4527 are displayed, when a rotation interaction to rotate a display at an angle of 45 in a clockwise direction is detected, the controller 290, as illustrated in the third screen of FIG. 44, may control the display 230 to maintain split lines of four screens and rotate and display four image contents 4521', 4523', 4525', and 4527'. Further, as illustrated in the third screen of FIG. 44, while four image contents 4521', 4523', 4525', and 4527' are displayed, when a folding interaction is detected with reference to the hinge 310, the controller 290 may control the display 230 to remove the split line with reference to the hinge 310 and as illustrated in the fourth screen of FIG. 45, display two image contents 4531 and 4533.

Figure 46A:
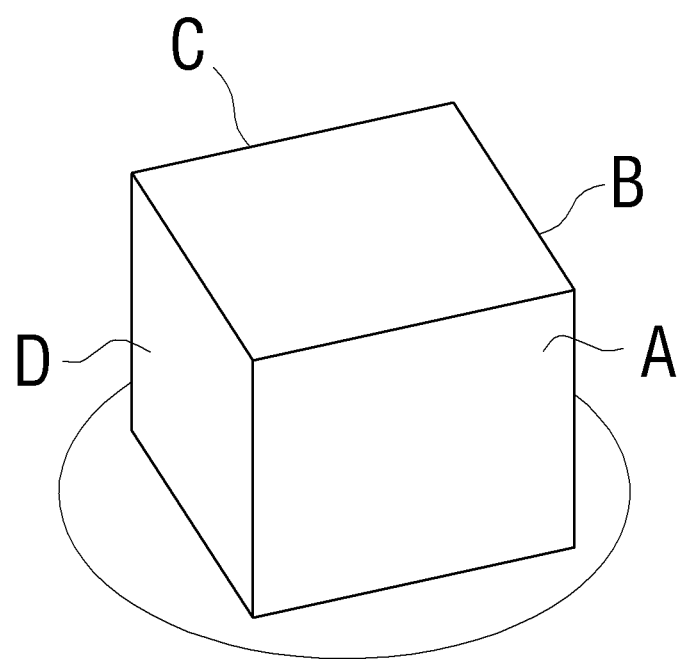
Figure 46A:
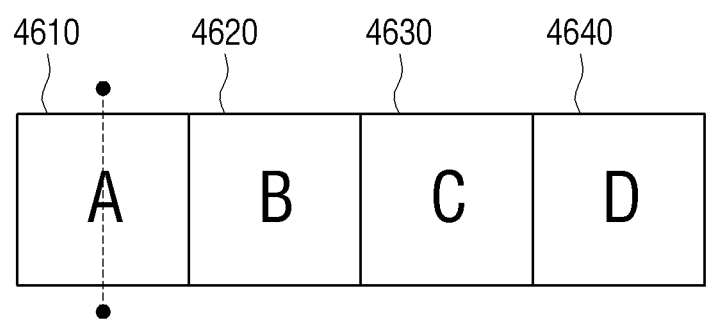
Figure 46B:
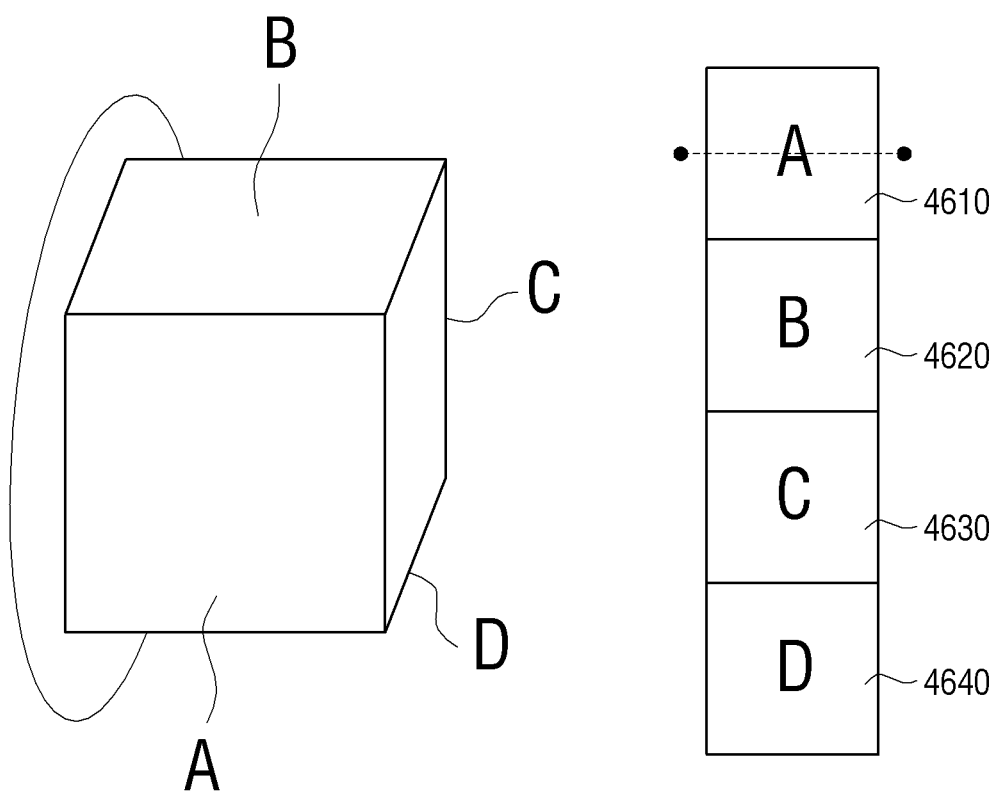

The controller 290 may change a screen according to a direction of the hinge 310 as if a third dimensional cube is rotated. In particular, as illustrated in FIG. 46A, while the hinge 310 is in a vertical state, when a folding interaction is detected, the controller 290, as if a cube is rotated in a horizontal direction, may change a screen according to an order of "screen A 4610->screen B 4620->screen C 4630->screen D 4640->screen A 4610-> . . . ". In addition, as illustrated in FIG. 46B, while the hinge 310 is in a horizontal state, when a folding interaction is detected, the controller 290, as if a cube is rotated in a vertical direction, may change a screen according to an order of "screen A 4610->screen B 4620->screen C 4630->screen D 4640->screen A 4610-> . . . ".

In addition, while the image content is displayed, when a user holds the user terminal device 200 and a folding interaction to fold the user terminal device 200 at a preset angle is detected, the controller 290 may determine an area where the user holds and may control the display 230 to display at least one icon to control at least one of the user terminal device 200 and the image contents at the area where the user holds. At this time, the controller 290 may determine the area which a user holds using a proximity detector which is located on a bezel 320 or a touch detector.

Figure 47A:
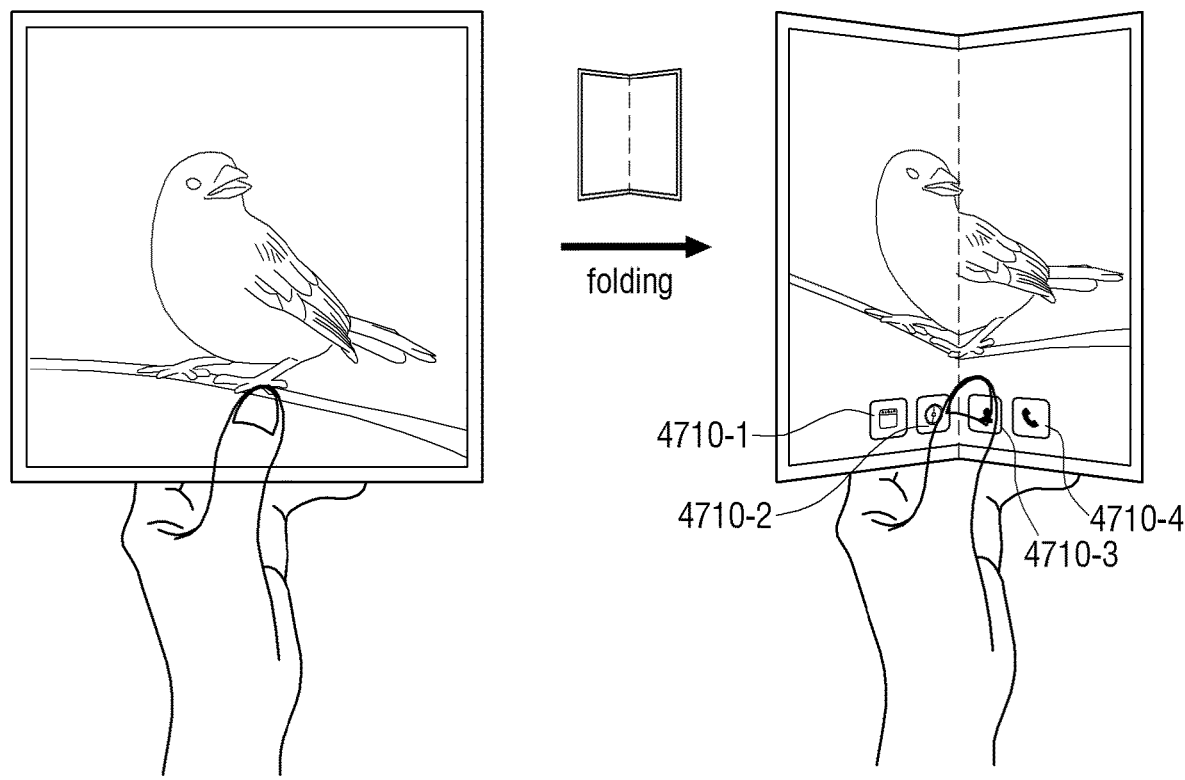

In particular, as illustrated in FIG. 47A, while the image content is displayed, when a user holds a lower end of the user terminal device 200 and a folding interaction to fold the user terminal device 200 at a preset angle is detected, the controller 290 may detect that a user holds a lower end of the user terminal device 200 through a detector included in the bezel 320, and control the display 230 to display a plurality of icons 4710-1 to 4710-4 to control the user terminal device 200 at a lower end of the display 230. In this case, the plurality of icons 4710-1 to 4710-4 may include an icon to enter a home screen, an icon to execute frequently-used applications, and an icon to change setting of the user terminal device 200.

Figure 47B:
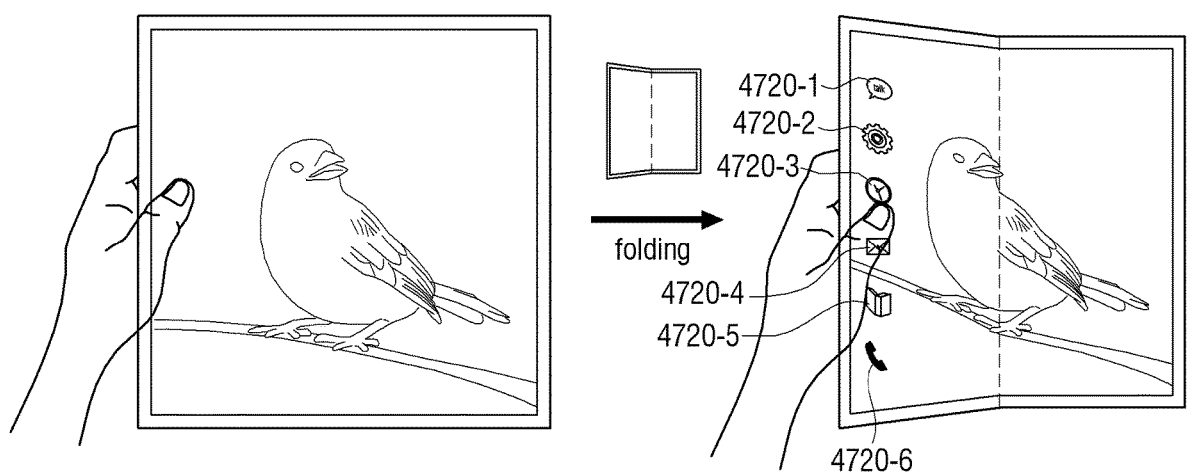

As illustrated in FIG. 47B, while an image content is displayed, when a user holds a left portion of the user terminal device 200, when a folding interaction to fold the user terminal device 200 at a preset angle is detected, the controller 290 may detect through a detector included in the bezel 320 that a user holds a left portion of the user terminal device 200, and control the display 230 to display a plurality of icons 4720-1 to 4720-6 to control the user terminal device 200 at a left portion of the display 230. At this time, In this case, the plurality of icons 4720-1 to 4720-6 may include an icon to enter a home screen, an icon to execute frequently-used applications, and an icon to change setting of the user terminal device 200.

Figure 47C:
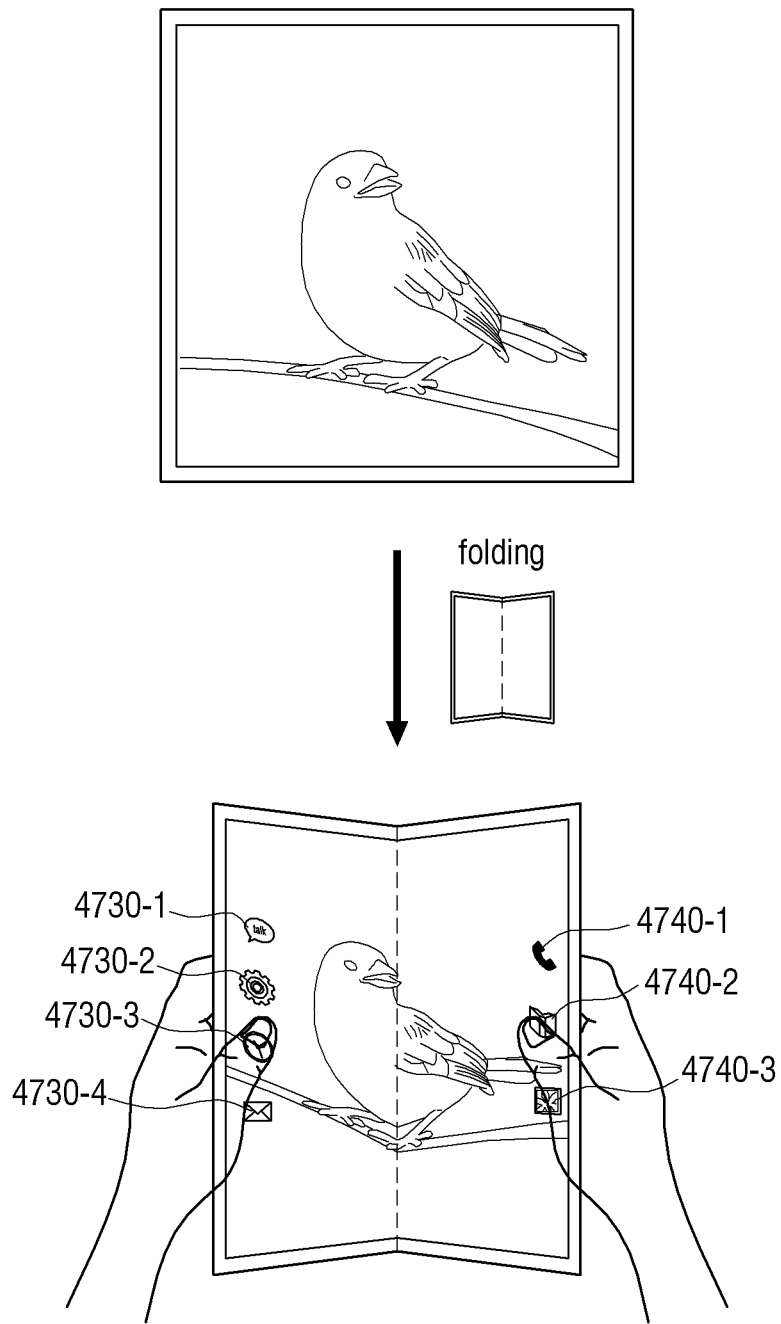

As illustrated in FIG. 47C, while a photo content is displayed, when a user holds a left portion and a right portion of the user terminal device 200 at the same time, and a folding interaction to fold the user terminal device 200 at a preset angle is detected, the controller 290 may detect through a detector included in the bezel 320 that a user holds a left portion and a right portion of the user terminal device 200, and control the display 230 to display menu icons 4730-1 to 4730-4 to edit a photo content in a left portion of the display 230, and sharing icons 4740-1 to 4740-3 to share photo contents in a right portion of the display 230.

In addition, while e-book content is displayed, when a user holds the user terminal device 200, the controller 290 may set different control areas to turn pages according to an area where a user holds the user terminal device 200.

Figure 48A:
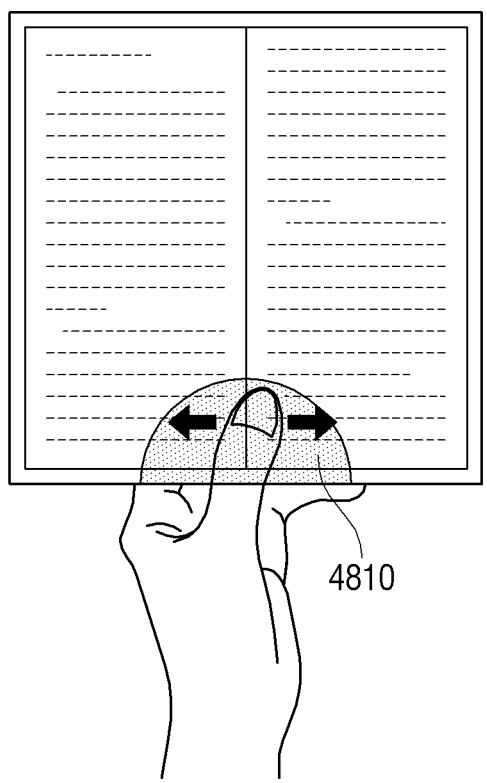

In particular, as illustrated in FIG. 48A, while an e-book content is displayed, when a user holds a lower end of the user terminal device 200, the controller 290 may set a lower area of the display 230 as a control area 4810 to turn pages. In this case, the control area 4810, as illustrated in FIG. 48A, may be indicated differently from other areas. In addition, when an interaction (for example, a flip interaction in a left and a right directions) to turn pages of the control area 4810 is detected, the controller 290 may control the display 230 to turn pages in a direction to correspond to the interaction.

Figure 48B:
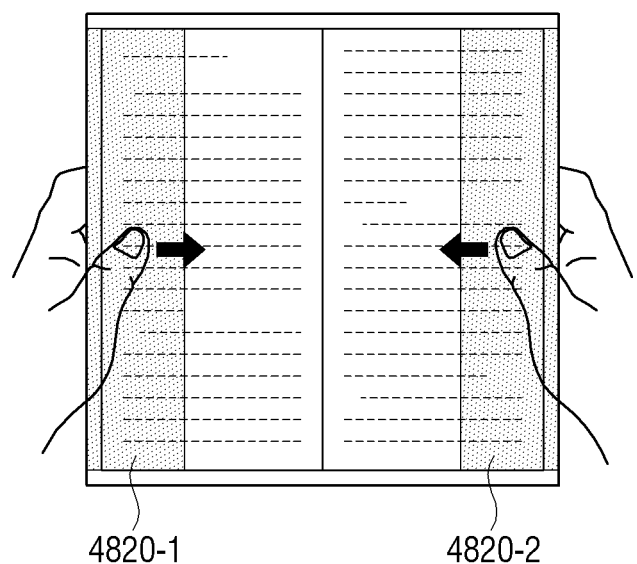

As illustrated in FIG. 48B, while an e-book content is displayed, when a user holds left and right portions of the user terminal device 200, the controller 290 may set left areas and right areas of the display 230 as control areas 4820-1 and 4820-2 to turn pages. At this time, the control areas 4820-1 and 4820-2, as illustrated in FIG. 48B, may be indicated differently from other areas. In addition, when an interaction (for example, flip interaction in left and right directions) to turn pages are detected at the control areas 4820-1 and 4820-2, the controller 290 may control the display 230 to turn pages in a direction to correspond to the interaction.

Hereinafter, a function which the user terminal device 200 may execute according to various user interactions which are input to a corner area will be described with reference to FIGS. 49-55C.

Figure 49:
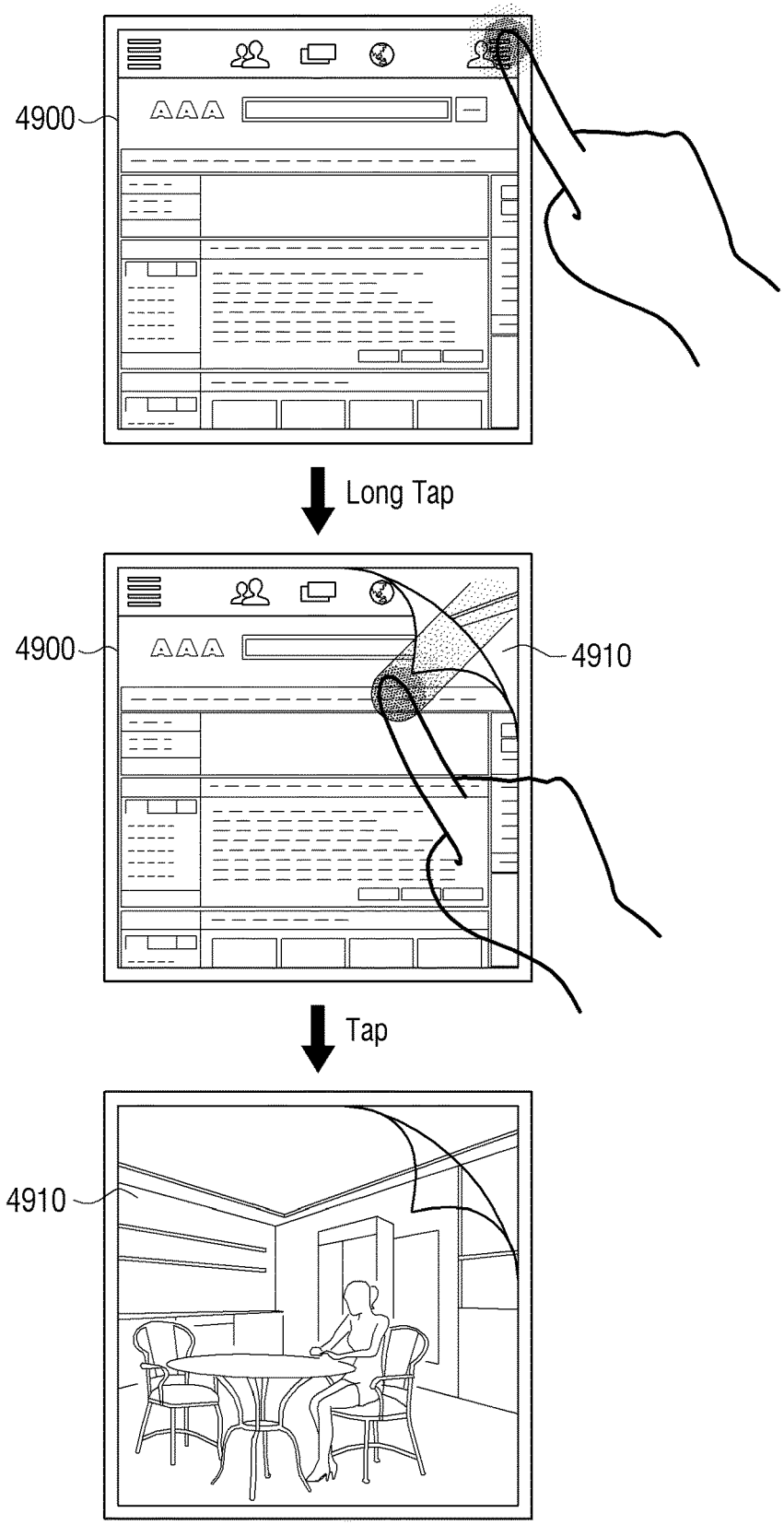
FIGS. 49 to 55C are views illustrating performing various functions of a user terminal device by a user interaction regarding a corner area, according to various exemplary embodiments.

For example, as illustrated at an upper end of FIG. 49, when a user interaction which touches a corner area in a right upper end is touched for a preset time while a first application screen 4900 is displayed is detected, the controller 290, as illustrated in FIG. 49, may control the display 230 to apply an image effect to turn a page on the first application screen 4900 and display the second application screen 4910 at a corner area in a right upper end portion. In addition, when a user action to tap a second application screen 4910 which is displayed at a corner area in a right upper end portion is detected, the controller 290, as illustrated in a lower end of FIG. 49, may control the display 230 to display the second application screen 4910 on a full screen.

Figure 50:
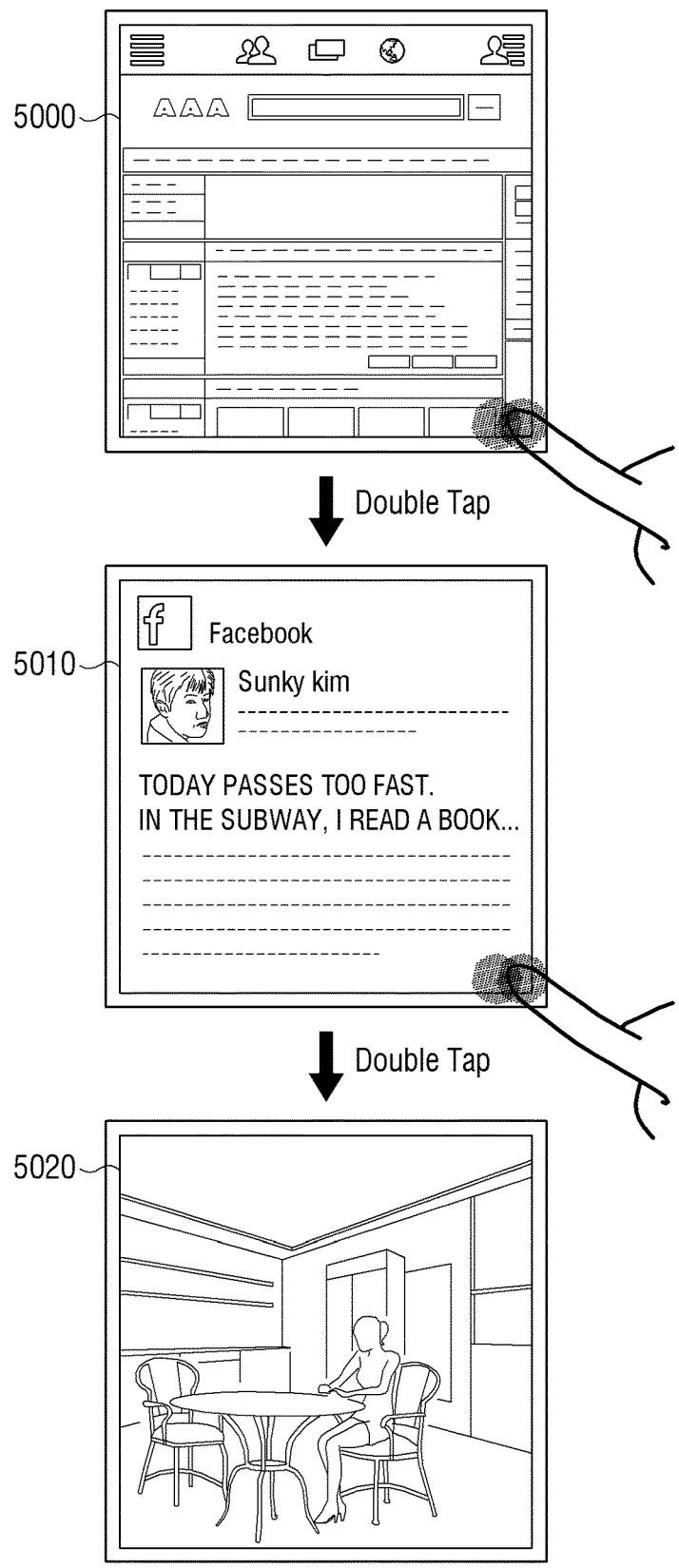

As another example, as illustrated at an upper end of FIG. 50, when a user interaction to double tap a corner area in a lower right end portion is detected, while the first application screen 5000 is displayed, the controller 290, as illustrated on the middle of FIG. 50, may control the display 230 to convert the first application screen 5000 to a second application screen 5010 and display the second application screen. In addition, as illustrated in middle of FIG. 50, when a user interaction to double tap a corner area in a right lower end is detected again while the second application screen 5010 is displayed, the controller 290, as illustrated in a lower end of FIG. 50, may control the display 230 to convert the second application screen 5010 to another third application screen 5020 and display the third application screen.

Figure 51:
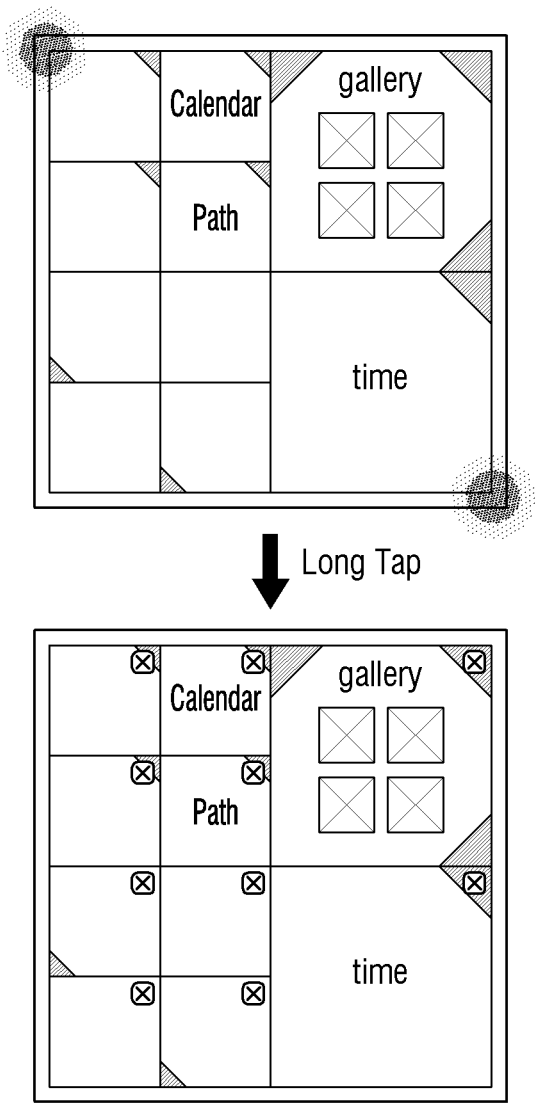

As a still another example, as illustrated in a upper end of FIG. 51, when a user interaction to touch a corner area in a left upper end and a corner area in a right lower end at the same time for more than a preset time is detected, while a plurality of screens which correspond to a plurality of applications are displayed on the display 230, the controller 290 may convert a mode of the user terminal device 200 to an application deletion mode. When a mode of the user terminal device 200 is changed to the application deletion mode, the controller 290, as illustrated in lower end of FIG. 51, may control the display 230 to display a deletion icon to delete an application in a right upper end portion of each of a plurality of screens.

Figure 52:
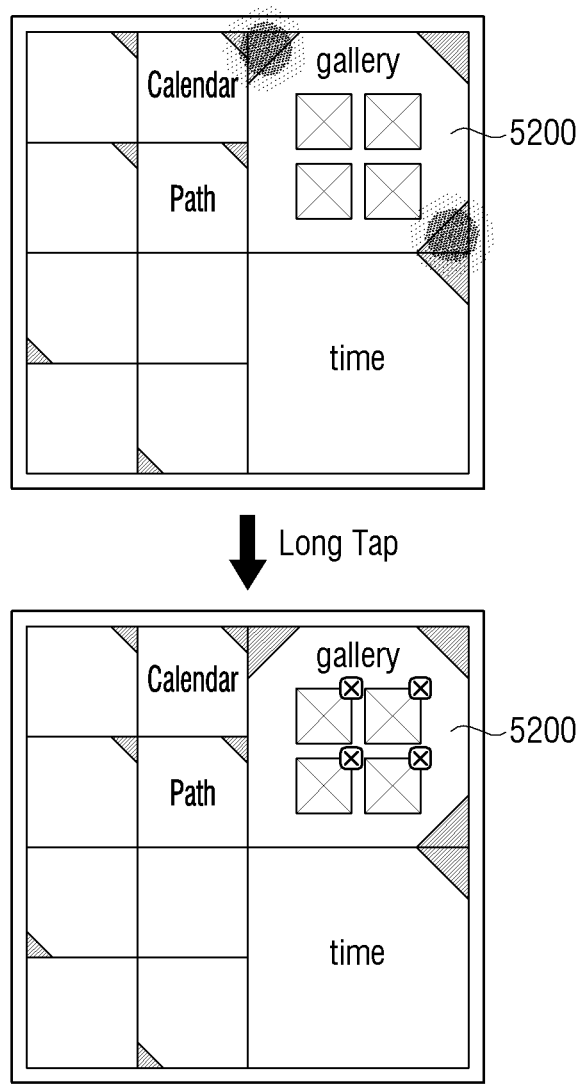

As a still another example, as illustrated in a upper end portion of FIG. 52, when a user interaction to touch a corner area in a left upper end and a corner area in a right lower end of a gallery application screen 5200 at the same time more than a preset time is detected, while a plurality of screens which correspond to a plurality of applications are displayed on the display 230, the controller 290 may change a mode of the user terminal device 200 to a contents deletion mode of the gallery application. When a mode of the user terminal device 200 is changed to a contents deletion mode, the controller 290, as illustrated in a lower end of FIG. 52, may control the display 230 to display a deletion icon to delete a contents at an area in a right upper end of each of the plurality of contents which are included in the gallery application.

Figure 53:
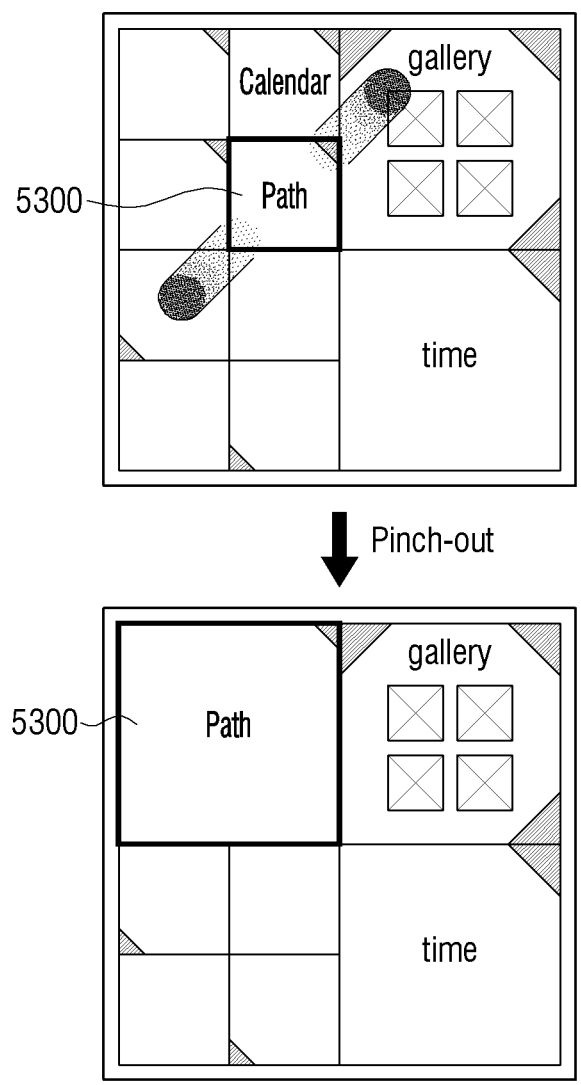

As a still another example, as illustrated in an upper end of FIG. 53, while a plurality of screens which correspond to a plurality of applications are displayed on the display 230, when a pinch-out interaction to touch a corner area in a left upper end and a corner area in a right lower end of the first application screen 5300 and a drag of the two corner areas in a direction to make them distant or to drag the two corner areas apart is detected, the controller 290, as illustrated in a lower end of FIG. 53, may control the display 230 to enlarge size of the first application 5300.

Figure 54:
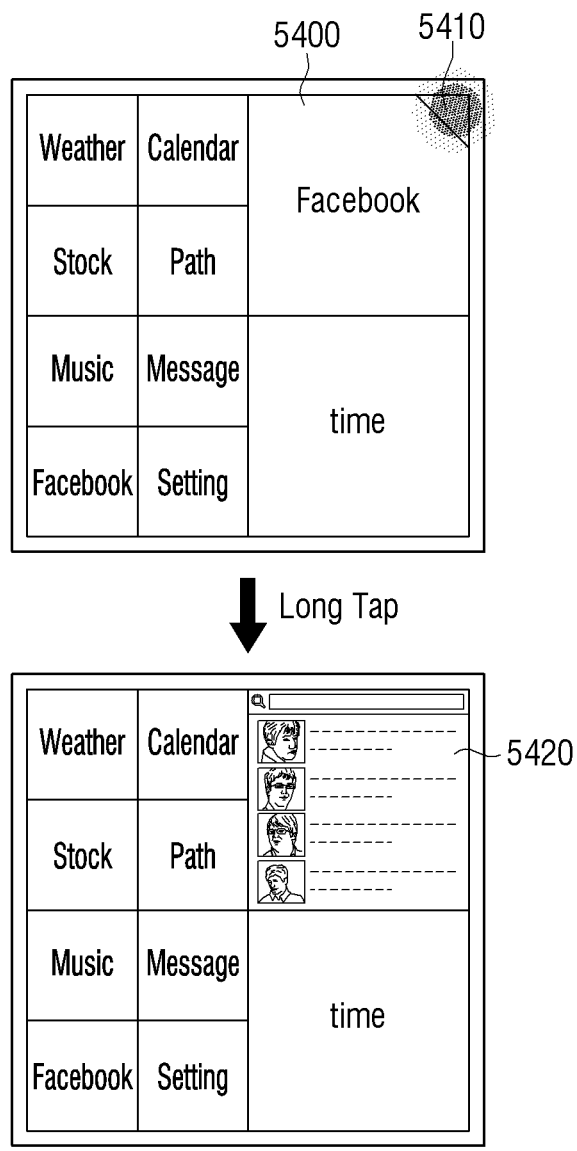

As a still another example, as illustrated in an upper end of FIG. 54, while a plurality of screens which correspond to a plurality of applications are displayed on the display 230, when a user interaction, while a message indicating that a new SNS message is received is displayed in a right upper area 5410 of the SNS application screen 5400, to touch the message for a preset time is detected, the controller 290, as illustrated in a lower end of FIG. 54, may control the display 230 to change the SNS application screen 5400 to a list screen 5420 that includes a newly-received SNS message.

As described above, the functions which may be executed according to various types of user interactions that are input to a corner area are as shown in Table 1 below.

TABLE 1

| | Type of gesture | Corner area of a display unit | Corner areas of a plurality of screens included in the display unit | |
|---|---|---|---|---|
| | | | No event happens | Event happens (ex, a new message received) |
| Single touch | Drag interaction | Display a home menu, a status bar, and a quick access menu at a corner area | A quick view mode for glancing events or contents or related applications | Display a screen related to an event on a selected screen |
| | Long-press interaction | Navigate currently-executed applications | Screen editing mode | Display history of events on a selected screen |
| | Double tap interaction | Change to other applications | Generate an integrated folder at a point where interaction is input | Generate an integrated folder at a point where interaction is input |
| Multi touch | Pinch interaction | None | Change size of a selected screen among a plurality of screens | Change size of a selected screen among a plurality of screens |
| | Two finger long-press interaction | Application deletion mode | Mode for deleting application contents | Mode for deleting application contents |

Figure 55A:
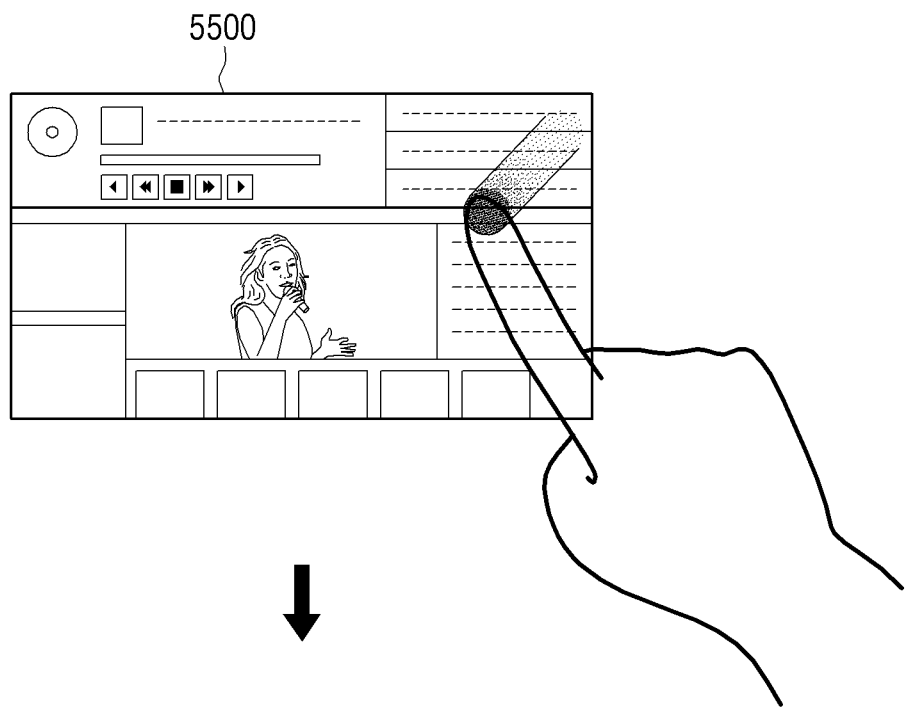
Figure 55A:
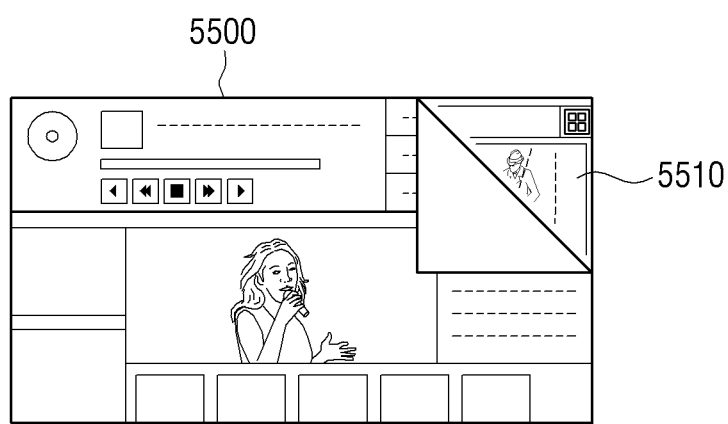
Figure 55B:
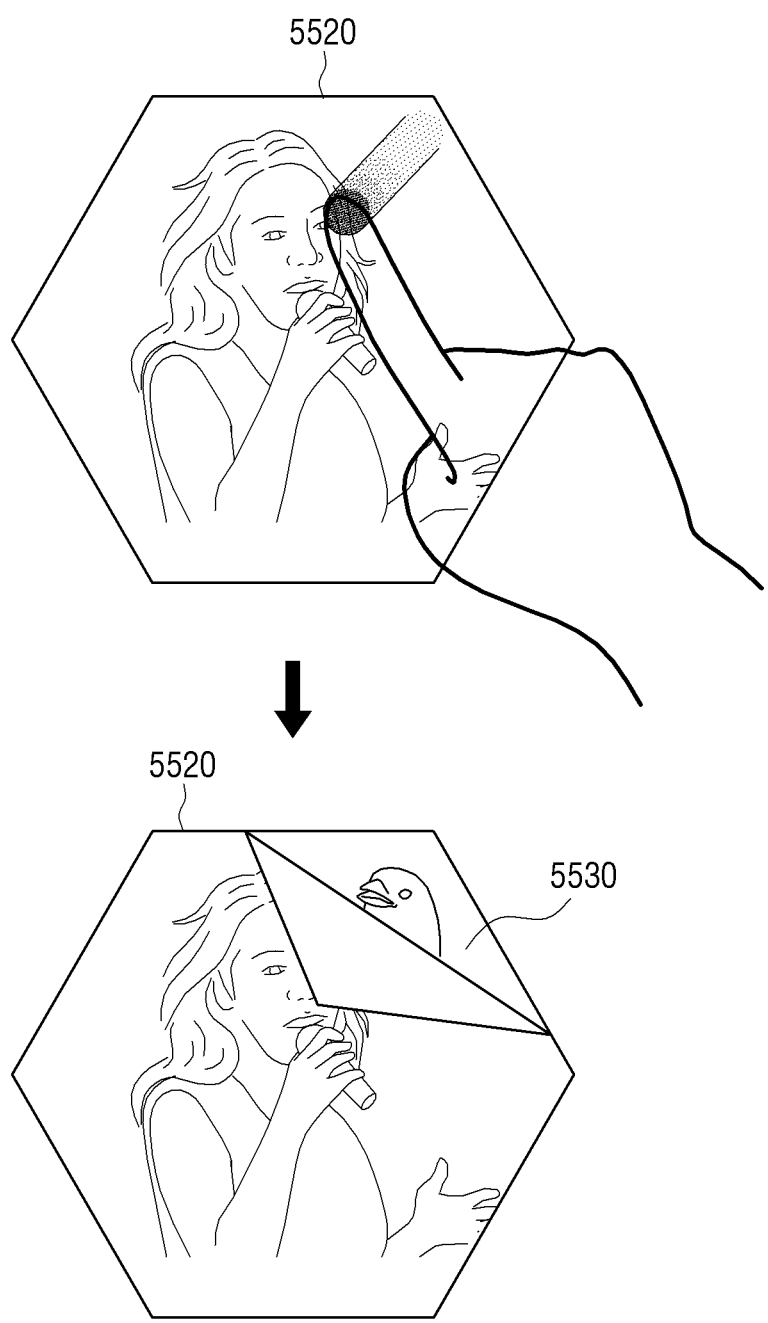
Figure 55C:
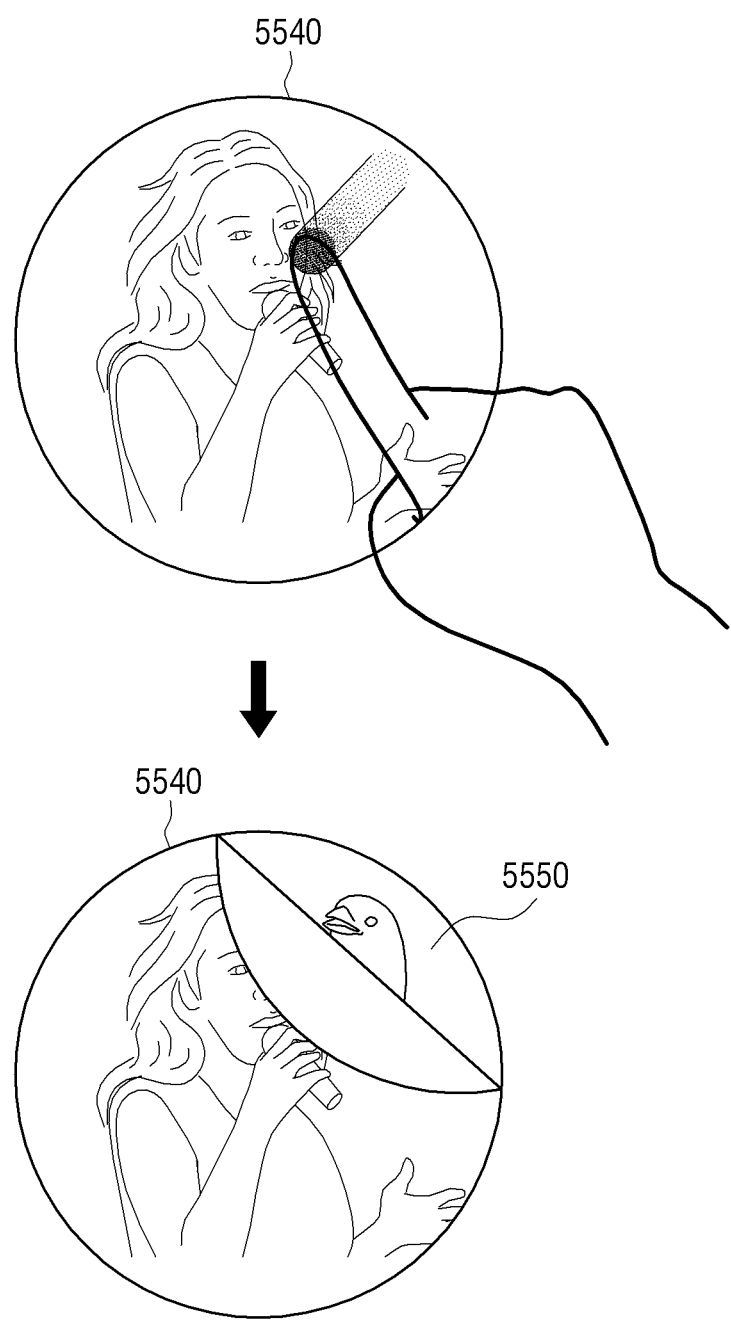

In the above-described exemplary embodiment, it has been described that the first screen has a rectangular shape, but this is merely exemplary, and the first screen may have another shape. For example, as illustrated in FIG. 55A, when a user interaction to touch a corner area in a right upper end from among corner areas of the first screen 5500 in a rectangular shape and then drag in a diagonal direction is detected, the controller 290 may control the display 230 to display a second screen 5510 at a corner area in a right upper end while a part of the first screen 5500 is being displayed. As another example, as illustrated in FIG. 55B, when a user interaction to touch a first corner area from among corner areas of the first screen 5520 in a hexagon shape and drag the corner area in a diagonal direction is detected, the controller 290, while a part of the first screen 5520 is being displayed, may control the display 230 to display the second screen 5530 at the first corner area where the user interaction is detected. As another example, as illustrated in FIG. 55C, when a user interaction to touch a first point from among contour lines of a first screen 5540 in a circle shape and then drag the point in a diagonal direction is detected, the controller 290, while a part of the first screen 5540 is being displayed, may control the display 230 to display the second screen 5550 at the first point where the user interaction is detected.

Figure 56:
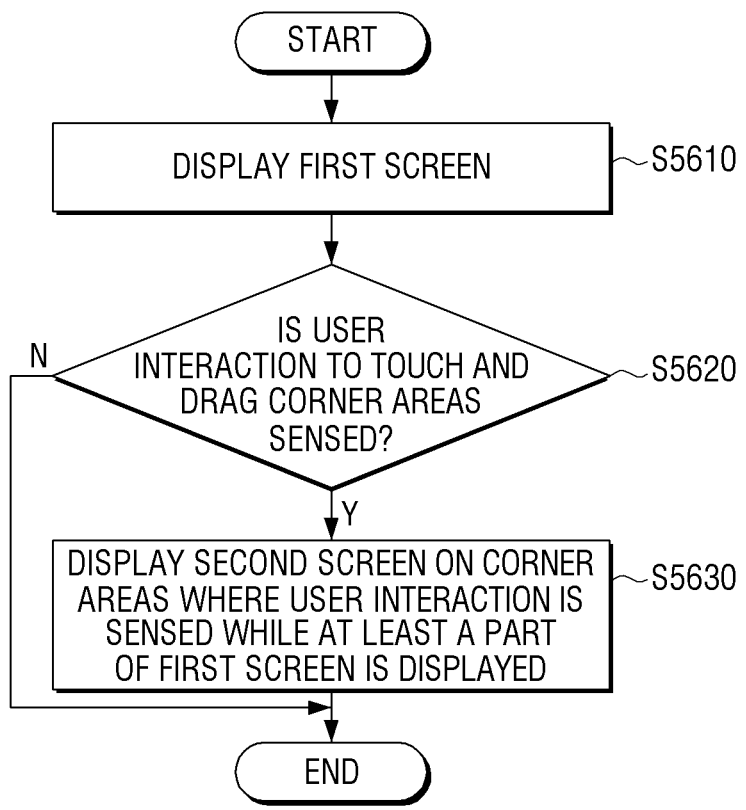
FIGS. 56 and 57 are flowcharts illustrating a method of displaying of a user terminal device, according to various exemplary embodiments.

Hereinafter, with reference to FIGS. 56 and 57, according to an exemplary embodiment, a method for displaying the user terminal device 200 will be described. FIG. 56 is a flowchart to describe a display method of the user terminal device 100 according to a diagonal interaction according to an exemplary embodiment.

The user terminal device 100 displays the first screen (operation S5610). In this case, the first screen may be a square shape.

The user terminal device 100 determines whether a user interaction to drag one of the apexes of the first screen in a diagonal direction is detected (operation S5620).

When a user interaction to drag in a diagonal direction is detected (operation 55620-Y), the user terminal device 100 displays the second screen at a corner area which corresponds to apex in which a user interaction is detected (operation S5630). In this case, the user terminal device 100 may change size of the second screen according to drag amount of a user interaction, and change amount of information displayed on the second screen according to size of the second screen. In addition, the user terminal device 100 may display different types of contents on the second screen according to a location of apex in which a user interaction is detected. If a user interaction to drag in a diagonal direction is not detected (operation S5620-N), the process ends.

Figure 57:
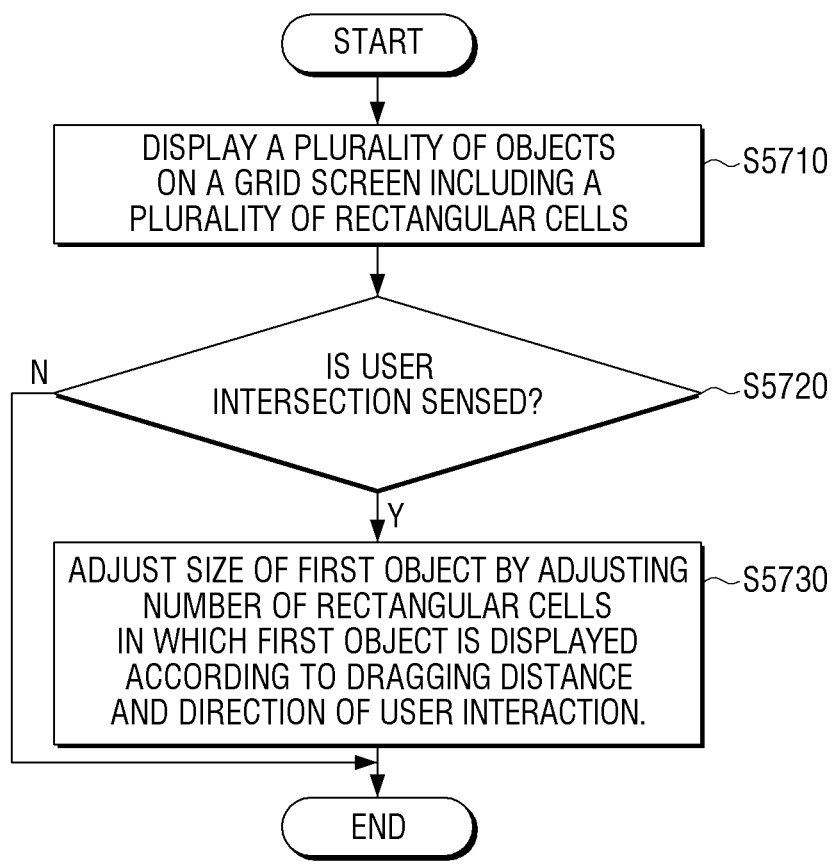

FIG. 57 is a flowchart to describe a method for displaying the user terminal device 100 which displays a grid screen according to an exemplary embodiment.

The user terminal device 100 displays a plurality of objects on a grid screen which includes a plurality of square cells (operation S5710). In this case, the user terminal device 100 may include a display panel in a square shape.

In addition, the user terminal device 100 determines whether a user interaction is detected for the first object from among a plurality of objects (operation S5720). In this case, a user interaction may be a dragging interaction.

When a user interaction is detected (operation S5720-Y), the user terminal device 100 adjusts size of the first object by adjusting the number of square cells in which the first object is displayed according to dragging distance and direction of a user interaction (operation S5730). In particular, when a first user interaction to touch the first object and then drag the first object in an outward direction is detected, the user terminal device 100 may increase size of the first object by increasing the number of square cells in which the first object is displayed. However, when a second user interaction to touch the first object and drag the object in an inward direction of the first object is detected, the user terminal device 100 may decrease size of the first object by decreasing the number of square cell areas in which the first object is displayed. If a user interaction is not detected (operation S5720-N), the process ends.

As described above, according to various exemplary embodiments, a user may perform various functions through a user terminal device which has a display panel in a square shape. Accordingly, user convenience and satisfaction may be improved.

In addition, a method for displaying a user terminal device according to the various exemplary embodiments may be realized as a program and provided to a user terminal device. In particular, a non-transitory computer readable medium in which a program which includes a method of controlling a terminal device is stored therein may be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A method of displaying of a user terminal device, the method comprising:
displaying a first screen relating to a first application;
receiving an event corresponding to a second application while the first screen is displayed;
after the event is received, based on a drag input at one of a plurality of corner areas of the displayed first screen in a diagonal direction to less than a first distance toward an inner portion of the displayed first screen, displaying a second screen comprising first information related to the second application, on a first folded area corresponding to the one of the plurality of corner areas being folded over the first screen and on a first corner area that is exposed by the first folded area, while a first part of the first screen is still displayed; and
based on the drag input at the one of the plurality of corner areas of the displayed first screen in the diagonal direction being dragged to greater than the first distance and less than a second distance toward the inner portion of the displayed first screen, replacing the second screen by displaying a third screen comprising second information related to the second application, on a second folded area corresponding to the one of the plurality of corner areas being folded over the first screen and on a second corner area that is exposed by the second folded area, while a second part of the first screen is still displayed, wherein the second information comprises additional information that is additional to the first information, the second information is rearranged differently than the first information, the second folded area is larger than the first folded area, the second corner area is larger than the first corner area, and the second part of the first screen is smaller than the first part of the first screen.

2. The method of claim 1, wherein the first information of the second screen is displayed according to a location of the one of the plurality of corner areas at which the drag input is input.

3. The method of claim 2, wherein the first information of the second screen comprises any one or any combination of information on the second application that is currently executed, information indicating that moving to a home screen is available, information on a current status of the user terminal device, and quick access information on an application that is designated by a user.

4. The method of claim 1, wherein the first information of the second screen comprises an icon corresponding to the second application.

5. The method of claim 1, wherein the first screen comprises a square shape, and
wherein the method further comprises, based on the drag input moving from the one of the plurality of corner areas to another one of the plurality of corner areas that is opposite to the one of the plurality of corner areas, replacing the first screen with a full screen related to the second application.

6. The method of claim 1, wherein, based on the first screen comprising e-book content, the first information of the second screen comprises a bookmark.

7. The method of claim 1, wherein, based on the received event comprising receiving a message, the first information of the second screen comprises an icon indicating that the message is received, and the second information of the third screen comprises information on the received message.

8. The method of claim 1, wherein, based on the first screen comprising photographic content, the first information of the second screen comprises a plurality of icons configured to perform a plurality of tasks on the photographic content.

9. The method of claim 1, wherein each of the first screen and the second screen comprises a square shape.

10. The method of claim 1, further comprising, based on the drag input at the one of the plurality of corner areas of the displayed first screen in the diagonal direction being dragged to greater than the second distance and less than a third distance toward the inner portion of the displayed first screen, replacing the third screen by displaying a fourth screen comprising third information related to the second application, on a third folded area corresponding to the one of the plurality of corner areas being folded over the first screen and on a third corner area that is exposed by the third folded area, while a third part of the first screen is still displayed, wherein the third information comprises additional information that is additional to the second information, the third information is rearranged differently than the second information, the third folded area is larger than the second folded area, the third corner area is larger than the second corner area, and the third part of the first screen is smaller than the second part of the first screen.

11. A user terminal device, comprising:
a display configured to display a first screen relating to a first application; and
a controller configured to:
receive an event corresponding to a second application while the first screen is displayed;
after the event is received, based on a drag input at one of a plurality of corner areas of the displayed first screen in a diagonal direction to less than a first distance toward an inner portion of the displayed first screen, control the display to display a second screen comprising first information related to the second application, on a first folded area corresponding to the one of the plurality of corner areas being folded over the first screen and on a first corner area that is exposed by the first folded area, while a first part of the first screen is still displayed; and based on the drag input at the one of the plurality of corner areas of the displayed first screen in the diagonal direction being dragged to greater than the first distance and less than a second distance toward the inner portion of the displayed first screen, replace the second screen by displaying a third screen comprising second information related to the second application, on a second folded area corresponding to the one of the plurality of corner areas being folded over the first screen and on a second corner area that is exposed by the second folded area, while a second part of the first screen is still displayed, wherein the second information comprises additional information that is additional to the first information, the second information is rearranged differently than the first information, the second folded area is larger than the first folded area, the second corner area is larger than the first corner area, and the second part of the first screen is smaller than the first part of the first screen.

12. The device of claim 11, wherein the first information of the second screen is displayed according to a location of the one of the plurality of corner areas at which the drag input is input.

13. The device of claim 12, wherein the first information of the second screen comprises any one or any combination of information on the second application that is currently executed, information indicating that movement to a home screen is available, information on a state of the user terminal device, and quick access information on an application that is designated by a user.

14. The device of claim 11, wherein the first information of the second screen comprises an icon corresponding to the second application.

15. The device of claim 11, wherein the first screen comprises a square shape, and
wherein the controller is further configured to, based on the drag input moving from the one of the plurality of corner areas to another one of the plurality of corner areas that is opposite to the one of the plurality of corner areas, replace the first screen with a full screen related to the second application.

16. The device of claim 11, wherein, based on the first screen comprising e-book content, the first information of the second screen comprises a bookmark.

17. The device of claim 11, wherein, based on the received event comprising receiving a message, the first information of the second screen comprises an icon indicating that the message is received, and the second information of the third screen comprises information on the received message.

18. The device of claim 11, wherein, based on the first screen comprising photographic content, the first information of the second screen a plurality of icons configured to perform a plurality of tasks on the photographic content.

19. The device of claim 11, wherein each of the first screen and the second screen comprise a square shape.

20. A method of displaying of a user terminal device, the method comprising:
displaying a first screen comprising a plurality of display items;

based on a first drag input at one of a plurality of first corner areas of a first display item of the plurality of display items in a diagonal direction to less than a first distance toward a first inner portion of the first display item, displaying a second screen comprising first information relating to the first display item, on a first folded area corresponding to the one of the plurality of first corner areas being folded over the first display item and on a first corner area that is exposed by the first folded area, while a first part of the first display item is still displayed;

based on a second drag input at one of a plurality of second corner areas of a second display item of the plurality of display items in the diagonal direction to less than the first distance toward a second inner portion of the second display item, displaying a third screen comprising second information relating to the second display item, on a second folded area corresponding to the one of the plurality of second corner areas being folded over the second display item and on a second corner area that is exposed by the second folded area, while a second part of the second display item is still displayed; and based on the first drag input at the one of the plurality of first corner areas of the first display item in the diagonal direction being dragged to greater than the first distance and less than a second distance toward the first inner portion of the first display item, replacing the second screen by displaying a fourth screen comprising third information related to the first display item, on a third folded area corresponding to the one of the plurality of first corner areas being folded over the first display item and on a third corner area that is exposed by the third folded area, while a third part of the first display item is still displayed, wherein the third information comprises additional information that is additional to the first information, the third information is rearranged differently than the first information, the third folded area is larger than the first folded area, the third corner area is larger than the first corner area, and the third part of the first display item is smaller than the first part of the first display item.

* * * * *